United States Patent
Tsuchida et al.

(10) Patent No.: US 11,808,929 B2
(45) Date of Patent: Nov. 7, 2023

(54) QUANTITATIVE PHASE IMAGE GENERATING METHOD, QUANTITATIVE PHASE IMAGE GENERATING DEVICE, AND PROGRAM

(71) Applicant: NIKON CORPORATION, Tokyo (JP)

(72) Inventors: Shota Tsuchida, Tokyo (JP); Satoshi Ikeda, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 535 days.

(21) Appl. No.: 15/931,995

(22) Filed: May 14, 2020

(65) Prior Publication Data
US 2020/0271910 A1   Aug. 27, 2020

Related U.S. Application Data

(63) Continuation of application No. PCT/JP2017/040991, filed on Nov. 14, 2017.

(51) Int. Cl.
*G02B 21/00* (2006.01)
*G01J 9/00* (2006.01)
*G01J 9/02* (2006.01)

(52) U.S. Cl.
CPC ............ *G02B 21/0056* (2013.01); *G01J 9/00* (2013.01); *G01J 9/0246* (2013.01); *G01J 2009/0211* (2013.01); *G01J 2009/0269* (2013.01)

(58) Field of Classification Search
CPC .. G02B 21/0056; G02B 21/36; G02B 21/365; G02B 21/367; G02B 21/361;
(Continued)

(56) References Cited

U.S. PATENT DOCUMENTS

| 11,651,603 B2* | 5/2023 | Yamaguchi | G06V 10/235 |
| | | | 382/133 |
| 2015/0100278 A1* | 4/2015 | Gaylord | G02B 21/367 |
| | | | 702/189 |

(Continued)

FOREIGN PATENT DOCUMENTS

| EP | 1852725 A1 | 11/2007 |
| JP | 2005-218379 A | 8/2005 |

(Continued)

OTHER PUBLICATIONS

Oct. 26, 2021 Extended European Search Report issued in Patent Application No. 17932431.4.

(Continued)

*Primary Examiner* — Violeta A Prieto
(74) *Attorney, Agent, or Firm* — Oliff PLC

(57) ABSTRACT

A quantitative phase image generating method for a microscope, includes: irradiating an object with illumination light; disposing a focal point of an objective lens at each of a plurality of positions that are mutually separated by gaps $\Delta z$ along an optical axis of the objective lens, and detecting light from the object; generating sets of light intensity distribution data corresponding to each of the plurality of positions based upon the detected light; and generating a quantitative phase image based upon the light intensity distribution data; wherein the gap $\Delta z$ is set based upon setting information of the microscope.

19 Claims, 25 Drawing Sheets

(58) Field of Classification Search
CPC ....... G01J 2009/0211; G01J 2009/0269; G01J 9/00; G01J 9/0246
See application file for complete search history.

(56) References Cited

U.S. PATENT DOCUMENTS

| | | | |
|---|---|---|---|
| 2015/0185460 A1 | 7/2015 | Nakasho et al. | |
| 2016/0171679 A1* | 6/2016 | Ishiwata | H04N 13/207 348/46 |
| 2018/0259763 A1* | 9/2018 | Ishiwata | H04N 13/211 |
| 2022/0044003 A1* | 2/2022 | Yamaguchi | G06V 20/693 |

FOREIGN PATENT DOCUMENTS

| | | |
|---|---|---|
| JP | 2007-192665 A | 8/2007 |
| JP | 2008-102294 A | 5/2008 |
| JP | 2017-068203 A | 4/2017 |

OTHER PUBLICATIONS

Young et al.; "Depth-of-Focus in Microscopy;" SCIA-93, Proceedings of the 8th Scandinavian Conference on Image Analysis; Tromso, Norway; 1993; pp. 493-498.
Jun. 25, 2021 Extended Search Report issued in European Patent Application No. 17932431.4.
Martinez-Carranza et al.; "Optimum measurement criteria for the axial derivative intensity used in transport of intensity-equation-based solvers;" Optics Letters; 2014; pp. 182-185; vol. 39, No. 2.
Barty et al.; "Quantitative Optical Phase Microscopy;" Optics Letters; 1998; pp. 1-2; vol. 23, No. 11.
Paganin et al.; Noninterferometric Phase Imaging with Partially Coherent Light; Physical Review Letters, 1998; pp. 2586-2589; vol. 80, No. 12.
Feb. 13, 2018 Search Report issued in International Patent Application No. PCT/JP2017/040991.
Aug. 8, 2023 Office Action issued in European Patent Application No. 17932431.4.

* cited by examiner

FIG. 8A  CONDITION FOR PHASE RESTORATION UP TO CUTOFF SPATIAL FREQUENCY TO BE POSSIBLE NA0.3
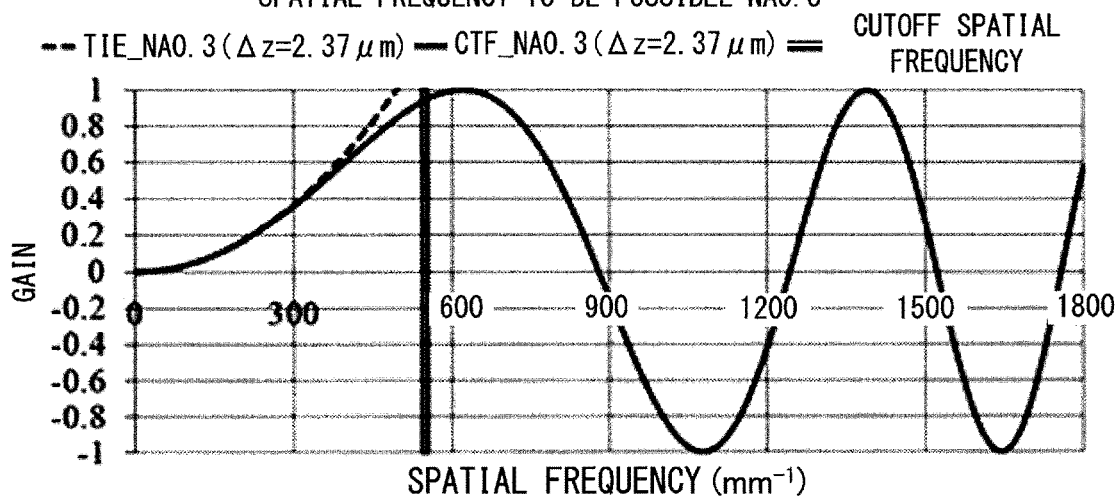
FIG. 8B  CONDITION FOR PHASE RESTORATION UP TO CUTOFF SPATIAL FREQUENCY TO BE POSSIBLE NA0.75
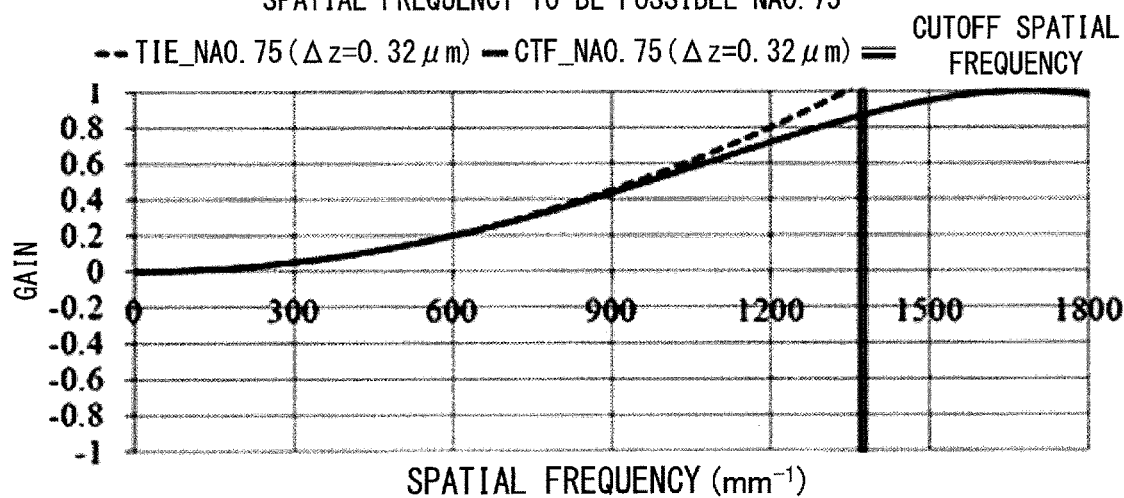
FIG. 8C  CONDITION FOR PHASE RESTORATION UP TO CUTOFF SPATIAL FREQUENCY TO BE POSSIBLE NA0.95
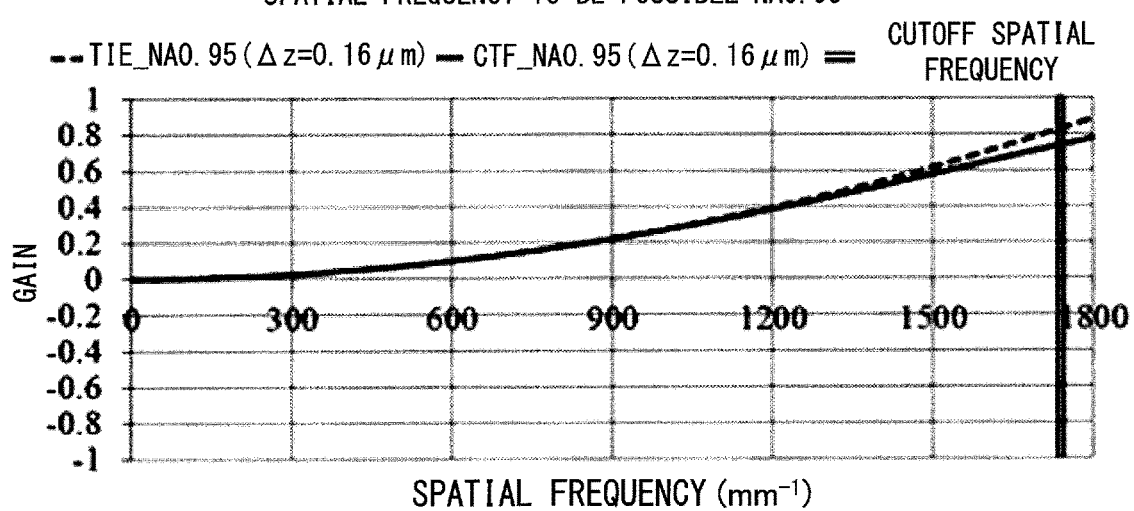

FIG. 9A CONDITION FOR PHASE RESTORATION UP TO 1/4 OF CUTOFF SPATIAL FREQUENCY TO BE POSSIBLE NA0.3
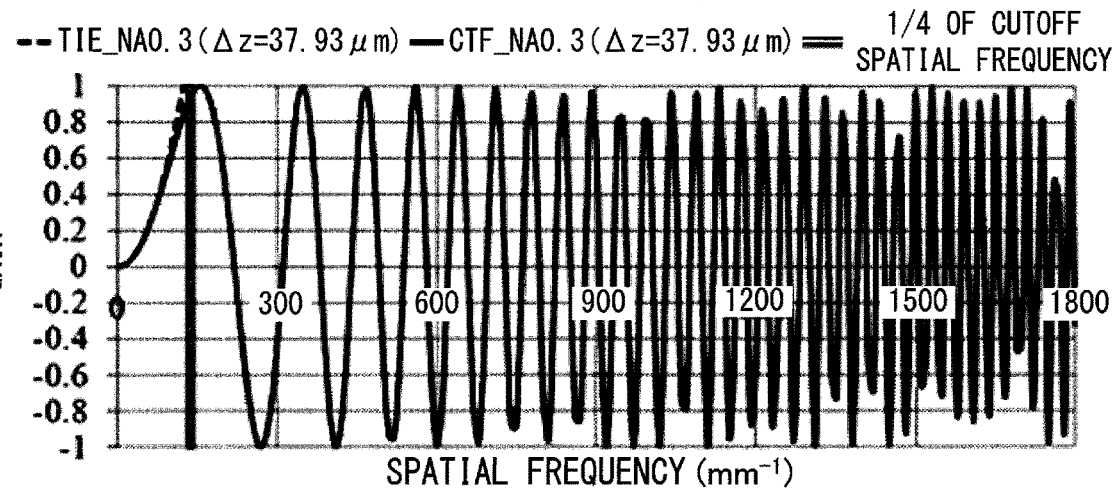
FIG. 9B CONDITION FOR PHASE RESTORATION UP TO 1/4 OF CUTOFF SPATIAL FREQUENCY TO BE POSSIBLE NA0.75
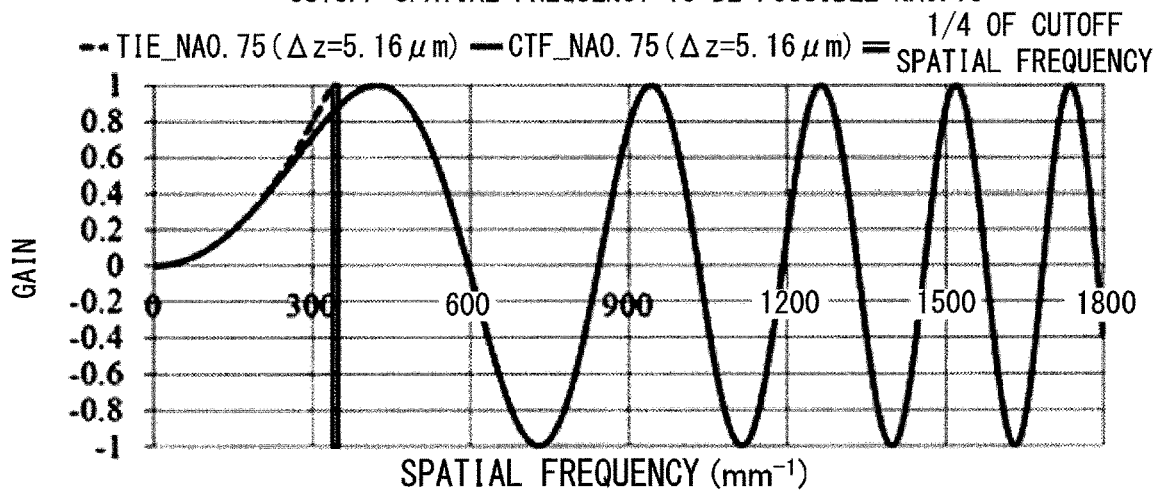
FIG. 9C CONDITION FOR PHASE RESTORATION UP TO 1/4 OF CUTOFF SPATIAL FREQUENCY TO BE POSSIBLE NA0.95
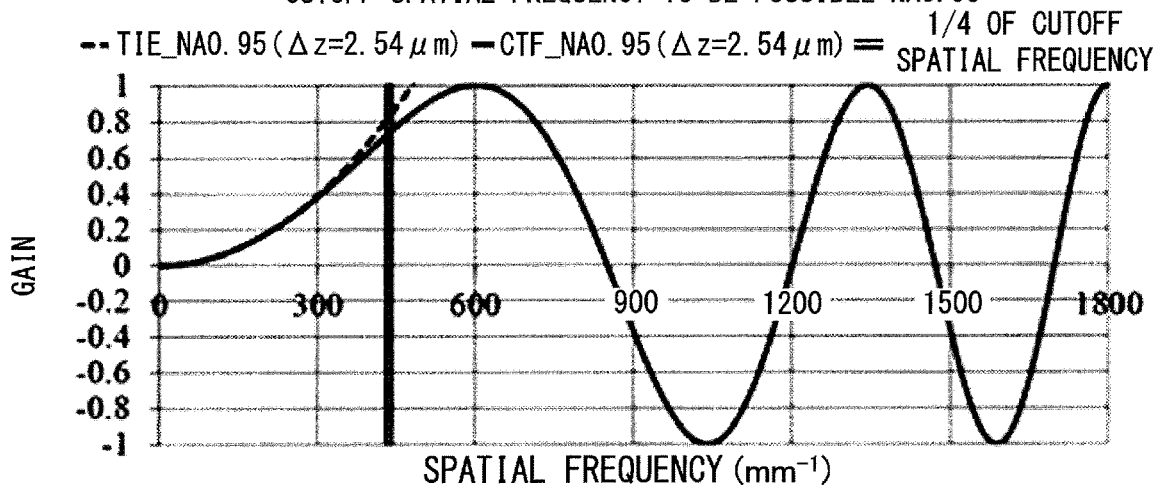

-•- SAMPLING GAPS Δx1.6 μm, NUMBER OF PIXELS N4096
-○- SAMPLING GAPS Δx0.292 μm, NUMBER OF PIXELS N4096

SAMPLING GAPS : DIFFERENT
NUMBER OF PIXELS : SAME

-•- SAMPLING GAPS Δx0.292 μm, NUMBER OF PIXELS N4096
-○- SAMPLING GAPS Δx0.292 μm, NUMBER OF PIXELS N1024

SAMPLING GAPS : SAME
NUMBER OF PIXELS : DIFFERENT

- ORIGINAL DATA: Sin FUNCTION INCLUDING GAUSSIAN NOISE
- PRIMARY DIFFERENTIAL NOT USING Savitzky-Golay METHOD
- PRIMARY DIFFERENTIAL USING Savitzky-Golay METHOD [FIFTH-ORDER POLYNOMIAL EQUATION, 29 FRAMES]

QUANTITATIVE PHASE IMAGE GENERATING METHOD, QUANTITATIVE PHASE IMAGE GENERATING DEVICE, AND PROGRAM

INCORPORATION BY REFERENCE

This application is a continuation of international application No. PCT/JP2017/040991 filed Nov. 14, 2017.

The disclosures of the following priority applications are herein incorporated by reference: International application No. PCT/JP2017/040991 filed Nov. 14, 2017.

BACKGROUND OF THE INVENTION

1. Filed of the Invention

The present invention relates to a quantitative phase image generating method, and to a quantitative phase image generating device and program.

2. Description of Related Art

A phase measurement method has been proposed (refer to Japanese Laid-Open Patent Publication 2007-192665) in which, when light is propagated, a phase distribution upon an observation surface of a target object or the like is derived from a plurality of light intensity images in the neighborhood of that observation surface on the basis of an intensity transport equation that specifies the relationship between the intensity of the light and its phase. In measurement of the phase of the object, it is desirable for highly accurate phase information to be obtained with a small number of imaging operations.

SUMMARY OF THE INVENTION

According to the 1st aspect of the present invention, a quantitative phase image generating method for a microscope comprises: irradiating an object with illumination light; disposing a focal point of an objective lens at each of a plurality of positions that are mutually separated by gaps $\Delta z$ along an optical axis of the objective lens, and detecting light from the object; generating sets of light intensity distribution data corresponding to each of the plurality of positions based upon the detected light; and generating a quantitative phase image based upon the light intensity distribution data; wherein the gap $\Delta z$ is set based upon setting information of the microscope.

According to the 2nd aspect of the present invention, a quantitative phase image generating method comprises: irradiating an object with illumination light; disposing a focal point of an objective lens at each of a plurality of positions that are mutually separated by gaps $\Delta z$ along an optical axis of the objective lens, and detecting light from the object; generating sets of light intensity distribution data corresponding to each of the plurality of positions based upon the detected light; and generating a quantitative phase image based upon the light intensity distribution data; and wherein the gap $\Delta z$ is 0.07 µm or greater and 90.3 µm or less.

According to the 3rd aspect of the present invention, a quantitative phase image generating device comprises a microscope, wherein the microscope comprises: an illumination optical system that irradiates illumination light upon an object; an objective lens; a device control unit that adjusts a position of a focal point of the objective lens, so that the focal point of the objective lens is disposed at a plurality of positions that are mutually separated by gaps $\Delta z$ along an optical axis of the objective lens; a detector that detects light from the object due to the irradiation of illumination light from the illumination optical system; and an image generation unit that generates sets of light intensity distribution data corresponding to each of the plurality of positions based upon the detected light, and that generates a quantitative phase image based upon light intensity distribution data; and wherein the device control unit sets the gap $\Delta z$ based upon setting information of the microscope.

According to the 4th aspect of the present invention, a quantitative phase image generating device comprises: an illumination optical system that irradiates illumination light upon an object; an objective lens; a device control unit that adjusts a position of a focal point of the objective lens upon the object, so that the focal point of the objective lens is disposed at a plurality of positions that are mutually separated by gaps $\Delta z$ along an optical axis of the objective lens; a detector that detects light from the object due to the irradiation of illumination light from the illumination optical system; and an image generation unit that generates sets of light intensity distribution data corresponding to each of the plurality of positions based upon the detected light, and that generates a quantitative phase image based upon the sets of light intensity distribution data; and wherein the device control unit sets the gap $\Delta z$ to 0.07 µm or greater and 90.3 µm or less.

According to the 5th aspect of the present invention, a program enables a processing device of a quantitative phase image generating device with a microscope, which comprises: an illumination optical system that irradiates illumination light upon an object; an objective lens; a device control unit that adjusts a position of a focal point of the objective lens, so that a focal point of the objective lens is disposed at a plurality of positions in the object that are mutually separated by gaps $\Delta z$ along an optical axis of the objective lens; a detector that detects light from the object due to the irradiation of illumination light from the illumination optical system; and an image generation unit that generates sets of light intensity distribution data corresponding to each of the plurality of positions based upon the detected light, and that generates a quantitative phase image based upon the sets of light intensity distribution data, to execute processing for performing setting processing for setting the gap $\Delta z$ based upon setting information for the microscope inputted to or stored in the quantitative phase image generating device.

According to the 6th aspect of the present invention, a program enables a processing device of a quantitative phase image generating device, which comprises: an illumination optical system that irradiates illumination light upon an object; an objective lens; a device control unit that adjusts a position of a focal point of the objective lens upon the object, so that the focal point of the objective lens is disposed at a plurality of positions that are mutually separated by gaps $\Delta z$ along an optical axis of the objective lens; a detector that detects light from the object due to the irradiation of illumination light from the illumination optical system; and an image generation unit that generates sets of light intensity distribution data corresponding to each of the plurality of positions based upon the detected light, and that generates a quantitative phase image based upon the sets of light intensity distribution data, to execute processing for performing setting processing for setting the gap $\Delta z$ to 0.07 µm or greater and 90.3 µm or less.

BRIEF DESCRIPTION OF THE DRAWINGS

FIG. 7A is a graph when the focal gap is 1.6 µm, and FIG. 7B is a graph when the focal gap is 0.4 µm;

FIGS. 8A, 8B and 8C consist of three graphs showing contrast transfer functions under conditions in which it is possible to restore the phase to a cutoff spatial frequency: FIG. 8A is a graph for when the numerical aperture NA is 0.3, FIG. 8B is a graph for when the numerical aperture NA is 0.75, and FIG. 8C is a graph for when the numerical aperture NA is 0.95;

FIGS. 9A, 9B and 9C consist of three graphs showing contrast transfer functions under conditions in which it is possible to restore the phase to a quarter of a cutoff spatial frequency: FIG. 9A is a graph for when the numerical aperture NA is 0.3, FIG. 9B is a graph for when the numerical aperture NA is 0.75, and FIG. 9C is a graph for when the numerical aperture NA is 0.95;

FIG. 11A is a graph showing two data series for which the sampling gaps Δx are different but the numbers N of pixels are the same, and FIG. 11B is a graph showing two data series for which the sampling gaps Δx are the same but the numbers N of pixels are different;

FIG. 12A is a conceptual figure showing a case in which the diameter of the Airy disk of the point spread function (PSF) projected upon the image surface is the same as the pixel size P, and FIG. 12B is a conceptual figure showing a case in which the diameter of the Airy disk of the point spread function (PSF) projected upon the image surface is greater than the pixel size P;

FIG. 13A is a graph showing a specific example in which a case in which the SG method is used and a case in which the SG method is not used are compared together, and FIG. 13B is a conceptual figure showing the concept of the SG method;

FIG. 22A is a conceptual figure showing the structure of a prior art optical system, and FIG. 22B is a conceptual figure showing the structure of an optical system of a quantitative phase image generating device of an embodiment of the present invention;

DESCRIPTION OF EMBODIMENTS

A quantitative phase image generating device and a quantitative phase image generating method according to an embodiment of the present invention will now be explained in the following with reference to the drawings as appropriate. The quantitative phase image generating device of this embodiment irradiates illumination light upon each of a plurality of positions upon the target object that are separated by gaps Δz while arranging the focal point of an objective lens (in other words, its focal surface) thereupon, detects the light from each of the regions (in other words, from each of the focal surfaces) at which the focal point is arranged, and creates a quantitative phase image on the basis of the data acquired by that detection, where the above gap Δz is set on the basis of the numerical aperture of the objective lens, the wavelength of the illumination light, the refractive index between the objective lens and the object, and so on.

Here, the quantitative phase image is an image (converted into an image) representing phases obtained by multiplying together changes of thickness of the target object and changes in its refractive index. Since currently existing phase contrast images and differential interference images are interference images in which the amplitudes are mixed together with the phases, accordingly it is not possible to quantify the phases perfectly (it is possible to quantify the phases in the condition that the amplitudes are ignorable and the phases are small), but, since it is possible to represent the phases quantitatively even when the phases of the object change to various values such as twice, three times, four times and so on, accordingly the quantitative phase image may also be termed an image in which the phase of the object has been quantified.

Figure 1:
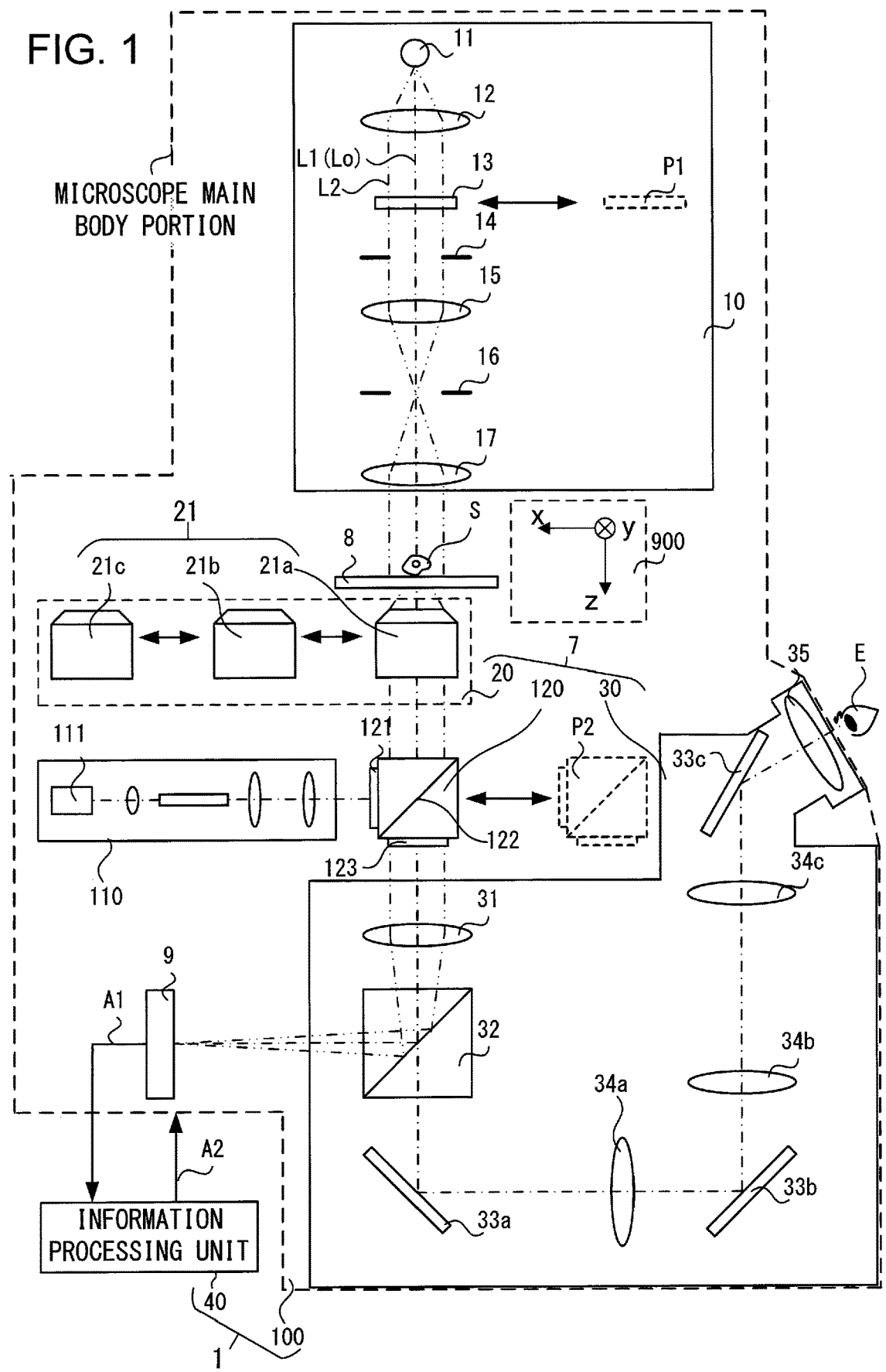
FIG. 1 is a conceptual figure showing the structure of a quantitative phase image generating device according to an embodiment.

FIG. 1 is a conceptual figure showing the structure of a quantitative phase image generating device according to this embodiment. This quantitative phase image generating device 1 is a microscope, in other words is a quantitative phase microscope, and comprises a microscope main body portion 100 and an information processing unit 40. The microscope main body portion 100 comprises a transmitted illumination optical system 10 that irradiates illumination light upon the target object S, a stage 8, an imaging optical system 7, an epi-illumination optical system 110, and a detection unit 9. The imaging optical system 7 comprises an objective optical system 20, a filter cube 120, and a relay optical system 30.

Incidentally, the function of the information processing unit 40 may be provided by an electronic computer or the like that is physically separated from the microscope main body portion 100.

The transmitted illumination optical system 10 comprises a light source 11, a lens 12, a band pass filter 13, a field iris 14, a lens 15, an aperture iris 16, and a condenser lens 17. The objective optical system 20 includes an objective lens 21. Any one of a plurality of objective lenses 21a, 21b, and 21c may be selected for use as the objective lens 21. And a relay optical system 30 comprises an imaging lens 31e, a beam splitter 32, mirrors 33a, 33b, and 33c, lenses 34a, 34b, and 34c, and an eyepiece lens 35. The eyepiece lens 35 is adapted to be capable of being brought close to an eye E for viewing.

It should be understood that the number of interchangeable objective lenses 21 is not particularly limited. Moreover, the details of the optical system included in the microscope main body portion 100 are not particularly limited, provided that it is capable of acquiring images of the desired surfaces of the target object S by image capture.

In FIG. 1, the optical axis of the optical system of the microscope main body portion 100 is schematically shown by the single dotted chain line L1, while the illumination light (light flux) is schematically shown by the double dotted chain lines L2. When, among the objective lenses 21, the focal point of the objective lens 21a is disposed in the object S, since the optical axis Lo of the objective lens 21a coincides with the optical axis L1 of the microscope main body portion 100 as will be described in detail hereinafter, accordingly in FIG. 1 this is shown by L1 (Lo). The flow of the detection signals for the light detected by the detection unit 9 is schematically shown by the solid arrow sign A1, and the control of the microscope main body portion 100 by the information processing unit 40 is schematically shown by the solid arrow sign A2. The single dotted chain lines L1, L2 and the solid arrow signs A1, A2 denote similar things in the following embodiments.

The light source 11 includes a non-coherent light source device such as a halogen lamp or the like, and emits illumination light L2 that irradiates the target object S. In the present embodiment, the light source 11 emits non-coherent light, and it is arranged for this emitted non-coherent light to be formed by the various sections of the transmitted illumination optical system 10, including the aperture iris 16 that will be described hereinafter, into light having a wave front that is substantially orthogonal to the optical axis and whose phase can be restored, this light being irradiated upon the object S. "Phase restoration" refers to calculation of a phase value for the object S from the measured intensity of the light from the object S by employing an intensity transport equation, as will be described in detail hereinafter. Provided that phase measurement of the object S2 is possible, the illumination light L2 may be light of any wavelength, but, from the standpoint of enabling an object that cannot easily be seen by visible light to be seen by phase measurement, it is desirable for visible light simply to be used just as it is.

However, the illumination light L2 that irradiates the object S may also be ultraviolet light or infrared light, rather than visible light. Furthermore, provided that the shape of the wave front of the illumination light L2 is known in advance, this wave front may not be substantially orthogonal to the optical axis, but may, for example, be a substantially spherical surface. Moreover, it would also be possible for the light source 11 to be built around a coherent light source such as a pulse laser or a continuous wave (CW) laser or the like, so that coherent light is emitted as the illumination light L2.

The illumination light L2 emitted from the light source 11 is incident upon the lens 12. This illumination light L2 incident upon the lens 12 is then refracted by the lens 12 to become substantially parallel light and is emitted from the lens 12, and is incident upon the band pass filter 13. Only the light of the wavelength components of the desired wavelength range of this illumination light L2 incident upon the band pass filter 13 is passed by the band pass filter 13, and is incident upon the field iris 14. Here, the wavelength range of light that is passed by the band pass filter 13 is set as appropriate so that the error, which is generated due to axial chromatic aberration, between the actually measured value of the phase and the actual phase (i.e. the phase restoration error, as will be described hereinafter) does not become too large when the phase is restored. The band pass filter 13 is adapted to be capable of being retracted to a position P1 outside the optical path, as appropriate.

Incidentally, when a light source whose wavelength range is narrow, such as a laser or the like, is employed as the light source 11, then there is no necessity to provide a band pass filter 13 in the optical path. Moreover, it would also be possible to limit the wavelength range detected by the filter of the filter cube 120, which is disposed on the imaging side with respect to the object S, without employing any band pass filter 13.

The diameter of the light flux of the illumination light L2 incident upon the field iris 14 is adjusted by that field iris, and the illumination light is then emitted from the field iris 14 and is incident upon the lens 15. This illumination light L2 incident upon the lens 15 is converged by the lens 15 and emitted from the lens 15, and is incident upon the aperture iris 16. The wave front of the illumination light L2 incident upon the aperture iris 16 is converted into the shape of a spherical surface, and the light is then emitted from the aperture iris 16 and is incident upon the condenser lens 17. This illumination light L2 incident upon the condenser lens 17 is refracted by the condenser lens 17, and thereby becomes light that is irradiated upon the target object S and that has a wave front substantially orthogonal to the optical axis when it is thus irradiated upon the target object S.

The target object S is disposed upon the stage 8 so that the focal point positions of the objective lens 21a are included in the portion of the object S that is to be the subject of performing phase measurement, or in its neighborhood. The object S is not particularly limited, but it is desirable for the proportional change of the amplitude to be comparatively small while on the other hand the proportional change of the phase is large when the illumination light is irradiated upon the object S and is transmitted through it, because in that case the beneficial effects of phase measurement according to this embodiment are more prominently obtained. This type of body is termed a phase body. From the above standpoint, it is desirable for the object S to be a phase body such as a cell, in particular a culture cell or the like.

Figure 5:
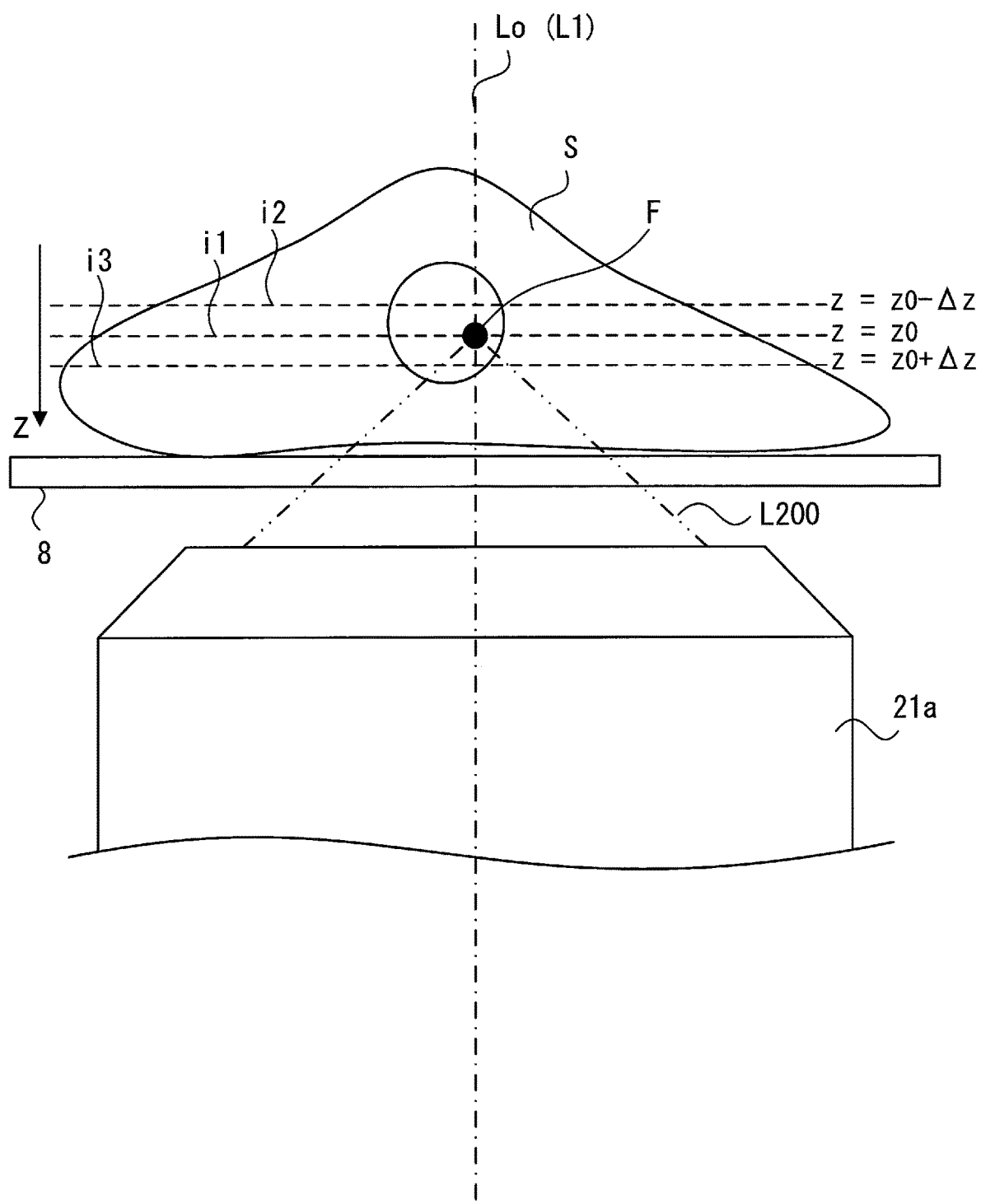
FIG. 5 is a conceptual figure for explanation of a focal gap.

The stage 8 is adapted to be shiftable along the optical axis of the objective lens 21a and also along axes that are orthogonal to that optical axis. Here, by the optical axis of the objective lens 21a is meant the axis Lo that is shown by a straight line passing through the optical center of the lens surface of the objective lens 21a on the side of the object S and the focal point of the objective lens 21a (refer to FIG. 5). The stage 8 is adapted, when imaging an object S, to be shiftable along the optical axis Lo of the objective lens 21a by electrical propulsion by a shifting device such as a motor or the like. In FIG. 5, the point where the optical axis Lo of the objective lens 21a coincides with the optical axis L1 of the microscope main body portion 100 is indicated by Lo (L1). In the following embodiments, as shown by the coordinate axes 900 in FIG. 1, the Z axis is taken as being parallel to the optical axis L1 of the microscope main body portion 100, in other words to the optical axis Lo of the objective lens 21a, the X axis is taken as being orthogonal to the Z axis and parallel to the drawing paper, and the Y axis is taken as being orthogonal to the X axis and to the Z axis.

The objective optical system 20 includes an objective lens 21. In the present embodiment, a plurality of objective lenses 21a, 21b, and 21c are provided as alternatives for the objective lens 21. As will be described hereinafter, the object S is imaged by the quantitative phase image generating device 1 by exchanging the objective lenses 21a, 21b, and 21c which have different numerical apertures NA and so on, and it is arranged for variation of the obtained phase values to be suppressed when performing phase measurement on the basis of data obtained by each of the objective lenses 21. If the change of phase value measured upon changeover of the objective lens 21 is large, then it becomes difficult to perform comparison between the data sets acquired by employing different objective lenses 21. Furthermore, this imposes a burden upon the work related to a series of measurements, due to the reason that, among the data sets acquired by employing different objective lenses 21, it is difficult to determine which of the data sets acquired by employing which objective lens 21 has the highest accuracy when the phase is restored, and so on.

The epi-illumination optical system 110 includes a mercury lamp 111 or the like, and emits excitation light for observation of fluorescence or the like. The light emitted from the epi-illumination optical system 110 is incident upon the filter cube 120.

The filter cube 120 includes an excitation filter 121, a dichroic mirror 122, and an absorption filter 123, and reflects light incident from the epi-illumination optical system 110 to the target object S, while on the other hand passing fluorescence from the object S through to the relay optical system 30. The filter cube 120 is adapted to be retracted, as appropriate, to a position P2 outside the optical path.

The excitation filter 121 has a transmission wavelength range set so that the wavelength region of the excitation light incident from the epi-illumination optical system 110 becomes the reflection wavelength range of the dichroic filter 122, and, due to this, the excitation filter allows a portion of the excitation light in that wavelength range of excitation light to pass. The dichroic filter 122 reflects the excitation light that has passed through the excitation filter 121 toward the object S, and transmits the fluorescence from the object S incident from the objective lens 21a to the absorption filter 123. The absorption filter 123 absorbs unnecessary scattered light, among the light incident from the dichroic filter 122, from the object S and the optical system, and emits only required light to the imaging lens 31 of the relay optical system 30.

The imaging lens 31 of the relay optical system 30 refracts the light incident from the filter cube 120 so as to form an image upon the detection unit 9, and emits this light to the beam splitter 32. The beam splitter 32 reflects a portion of the light incident from the filter cube 120 to the detection unit 9, and transmits the remainder to emit it to the mirror 33a. The light reflected by the mirror 33a is incident upon the eyepiece lens 35 after having been reflected and refracted by, in order, the lens 34a, the mirror 33b, the lens 34b, the lens 34c, and the mirror 33c. This light incident upon the eyepiece lens 35 is refracted by the eyepiece lens 35 and is incident upon the eye E of the user, and is perceived.

The detection unit 9 includes a detector including an imaging element such as a CCD or a CMOS or the like, and detects the light that has reflected by the beam splitter 32 of the relay optical system 30. The detection signal corresponding to the detected light is A/D converted, as appropriate, by an A/D converter or the like not shown in the figures, and is outputted to the information processing unit 40. To put it in another manner, the detection unit 9 captures an image of the object 9.

Incidentally while, in this quantitative phase image generating device 1, during phase measurement of a target object S, the detection unit 9 is adapted to capture an image of the object S upon which the illumination light L2 is being irradiated from the transmitted illumination optical system 10, it would also be possible to provide a structure in which an image of the object S is captured while it is being irradiated by illumination light from the epi-illumination optical system 110. In this case, the illumination light from the epi-illumination optical system 110 is irradiated upon the object S via the objective lens 21a (i.e. via the objective optical system 20), and an image of the object S on the basis of the light reflected by the object S is captured by the detection unit 9.

Figure 2:
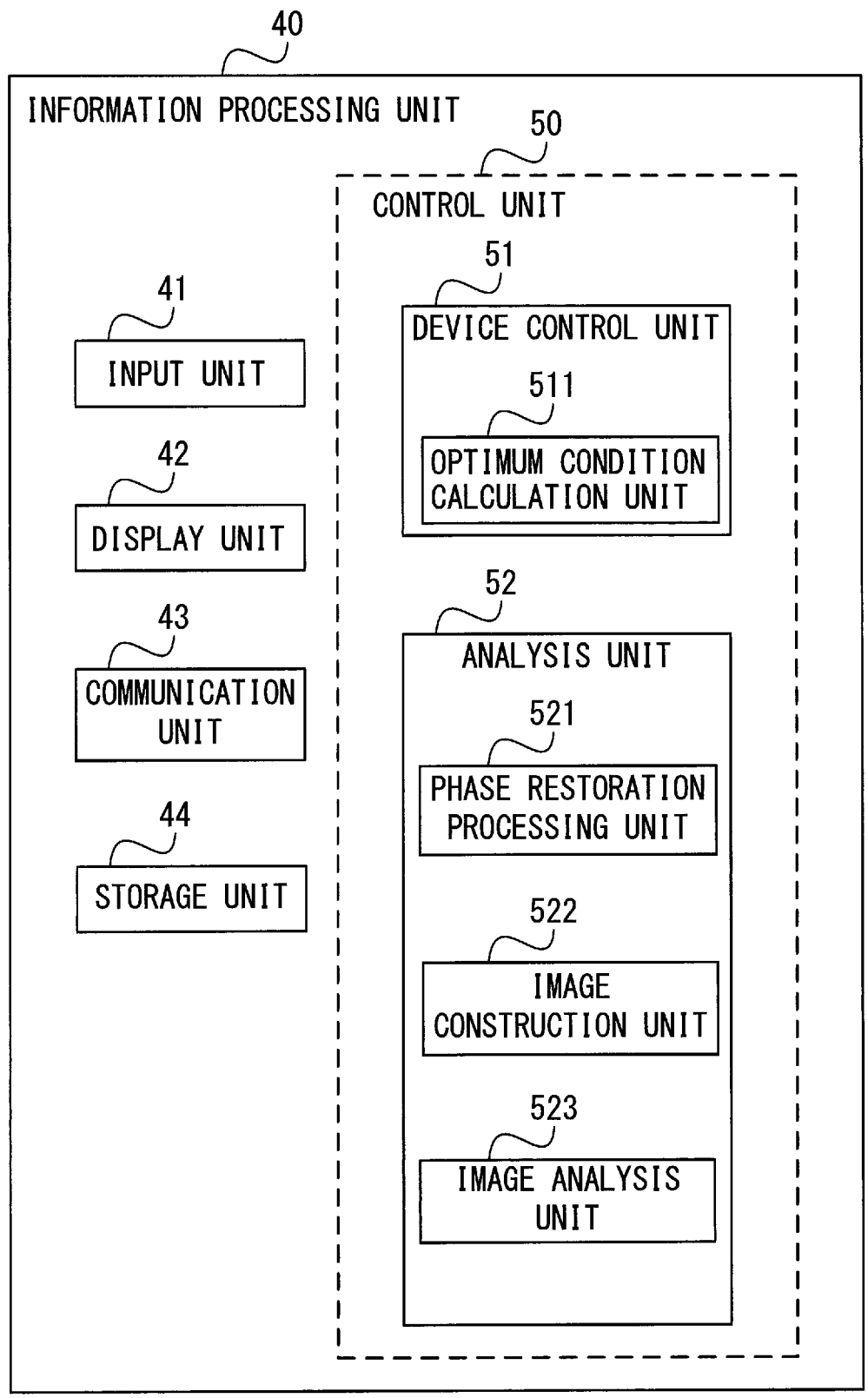
FIG. 2 is a conceptual figure showing the structure of an information processing unit of this quantitative phase image generating device according to the embodiment.

FIG. 2 is a figure showing the structure of the information processing unit 40. The information processing unit 40 comprises an input unit 41, a display unit 42, a communication unit 43, a storage unit 44, and a control unit 50. The control unit 50 comprises a device control unit 51 and an analysis unit 52. The device control unit 51 comprises an optimum condition calculation unit 511. And the analysis unit 52 comprises a phase restoration processing unit 521, an image construction unit 522, and an image analysis unit 523.

The input unit 41 includes input devices such as a keyboard, a mouse and/or a touch panel, and so on, and receives input data including information and so on required for image capture of the object S performed by the microscope main body portion 100 or for analysis of the data obtained by that image capture, performed by the analysis unit 52. And, as appropriate, the input unit 41 stores this input data that it has received in a storage unit 44 which will be described hereinafter.

Incidentally, it would also be possible for the input data to be acquired via a communication unit 43 to be described hereinafter.

The display unit 42 includes a display device such as a liquid crystal monitor or the like, and displays the conditions for image capture by the microscope main body portion 100, analysis results generated by the analysis unit 52 on the basis of the data obtained by that image capture, quantitative phase images, and so on.

The communication unit 43 includes a communication device that performs communication by employing a communication network such as the internet or the like, and that transmits analysis results and quantitative phase images and so on generated by the analysis unit 52 on the basis of the conditions for image capture by the main microscope body portion 100 and data obtained by that image capture, and also transmits and receives required data as appropriate.

The storage unit 44 includes a storage device such as a non-volatile memory or the like, and stores a program that causes the control unit 50 to perform processing, data required for image capture by the microscope main body portion 100, data obtained by that image capture, analysis results generated by the analysis unit 52 on the basis of that data, quantitative phase images, and so on.

The control unit 50 comprises a processor that includes a microprocessor such as a CPU and so on, and functions as a main section for operation to control the quantitative phase image generating device 1. In other words, various types of processing are performed by executing a program stored in the storage unit 44 and so on, such as a device control procedure of performing image capture of the object S by the microscope main body portion 100, analysis processing such as phase restoration processing of data obtained by that image capture and so on, and output processing and the like.

On the basis of the input data that has been inputted by the user, the device control unit 51 of the control unit 50 calculates in an appropriate manner the required parameters for image capture of the object S by the microscope main body portion 100, and also controls the operation of the various sections of the microscope main body portion 100 on the basis of those parameters and input data and so on that has been acquired.

And the optimum condition calculation unit 511 calculates a value Δz for gaps between a plurality of positions upon the object S, which is to be set when the microscope main body portion 100 sequentially disposes the focal point of the objective lens 21a at the plurality of position upon the object S to detect the light from the object S with the detection unit 9. This gap Δz will be termed the focal gap. This focal gap Δz is a very important parameter for performing phase measurement with good accuracy. In the following, this feature will be explained on the basis of a method for phase measurement that employs an intensity transport equation.

Figure 3:
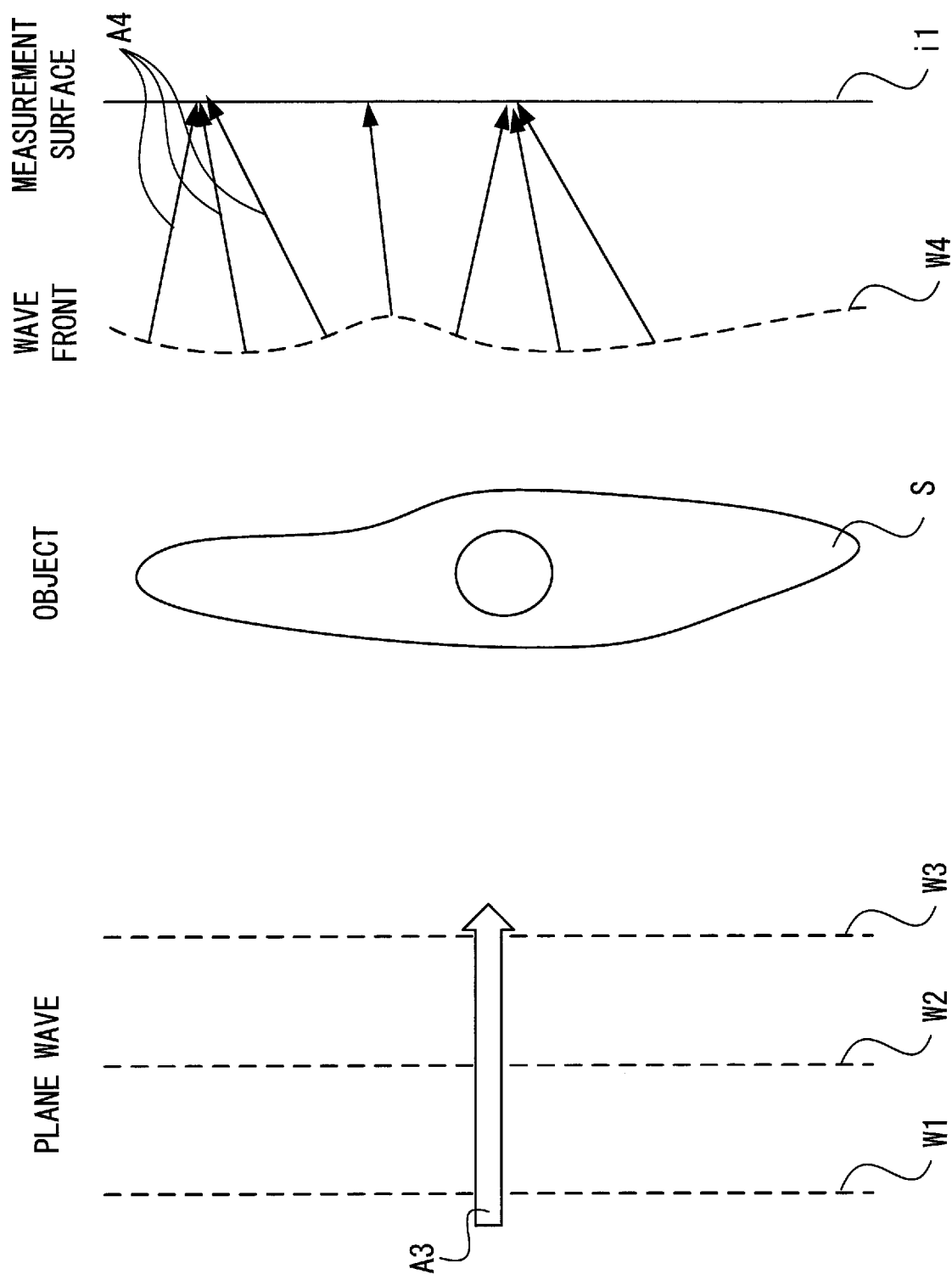
FIG. 3 is a conceptual figure demonstrating the fact that the intensity of measured light changes according to change of the phase of the illumination light from the object.

FIG. 3 is a conceptual figure for explanation of the feature that the intensity distribution of the light that has passed through a phase body changes. The target object S is a phase body such as a cell or the like, and a plane wave having wave fronts substantially orthogonal to the optical axis and mutually parallel, as schematically shown by the wave fronts W1, W2, W3, is irradiated upon the object S. The direction of progression of the plane wave is indicated by the arrow sign A3. While the amplitude of the light that has passed through the object S does not greatly change, the surfaces of equal phase, in other words the wave fronts change due to changes of the phase (refer to the wave front W4). According to the Huygens-Fresnel theory, light having wave fronts that are curvilinear reaches a measurement surface i1 as shown by the solid arrow signs A4. Here, as will be described in detail hereinafter, a specific surface in the object S at which the focal point of the objective lens 21a is disposed (to put it in another manner, the focal surface of the objective lens 21a) is referred to as the "measurement surface i1". This measurement surface i1 is a surface that is substantially orthogonal to the optical axis of the objective lens 21a. In FIG. 3, the measurement surface i1 is substantially parallel to the wave fronts W1 through W3 of the plane wave. Upon the measurement surface i1, as described above, along with change of the wave front due to the object S, a predetermined intensity distribution of light is generated (hereinafter this is termed a "light intensity distribution"). A method is proposed for measuring the change of phase by analyzing the intensity of the transmitted light on the basis of the relationship between changes of phase of the transmitted light due to the object S and the light intensity distribution. In the present embodiment, a method that uses an intensity transport equation as explained below is employed.

For a wave which is propagating, the relationship between the intensity I and the phase φ is described by an intensity transport equation. This intensity transport equation is a simultaneous equation based upon the following Equations (1) and (2). For details, refer to Paganin D. and Nugent K. A., "Noninterferometric Phase Imaging with Partially Coherent Light", Physical Review Letters, Vol. 88, pp. 2586-2589.

[Math. 1]

$$\nabla_{xy}^2 \varphi = -\frac{2\pi}{\lambda} \frac{\partial}{\partial z} I(x, y, z) \tag{1}$$

[Math. 2]

$$I \nabla_{xy} \Phi = \nabla_{xy} \varphi \tag{2}$$

Here, x,y as a subscript of ∇ indicates the XY plane (i.e. a plane orthogonal to the direction of propagation, in other words, in this embodiment, a plane orthogonal to the Z axis). That is to say, ∇xyφ that appears on the left side of Equation (2) indicates the gradient of the phase φ in the XY plane. And Φ that appears on the left side of Equation (1) and on the right side of Equation (2) is a function that is introduced so as to facilitate calculation by bringing Equation (1) into the form of a Poisson equation: the distribution in the XY plane of the differential coefficient of the intensity I with respect to Z is obtained, and can be derived by solving the Poisson equation (1). And, from the function Φ obtained by solving Equation (1) and the light intensity distribution, it is possible to calculate the phase distribution φ by solving Equation (2).

Figure 4:
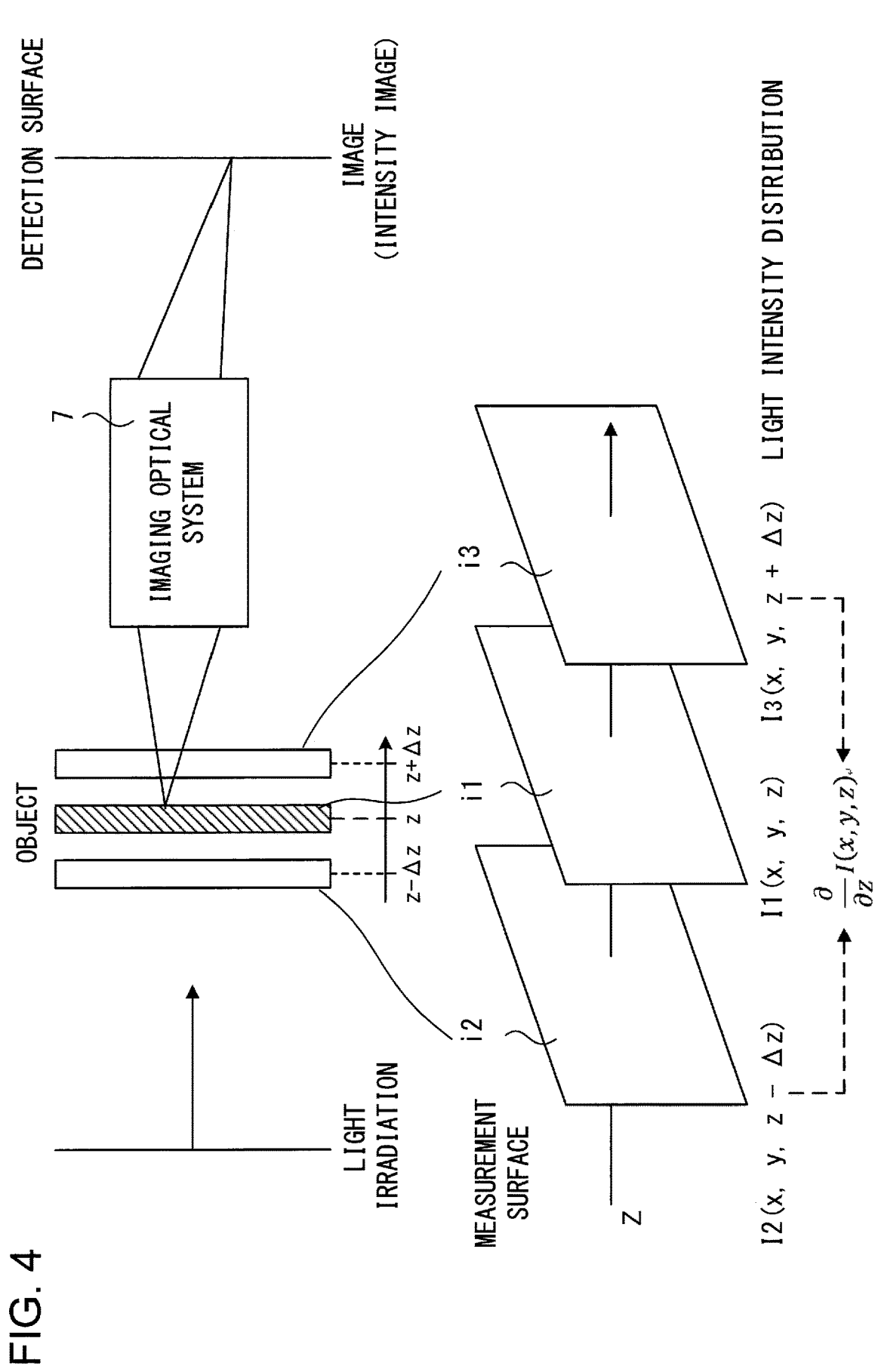
FIG. 4 is a conceptual figure for explanation of a measurement surface.

FIG. 4 is a figure for explanation of the method for detection of the light from the object S in order to perform the calculation of the phase distribution φ. First, it is necessary to obtain the light intensity distribution upon the measurement surface i1 of the object S and the differential coefficient distribution related to Z upon the measurement surface i1. For this, as shown in FIG. 4, the device control unit 51 sets the focal point of the objective lens 21a so that it is included in the desired measurement surface i1, causes an image of the object 9 to be formed upon the detection surface of the detection unit 9 by the imaging optical system 7, and detects the light from the object S with the detection unit 9. The detection signal from each pixel of the detection unit 9 is inputted to the control unit 50 (refer to FIG. 2), and light intensity distribution data, in which the position of each pixel and its light intensity based upon its detection signal are associated together, is generated by the phase restoration processing unit 521.

Light intensity distribution data is data representing the intensity distribution of light detected by the various pixels of the detection unit 9 corresponding to the positions of the coordinates (x,y) upon the measurement surface corresponding to a certain value of the coordinate Z. The light intensity distribution data is data specifying the light intensity corresponding to values of those coordinates (x,y,z), and is constructed in the format of a lookup table. For example, by performing two dimensional mapping of the light intensity distribution upon a measurement surface that corresponds to some value of Z while distinguishing color or tone gradations, it is possible to construct an image (hereinafter termed a "light intensity image") that shows the intensity distribution of light at that Z position.

It should be noted that the data structure of the light intensity distribution data is not particularly limited, provided that it is possible to extract the values of light intensity corresponding to the values of the coordinates X, Y, and Z; some other already existing data structure may be employed.

It is preferable for the position of the measurement surface i1 (in other words, the focal point position of the objective lens 21a) to be set to a position that is based upon the contrast of the light intensity of light, detected by the detection unit 9, from the object S. The device control unit 51 is able to set the position of the measurement surface i1 on the basis of parameters (i.e. parameters that specify the light intensity contrast of the light from the object S, such as the variance vz shown below or the like) calculated from the three dimensional light intensity distribution data of the object S acquired in advance (before performing the phase measurement of this embodiment). When acquiring the three dimensional light intensity distribution data described above in advance by the image capture, the position of the focal point in the object S during the image capture for acquiring this light intensity distribution data is not particularly limited, and may be set as appropriate.

For the three dimensional light intensity distribution data that has been acquired in advance, with the two dimensional light intensity distribution for the X direction and the Y direction corresponding to each value of Z being taken as Iz(x,y), the device control unit 51 calculates a variance value vz for the light intensity distribution corresponding to each value of Z according to the following Equation (11):

[Math. 3]

$$v_z = \frac{1}{N_x N_y} \sum_{x,y} \{I_z(x, y) - \overline{I_z}\}^2 \quad (11)$$

Here, Nx is the number of pixels in the X direction of the light intensity distribution data acquired in advance, Ny is the number of pixels in the Y direction of the light intensity distribution data acquired in advance, and a bar over "Iz" indicates an average value, such as the arithmetic average, of Iz(x,y) for all the (x,y) in that light intensity distribution data. The device control unit 51 sets the position of the measurement surface i1, in other words the focal point of the objective lens 21a, on the basis of the calculated variance vz corresponding to each value of Z. For example, among the calculated values of the variance vz, the device control unit 51 may set the position of the measurement surface i1 to a position in the Z direction that corresponds to the minimum variance vz. In other words, the device control unit 51 may set the position of the measurement surface i1 to a value of Z that corresponds to the light intensity distribution data with low contrast.

On the basis of the focal gap Δz that the optimum condition calculation unit 511 has calculated, the device control unit 51 sequentially sets the position of the focal point of the objective lens 21a upon the measurement surfaces i2 and i3, so that the positions of the focal point become positions respectively spaced by distances −Δz and +Δz along the Z axis from the position upon the measurement surface i1. The method for determining the concrete value of the focal gap Δz will be described hereinafter. When disposing the focal point of the objective lens 21a upon each of these measurement surfaces i2 and i3, the device control unit 51 forms an image of the object S upon the detection surface of the detection unit 9 with the imaging optical system 7, and detects light from the object S with the detection unit 9. Detection signals from the pixels of the detection unit 9 corresponding to each of the cases when the focal point of the objective lens 21a is disposed upon the measurement surfaces i2 and i3 are inputted to the control unit 50 (refer to FIG. 2), and, for each case, light intensity distribution data in which the position of each pixel and the light intensity based upon its detection signal are mutually associated is generated by the phase restoration processing unit 521.

It should be understood that the position at which the focal point of the objective lens 21a is disposed upon the XY plane in each of the measurement surfaces i1 through i3 is not particularly limited, provided that these positions are respectively present upon the measurement surfaces i1 through i3.

The respective generated light intensity distribution data sets corresponding to the measurement surface i2 and to the measurement surface i3 are employed for calculation of the differential coefficient with respect to z of the light intensity upon the measurement surface i1. The phase restoration processing unit 521 calculates dI/dz=(I3−I2)/2Δz, which corresponds to the differential coefficient with respect to z of the light intensity at the measurement surface i1, by dividing the difference between the values of the intensity at a point upon the measurement surface i2 and at a point upon the measurement surface i3 whose coordinates in the XY plane are at mutually corresponding positions, such as the same positions or the like, by the distance between the measurement surfaces i2 and i3, which is 2Δz. And the phase restoration processing unit 521 stores the data that has been calculated corresponding to the differential coefficient distribution of the light intensity with respect to z (hereinafter this will be termed the "differential coefficient distribution data) in the storage unit 44 or the like, as appropriate. This differential coefficient distribution data is data that specifies the distribution of the differential coefficient of the light intensity with respect to z corresponding to values of the coordinates x, y, and z, and is constructed in the form of a lookup table.

Incidentally, the data structure of the differential coefficient distribution data is not particularly limited, provided that it is possible to extract the values of the differential coefficients with respect to z corresponding to predetermined values of the coordinates x, y, and z; some already existing data structure could also be employed.

FIG. 5 shows an example of an arrangement of the focal point of the objective lens 21a and the measurement surfaces i1 through i3 when imaging the object S. In FIG. 5, the object S is mounted upon the stage 8. In FIG. 5, the Z axis is set to be parallel to the optical axis Lo of the objective lens 21a, and the direction from the object S toward the objective lens 21a is taken as being the + direction of the Z axis. Moreover, a light flux of light incident from the focal point position F to the objective lens 21a is schematically shown by double dotted chain lines L200. In FIG. 5, the focal point position F of the objective lens 21a is taken as being Z=Z0, and the plane orthogonal to the Z axis and including the point Z=Z0 is shown as being the measurement plane i1.

The device control unit 51 shifts the stage 8 by electrically driving it via a shifting device such as a motor or the like, and sets the focal point position of the objective lens 21a to each of the measurement surfaces i1, i2, and i3. Thus, the device control unit 51 sequentially disposes the focal point of the objective lens 21a at a plurality of positions mutually separated by focal gaps Δz along the optical axis Lo of the objective lens 21a. Here, "a plurality of positions mutually separated by focal gaps Δz along the optical axis Lo of the objective lens 21a" means the plurality of positions are mutually separated by distances Δz when that plurality of positions are projected upon the optical axis Lo of the objective lens 21a. Moreover, since the objective lens 21a is on the side of the stage 8 in the imaging optical system 7, accordingly the focal point position F of the objective lens 21a may also be rephrased as being the focal point position of the objective optical system 20 or of the imaging optical system 7.

The optimum condition calculation unit 511 of the device control unit 51 calculates the focal gap Δz according to the following Equation (100) by, in this embodiment, employing setting information for the microscope main body portion 100 and a parameter k which will be explained in detail hereinafter. Here, the setting information for the microscope main body portion 100 is information that is set for the microscope main body portion 100 in order to generate a quantitative phase image, for example information specifying the numerical aperture of the objective lens 21a, the wavelength of the illumination light L2, and the refractive index between the objective lens 21a and the object S.

[Math. 4]

$$\Delta_z = \frac{k\lambda}{5\left(n - \sqrt{n^2 - (NA)^2}\right)} \quad (100)$$

Here, λ is the wavelength of the illumination light L2, and is set by the device control unit 51 on the basis of input from the user to the input unit 41 or the like. And n is the refractive index between the objective lens 21a and the object S, and this is also set by the device control unit 51 on the basis of input from the user to the input unit 41 or the like. If the objective lens 21a is a dry objective lens, then, since the ambient atmosphere between the objective lens 21a and the object S is air, accordingly the device control unit 51 sets n to the refractive index of air, and for example may set n=1.00. On the other hand, if the objective lens 21a is an immersion objective lens, then the device control unit 51 sets the refractive index of the immersion liquid filled between the objective lens 21a and the object S as the refractive index n. Moreover, NA is the numerical aperture of the objective lens 21a, and is also set by the device control unit 51 on the basis of input from the user to the input unit 41 or the like. And the optimum condition calculation unit 511 calculates the focal gap Δz on the basis of the setting information for the microscope main body portion 100. In concrete terms, as shown by Equation (100), the optimum condition calculation unit 511 calculates the focal gap Δz on the basis of the following information: the numerical aperture NA of the objective lens 21a, the wavelength λ of the illumination light L2, and the refractive index N between the objective lens 21a and the object S.

Furthermore, the value of the parameter k is 1 or greater, and if k=1 in Equation (100), it is possible to perform phase restoration with the intensity transport equation up to a cutoff spatial frequency at which the performance of the objective lens 21a is taken advantage of at maximum. As the value of k becomes greater than 1, the spatial frequency at which it is possible to perform phase restoration becomes lower. In the following description, the parameter k is termed the "phase restoration parameter".

Incidentally, the difference between the actual phase value of the object S and the measured phase value is termed the "phase restoration error". Fundamentally the phase restoration error is small if the phase is restored at high spatial frequency. When the phase restoration error is small, since a phase that is close to the actual phase value (in other words, a phase at high accuracy) comes to be restored, accordingly the accuracy when restoring the phase (termed the "phase restoration accuracy") may be said to be high.

The optimum condition calculation unit 511 preferably sets the phase restoration parameter k to 25 or lower, and more preferably to 16 or lower. When the phase restoration parameter k becomes large, as described above, the spatial frequency at which it is possible to perform phase restoration becomes lower. When a focal gap Δz with k=25 is set, then the performance becomes equivalent to restoration up to a spatial frequency that is ⅕ of the cutoff spatial frequency of the objective lens 21a. On the other hand, when a focal gap Δz with k=16 is set, then the performance becomes equivalent to restoration up to a spatial frequency that is ¼ of the cutoff spatial frequency of the objective lens 21a. In observation of an object S (i.e. a phase body) such as a cell or the like of size from several μm to several hundreds of μm with visible light, if the phase restoration parameter k is set to a comparatively large value of 25 or less, then this is preferable for detecting the entire cell; but, if the parameter k is set to 16 or less, then this is preferable since it becomes easier to detect comparatively large structural elements within the cell such as a nucleus or the like.

It should be understood that while, in the example described above, the value of the parameter k is determined so as to correspond to restoration up to a spatial frequency that is ⅕ or ¼ of the cutoff spatial frequency of the objective lens 21a, the value of the parameter k is not limited to such a value, and may be set according to the resolving power required for phase measurement of the object S.

The following Table 1 shows examples of numerical value ranges when, based upon Equation (100), the optimum condition calculation unit 511 sets the focal gap Δz for illumination light L2 wavelengths λ of 340 nm, 400 nm, 550 nm, 700 nm, and 1300 nm, and sets the phase restoration parameter k in the range from 1 to 16.

TABLE 1

| illumination wavelength λ | 340 nm | 400 nm | 550 nm | 700 nm | 1300 nm |
|---|---|---|---|---|---|
| objective lens | range of Δz | range of Δz | range of Δz | range of Δz | range of Δz |
| dry objective lens 10 × NA0.30 (n = 1) | 1.48 μm ≤ Δz ≤ 23.6 μm | 1.74 μm ≤ Δz ≤ 27.8 μm | 2.39 μm ≤ Δz ≤ 38.2 μm | 3.04 μm ≤ Δz ≤ 48.6 μm | 5.64 μm ≤ Δz ≤ 90.3 μm |

TABLE 1-continued

| illumination wavelength λ | 340 nm | 400 nm | 550 nm | 700 nm | 1300 nm |
|---|---|---|---|---|---|
| dry objective lens 20 × NA0.75 (n = 1) | 0.20 μm ≤ Δz ≤ 3.2 μm | 0.24 μm ≤ Δz ≤ 3.8 μm | 0.32 μm ≤ Δz ≤ 5.2 μm | 0.41 μm ≤ Δz ≤ 6.6 μm | 0.77 μm ≤ Δz ≤ 12.3 μm |
| dry objective lens 40 × NA0.95 (n = 1) | 0.10 μm ≤ Δz ≤ 1.6 μm | 0.12 μm ≤ Δz ≤ 1.9 μm | 0.16 μm ≤ Δz ≤ 2.6 μm | 0.20 μm ≤ Δz ≤ 3.3 μm | 0.38 μm ≤ Δz ≤ 6.0 μm |
| objective lens 60 × NA1.20 (n = 1.33) | 0.09 μm ≤ Δz ≤ 1.4 μm | 0.11 μm ≤ Δz ≤ 1.7 μm | 0.15 μm ≤ Δz ≤ 2.3 μm | 0.19 μm ≤ Δz ≤ 3.0 μm | 0.34 μm ≤ Δz ≤ 5.5 μm |
| objective lens 100 × NA1.40 (n = 1.51) | 0.07 μm ≤ Δz ≤ 1.2 μm | 0.08 μm ≤ Δz ≤ 1.4 μm | 0.12 μm ≤ Δz ≤ 1.9 μm | 0.15 μm ≤ Δz ≤ 2.4 μm | 0.28 μm ≤ Δz ≤ 4.4 μm |

During measurement of the phase while, in particular, employing visible light as the illumination light, it is desirable for the optimum condition calculation unit 511 to set the focal gap Δz to no less than 0.07 μm and to no greater than 90.3 μm, on the basis of the results in Table 1 in which the focal gap Δz has been calculated for objective lenses 21 of various types while taking the phase restoration parameter k in the range of 1 through 16. When the focal gap Δz is no less than 0.07 μm and no greater than 90.3 μm, one of the objective lenses 21 whose numerical aperture NA is in the range of 0.3 through 1.40 or the like is used, and it is possible to perform phase restoration with high accuracy from ¼ of the cutoff spatial frequency to the entire cutoff spatial frequency. In other words, for objective lenses 21 of many types, it is possible to perform phase restoration with high accuracy over the greater portion of the cutoff spatial frequency of the objective lens 21 (that is to say, by taking advantage of the performance of the objective lens 21). It should be understood that, although the range of the numerical aperture NA of the objective lens 21 has been taken as being 0.3 through 1.40, this range is not to be considered as being limitative; it would be possible to employ an objective lens 21 having any desired numerical aperture NA. Moreover, although the wavelength of the illumination light L2 has been set to 340 nm, 400 nm, 550 nm, 700 nm, and 1300 nm, i.e. as centering on visible light, this range is not to be considered as being limitative; it would be possible to include other wavelengths in the visible region, and it would also be possible to include wavelengths in the ultraviolet region or in the infrared region.

Here, if the focal gap Δz is too short (in other words, if the parameter k is too small), then this is not desirable, because the phase restoration error increases rather than being improved, due to disturbances such as noise like background noise and so on when performing phase restoration according to the intensity transport equation (Equations (1) and (2)) or drive errors or the like when shifting the focal point position. On the other hand, if the focal gap Δz is too great (in other words, if the parameter k is too great), then the spatial frequency at which phase restoration is possible decreases. Accordingly, when for example the focal gap Δz is set to no less than 0.09 μm and no greater than 12.3 μm, then it is possible to perform phase restoration with better accuracy over the greater portion of the cutoff spatial frequency of that objective lens 21, with employing one of the objective lenses 21 having comparatively wide range such as one with numerical aperture NA from 0.75 to 1.25 or the like. Furthermore, when the focal gap Δz is set to no less than 0.10 μm and no greater than 6.0 μm, then it is possible to perform phase restoration with yet better accuracy over the greater portion of the cutoff spatial frequency of that objective lens 21, with employing one of the objective lenses 21 having numerical aperture NA of approximately 0.95 or the like.

It should be understood that, in Table 1 above, the range for k in Equation (100) was set with k=16 as an upper limit value, which is the condition that it should be possible to perform phase restoration up to ¼ of a cutoff spatial frequency, but it would also be acceptable for the optimum condition calculation unit 511 to set the focal gap Δz on the basis of a point spread function (Point Spread Function: PSF) regarding the objective lens 21a. As one example, the optimum condition calculation unit 511 may set the focal gap Δz on the basis of Equation (100) by taking k in the range of 5 or less, on the basis of the condition regarding k=5 when the first dark ring of the above described point spread function (PSF) is taken as reference. As one example, it would also be acceptable to arrange for the optimum condition calculation unit 511 to set the focal gap Δz on the basis of Equation (100) as the range of k taken to be 1 or greater and 5 or less, by adding the condition (k=1) for phase restoration to be possible up to the cutoff spatial frequency of the objective lens 21a, as described above.

Figure 6:
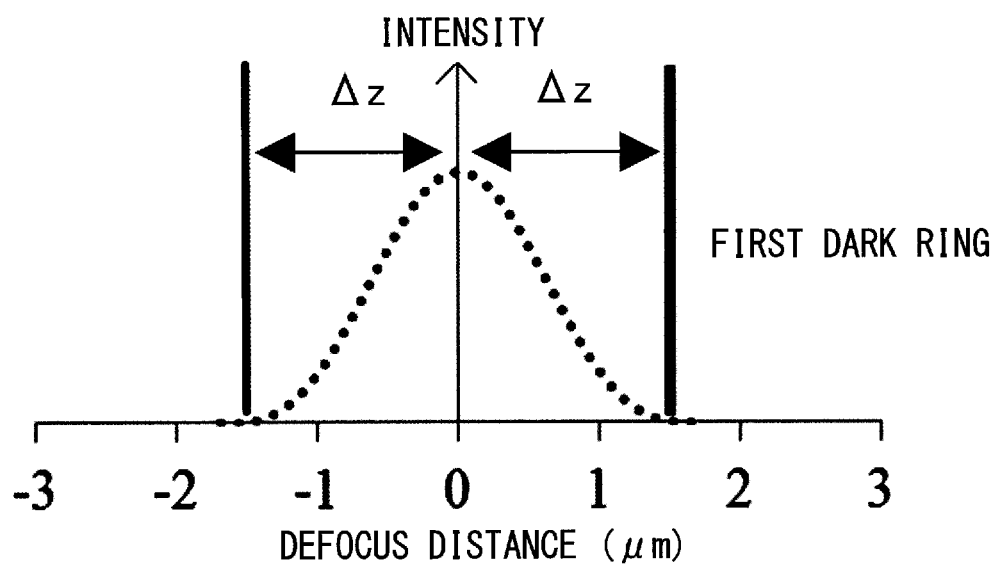
FIG. 6 is a conceptual figure for explanation of a method for setting the focal gap.

FIG. 6 is a figure showing the relationship between the point spread function and the defocus distance. The conditions for the objective lens in order to obtain the point spread function (PSF) shown in FIG. 6 are that the magnification is 20×, the numerical aperture NA is 0.75 (dry type), and the wavelength of the light is 550 nm. The distance along the optical axis (the Z axis) of the objective lens 21a from its focal point position F (i.e. the defocus distance) is shown along the horizontal axis. And the intensity of the point spread function PSF on the Z axis corresponding to each defocus distance is shown along the vertical axis. The position of the first dark ring corresponding to the phase restoration parameter k=5 is the position upon the Z axis where the intensity of the point spread function PSF becomes zero, and is the position where its absolute value is minimum. The optimum condition calculation unit 511 is able to perform phase restoration at high accuracy up to high spatial frequency by setting the focal gap Δz on the basis of the distance between the focal point position F and the position of the first dark ring.

Figure 7A:
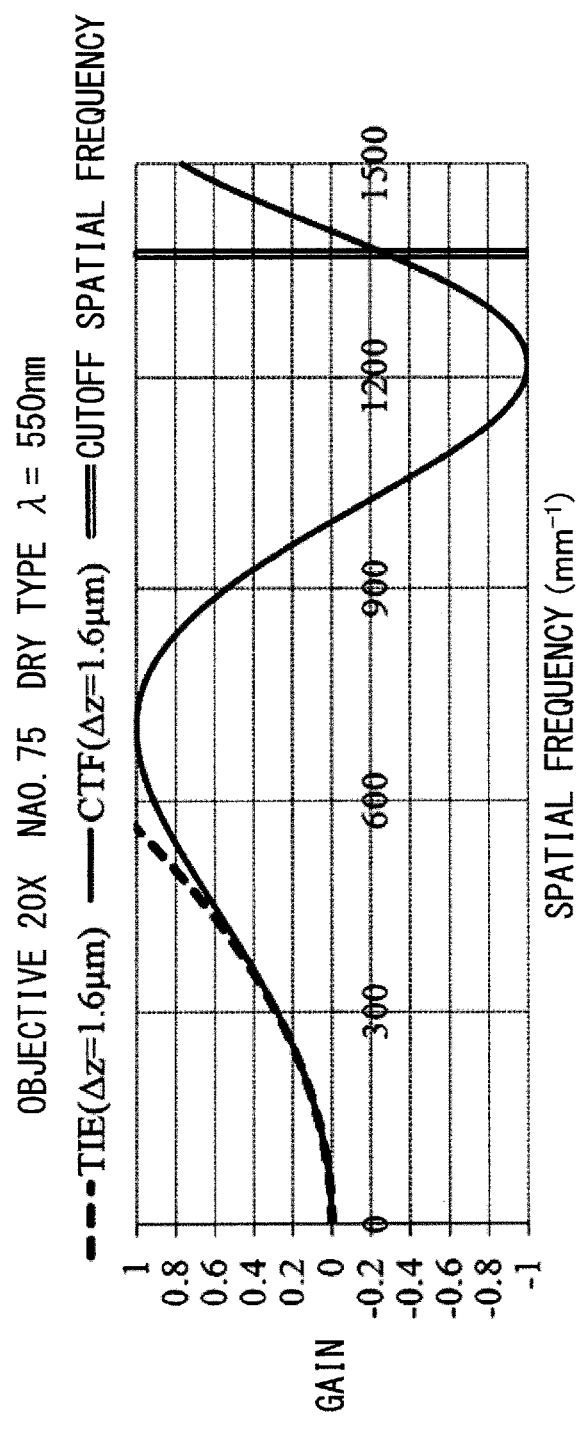
FIGS. 7A and 7B consist of a pair of graphs showing contrast transfer functions.

FIG. 7A shows the relationship between the spatial frequency and the phase restoration gain, with the wavelength λ of the illumination light being 550 nm, the magnification of the objective lens 21a being 20×, the numerical aperture NA being 0.75 (dry type), and the focal gap Δz being taken as the distance that the first dark ring moves along the Z axis (Δz=1.6 μm). The phase restoration gain is derived by Fresnel-Kirchoff integration related to the light intensity distribution created by the wave front that has passed through the object S (i.e. the phase body) on a plane at distance z, and is shown by the contrast transfer function (Contrast Transfer Function: CTF, the solid line) that changes on the basis of the focal gap Δz.

The broken line in the figure indicated by "Transport Intensity Equation: TIE" is a phase restoration gain curve based upon the intensity transport equation, and, since the intensity transport equation is a function that approximates a CTF function, accordingly two gain curves (CTF and TIE) are shown that are dissociated at high frequencies. In the frequency region in which the two curves shown by "CTF" and "TIE" almost match, it is possible to restore an accurate phase value (i.e. a highly accurate one) on the basis of the intensity transport equation. It should be understood that the cutoff spatial frequency that is obtained with a value derived by dividing the numerical aperture NA by the wavelength λ of the illumination light L2 is shown at the position of the spatial frequency corresponding to the double line parallel to the vertical axis.

Figure 7B:
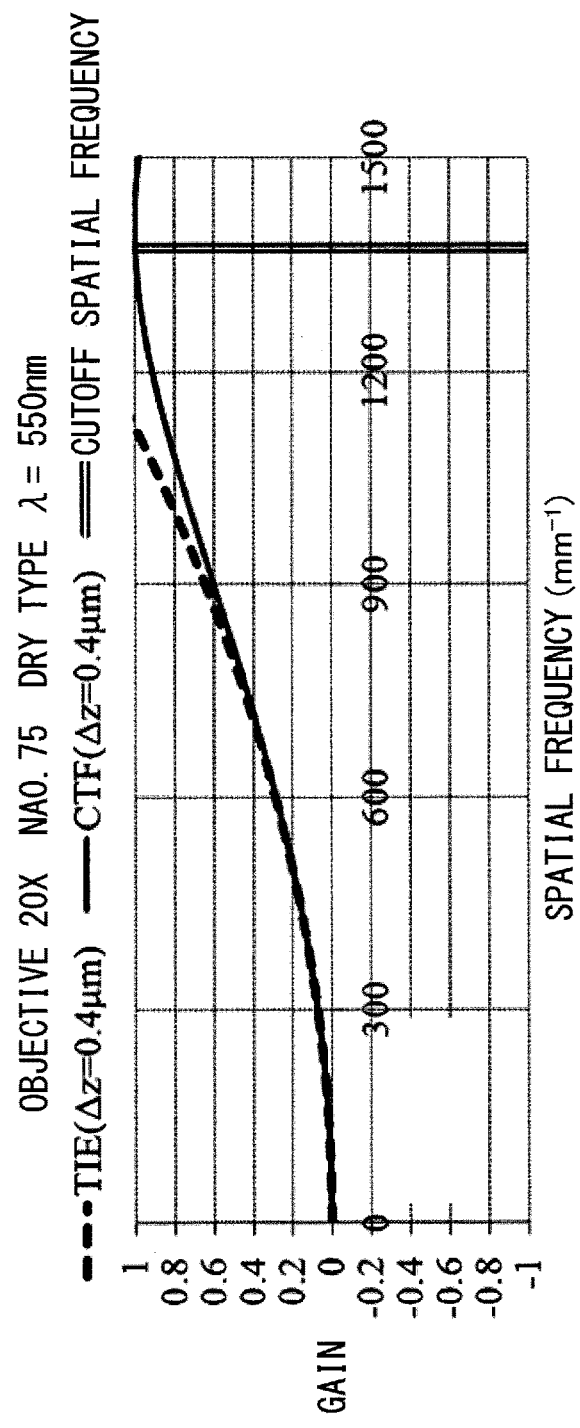

And FIG. 7B shows the relationship between the spatial frequency and the phase restoration gain, with the wavelength λ of the illumination light, the magnification of the objective lens 21a, and the numerical aperture NA being the same as in the case of FIG. 7A, and with the focal gap Δz being taken as 0.4 μm. Comparing FIG. 7A and FIG. 7B, in the case of FIG. 7B where the focal gap Δz is shorter, it will be understood that the frequency region where the CTF and the TIE approximately match with one another is wider, and that it is possible to perform phase restoration up to a frequency range that is closer to the cutoff spatial frequency In Equation (100) described above where the focal gap Δz is derived, if the phase restoration parameter k is kept fixed, it is possible to change the specifications of the objective lens 21 by exchanging the objective lens 21 or the like while maintaining the phase restoration accuracy. Here, maintaining the phase restoration accuracy means that, when the objective lens 21 is exchanged, variation in the value of the phase is suppressed.

FIGS. 8A to 8C show the contrast transfer function under the condition that it is possible to perform phase restoration up to the cutoff spatial frequency, when the focal gap Δz is changed according to Equation (100) on the basis of the numerical aperture NA and so on, while keeping the phase restoration parameter k fixed. FIGS. 8A, 8B, and 8C respectively show cases in which the numerical aperture NA is 0.3, 0.75, and 0.95. In each of FIGS. 8A, 8B, and 8C, the value of gain (shown along the vertical axis) at which the contrast transfer function (CTF) starts to separate from the transfer function (TIE) on the basis of the intensity transport equation is the same. In FIG. 8A, the frequency region in which the CTF and the TIE match with one another is included in the frequency regions in which the CTF and the TIE match with one another shown in FIGS. 8B and 8C. Accordingly, when the objective lens 21 is exchanged, it is possible to keep the phase value during phase restoration almost constant by changing the focal gap Δz in accordance with the numerical aperture NA of the objective lens 21 and the like on the basis of Equation (100) while keeping the phase restoration parameter k fixed. For example, in the case of a cell structure or the like having size corresponding to the frequency region in which it is possible to perform phase restoration when the numerical aperture NA of the objective lens 21 is 0.3, the same phase value is calculated on the basis of Equation (100) even when the objective lens 21 is exchanged for one whose numerical aperture NA is 0.75 or 0.95. Accordingly, the variation in phase obtained as a result of phase restoration is small even when the objective lens 21 is changed over for the same object S, so that it becomes possible to analyze the object S quantitatively.

FIGS. 9A to 9C show the contrast transfer function under the condition that it is possible to perform phase restoration up to ¼ of the cutoff spatial frequency, when the focal gap Δz is changed according to Equation (100) on the basis of the numerical aperture NA and so on, while keeping the phase restoration parameter k fixed. It should be understood that the cutoff spatial frequencies shown by the double lines parallel to the vertical axes are ¼ of the cutoff spatial frequencies (i.e. the frequencies corresponding to the double lines parallel to the vertical axes in FIGS. 8A through 8C respectively) shown in FIGS. 8A through 8C, respectively. In this case as well, the values of gain at which the contrast transfer function starts to separate from the transfer function on the basis of the intensity transport equation are approximately the same. Accordingly, in this case as well, in a similar manner to the cases explained using FIGS. 8A through 8C, the variation in phase obtained as a result of phase restoration can be kept small even when the objective lens 21 is exchanged, by changing the focal gap Δz on the basis of Equation (100).

It should be noted that the value of the transfer function approaches zero asymptotically as the spatial frequency decreases. In this type of low frequency region where the spatial frequency is in the neighborhood of zero, when calculating the differential operator ∇XY, sometimes the calculated value diverges due to division by zero. When FIGS. 7A and 7B are compared together, in FIG. 7B, since the transfer function increases gently along with increase of the spatial frequency from zero, accordingly, as described above, the calculated value can diverge, which has an influence upon the result of phase measurement. In order to avoid this type of influence, it is possible to eliminate noise in the portion that corresponds to the low frequency region, in case that the values of the phase obtained by phase measurement in a low frequency region where the transfer function is less than or equal to some predetermined value such as, for example, 0.2, 0.1, or the like may be calculated while weighting them lower than the phase values in a higher frequency region or may be performed a Fourier transformation from the actual coordinate space to frequency space upon the light intensity distribution data by weighting and/or with a high pass filter.

Furthermore, it is desirable also to eliminate the noise in a portion corresponding to a frequency region higher than the cutoff spatial frequency when performing a Fourier transform of the light intensity distribution data from the actual coordinate space to the frequency space, with a low pass filter in an appropriate manner. It would also be possible to arrange for the device control unit 51 to calculate the cutoff spatial frequency NA/λ from the numerical aperture NA of the objective lens 21a and the wavelength λ of the illumination light L2 that have been set by user input or the like, and to eliminate the noise in a portion corresponding to a high frequency region of the light intensity distribution data when performing a Fourier transform from the actual coordinate space to the frequency space, with a weighting filter on the basis of this cutoff spatial frequency that has thus been calculated. Furthermore, as particularly shown in FIG. 7A, also for the components of the light intensity distribution data that correspond to frequency regions other than the frequency region in which the two curves shown by the contrast transfer function (CTF) and the transfer function (TIE) based upon the energy transport equation almost coincide (in other words, that correspond to frequency regions where phase restoration is not performed), it is desirable to perform elimination with a low pass filter, since they can become noise during phase restoration.

As described above, by adjusting the value of the focal gap $\Delta z$, it is possible to enhance the accuracy when performing phase restoration, but it is also possible to increase the accuracy during phase restoration by adjusting the sampling gap upon the object S other than by adjusting the focal gap $\Delta z$.

Figure 10:
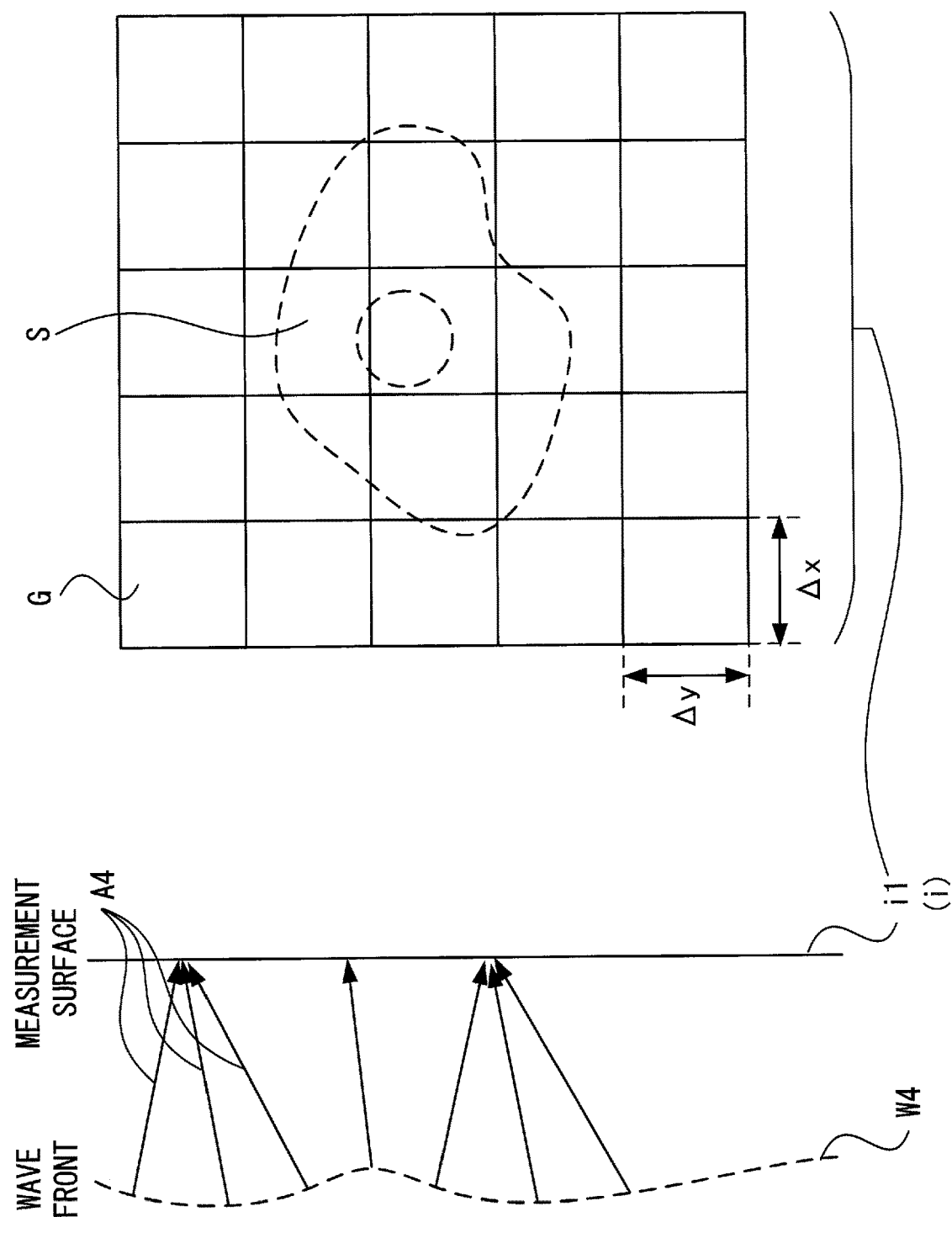
FIG. 10 is a conceptual figure for explanation of a sampling gap.

FIG. 10 is a figure for explanation of the sampling gap. As described above with reference to FIG. 3, a wave front W4 that has passed through the object S and has become non-planar forms a light intensity distribution based upon changes of the phase upon the measurement surfaces i1 through i3 (hereinafter the generic term "measurement surface i" will sometimes be employed for the measurement surfaces i1 through i3). The figure on the right side of FIG. 10 is a conceptual figure in which a measurement surface i is viewed from the optical center of the objective lens 21a, and shows portions G corresponding to each of pixels of the detection unit 9. These portions G corresponding to the individual pixels are arranged so as to cover a region corresponding to the object S in the form of a grid. In the following embodiments, the sampling gaps $\Delta x$ and $\Delta y$ are the widths of the portions G corresponding to each of the pixels upon the measurement surface i to which the focal point position of the objective lens 21a is set in this manner.

If the pixel size of the detection unit 9 is taken as P and the horizontal magnification of the imaging optical system 7 is taken as $\beta$, then the sampling gaps $\Delta x$ and $\Delta y$ become $\Delta x = \Delta y = P/\beta$. Here, the pixel size of the detection unit 9 means, in the case of a CCD or the like, the width of each pixel; and, in the case of a scanning type microscope as in Variant Embodiment 6 that employs a laser scanning type fluorescence observation unit that will be described hereinafter, the pixel size P is the value obtained by dividing the number of fields of view (diagonally) by the scanning magnification. In the following, the sampling gap will be referred to as $\Delta x$. And the horizontal magnification $\beta$ of the imaging optical system 7 is the magnification $\beta 1$ of the objective lens 21a multiplied by the magnification $\beta 2$ of the relay optical system 30.

Figure 11A:
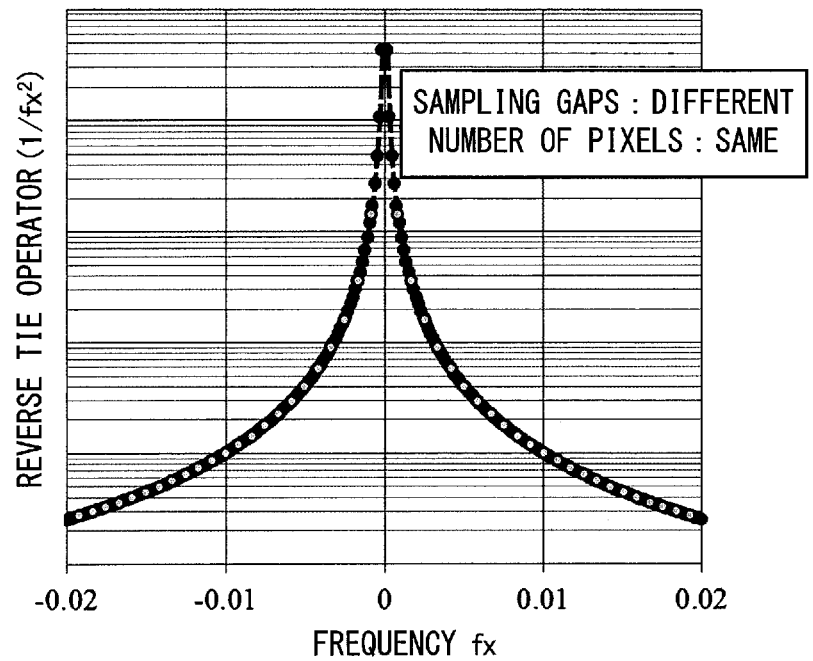
FIGS. 11A and 11B are a pair of graphs showing frequency gain when restoring the phase.

FIG. 11A is a figure showing the frequency gains in the cases of phase restoration under two measurement conditions in which the sampling gaps $\Delta x$ are different from one another and the number of pixels N are the same as one another. In this figure, with the data (the broken line) for which the sampling gap $\Delta x$ is larger and $\Delta x=1.6$ a frequency gain that is larger in the vicinity of zero frequency is shown. When the sampling gap $\Delta x$ becomes large, the frequency sampling increases in order to perform restoration in the low frequency region more satisfactorily, so that the accuracy during phase restoration is reduced due to noise included in the light intensity distributions I1, I2, and I3 (refer to FIG. 4). Conversely, when the sampling gap $\Delta x$ becomes smaller, deterioration of the accuracy when performing phase restoration due to noise included in the light intensity distributions I1, I2, and I3 is suppressed.

According to FIG. 11A, the larger is the sampling gap $\Delta x$, the more the accuracy when performing phase restoration decreases due to noise included in the light intensity distributions I1, I2, and I3, and moreover, since the sampling gap $\Delta x$ depends upon the magnification $\beta$ and is obtained according to $\Delta x = P/\beta$, accordingly, with an objective lens 21a of high magnification, decrease of the accuracy when performing phase restoration due to noise included in the light intensity distributions I1, I2, and I3 is suppressed, as compared with an objective lens 21a of low magnification.

Figure 11B:
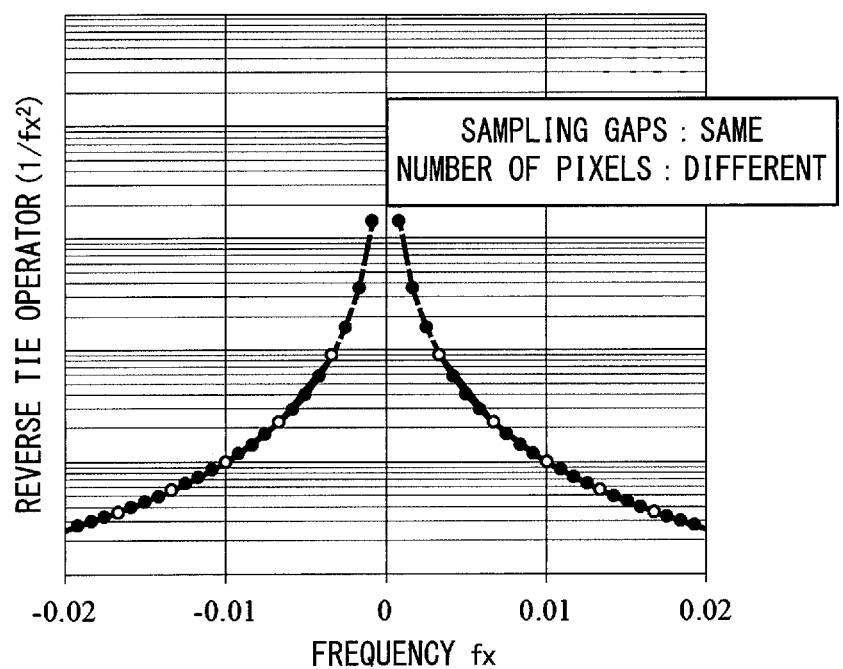

FIG. 11B is a figure showing the frequency gains in the cases of phase restoration under two measurement conditions in which the sampling gaps $\Delta x$ are the same as one another and the number of pixels N are different from one another. With the data (the broken line) for which the number of pixels N is larger (N=4096), a frequency gain that is larger in the vicinity of zero frequency is shown. When the number of pixels N becomes large, it is possible more accurately to restore the low frequency components of the phase body, in other words its large structural elements. On the other hand, when the number of pixels is large, the accuracy when performing phase restoration is deteriorated due to noise included in the light intensity distributions I1, I2, and I3.

Figure 12A:
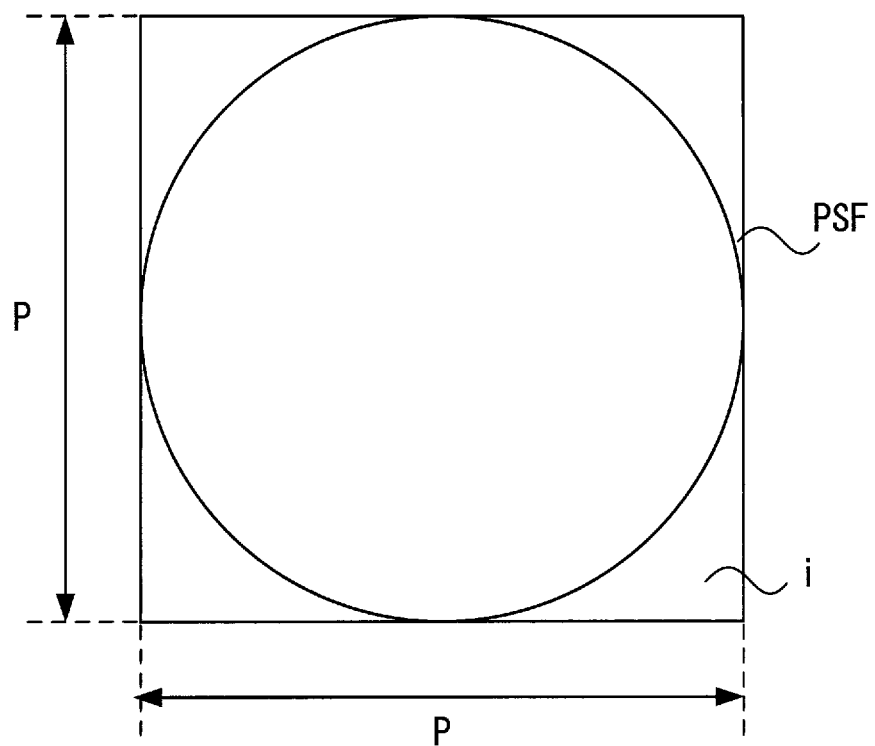
FIGS. 12A and 12B are a pair of conceptual figures showing methods of setting the sampling gap.

FIG. 12A is a conceptual figure showing a method for setting the sampling gap $\Delta x$. The optimum condition calculation unit 511 sets the magnification $\beta$ of the imaging optical system 7 on the basis of the size of the Airy disk of the point spread function (PSF). In FIG. 12A, a case is schematically shown in which the width of the diameter of the Airy disk of the point spread function (PSF) projected upon the detection surface of the detection unit 9 is equal to the width of the pixel size P. It is desirable for the optimum condition calculation unit 511 to set the magnification $\beta$ of the imaging optical system 7 so that the diameter of the Airy disk of the point spread function (PSF) projected upon the detection surface of the detection unit 9 becomes greater than the width of the pixel size P. Or, alternatively, it is desirable for the optimum condition calculation unit 511 to set the magnification $\beta$ of the imaging optical system 7 so that the area of the Airy disk of the point spread function (PSF) projected upon the detection surface of the detection unit 9 becomes greater than the area of the pixel size P. In this case, the sampling gap $\Delta x = P/\beta$ is set on the basis of the wavelength $\lambda$ of the illumination light and the numerical aperture NA of the objective lens 21a, so as to satisfy the following Equation (3).

[Math. 5]

$$\frac{P}{\beta} < \frac{1.22\lambda}{NA} \quad (3)$$

When the sampling gap $\Delta x$ is set so as to satisfy Equation (3), since it is possible to prevent under sampling in which the area of one pixel is larger than the point spread function), accordingly it is possible to suppress decrease of the image quality due to under sampling.

When the wavelength $\lambda$ of the illumination light L2, the numerical aperture NA of the objective lens 21a, the pixel size P, and the horizontal magnification $\beta$ of the imaging optical system 7 satisfy Equation (3), then the optimum condition calculation unit 511 (refer to FIG. 2) may set, as one example, the number of the measurement surfaces i, in other words the number of positions where the focal point of the objective lens 21a is disposed, to three. The condition for satisfying Equation (3) is the condition that the sampling gap Δx is sufficiently small, and it then becomes possible to perform phase restoration with a small number of imaging episodes, since decrease of the accuracy when performing phase restoration due to noise included in the light intensity distributions I1, I2, and I3 is suppressed as previously described. On the other hand, if Equation (3) is not satisfied, then the number of positions where the focal point of the objective lens 21a is disposed is set to a number greater than three. If Equation (3) is not satisfied, then the sampling gap Δx becomes large, and, in order to suppress the influence of noise upon image processing, it is desirable to acquire a large number of light intensity images for phase restoration by imaging. It should be understood that the number of positions where the focal point of the objective lens 21a is disposed may also be expressed, as appropriate, as the number of light intensity images, or the amount of light intensity distribution data, or the number of image capture by the detection unit 9, or the like.

Figure 12B:
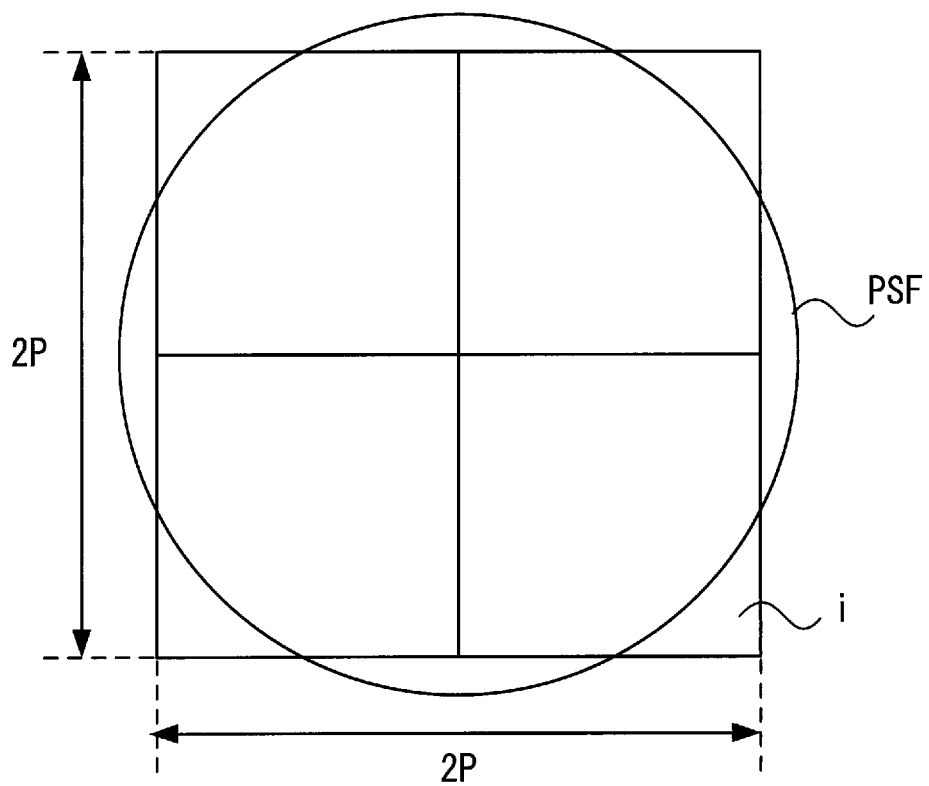

And FIG. 12B is a conceptual figure showing another method for setting the sampling gap Δx. It is desirable for the optimum condition calculation unit 511 to set the magnification β of the imaging optical system 7 so that the area of the Airy disk of the point spread function (PSF) projected upon the detection surface of the detection unit 9 becomes four or five times the area of the pixel size P. Due to this, it is possible to suppress deterioration of the accuracy during phase restoration due to noise in the light intensity distributions I1, I2, and I3 by yet a further level.

When, as described above, the optimum condition calculation unit 511 has set the number of positions where the focal point of the objective lens 21a are to be disposed and the focal gap Δz, the device control unit 51 performs image capture of the object S on the basis of the number of positions where the focal point of the objective lens 21a is to be disposed and the focal gap Δz that have thus been set. The detection signal that has been obtained by the detection unit 9 detecting the light from the object S is inputted to the phase restoration processing unit 521 of the analysis unit 52 (refer to FIG. 2).

The analysis unit 52 processes the detection signal inputted from the detection unit 9. And the analysis unit 52 functions as an image generation unit that generates light intensity distribution data from this detection signal, and that generates a quantitative phase image based upon this light intensity distribution data. Moreover, the analysis unit 52 performs analysis on the basis of the phase of the object S that has thus been restored on the basis of the light intensity distribution data.

The phase restoration processing unit 521 of the analysis unit 52 generates light intensity distribution data in which the position of each pixel of the detection unit 9 is associated with a light intensity based upon the detection signal that has been inputted, and stores this data in the storage unit 44 or the like, as appropriate. On the basis of the intensity transport equations (1) and (2) and the focal gap Δz and so on set by the optimum condition calculation unit 511, the phase restoration processing unit 521 generates, from the light intensity distribution data that has thus been generated, data (hereinafter termed the phase distribution data) corresponding to the phase distribution φ upon the object S including the measurement surface i1 and so on, and stores this data in the storage unit 44 or the like, as appropriate. This phase distribution data is data in which the phase is associated with values of the coordinates x, y, and z, and is constructed in the form of a lookup table.

It should be understood that, the data structure of the phase distribution data is not particularly limited, provided that it is possible to extract the phase values that correspond to predetermined values of the coordinates x, y, and z; it would also be possible to employ some other already existing data structure.

If the optimum condition calculation unit 511 has set the number of positions at which the focal point of the objective lens 21a is to be disposed to more than three on the basis of Equation (3), then it is desirable for the phase restoration processing unit 521 to perform phase restoration from the light intensity distribution data by employing the Savitzky-Golay method (hereinafter termed the SG method), as described in detail below.

Figure 13A:
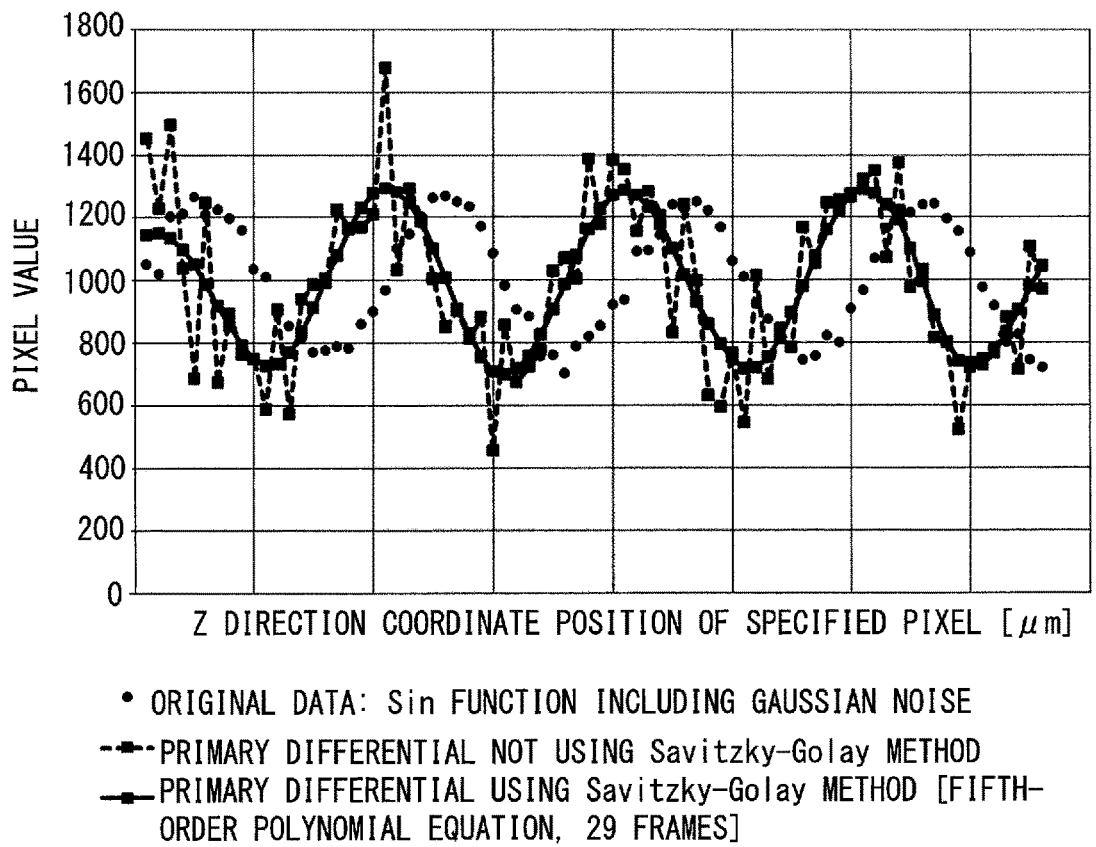
FIGS. 13A and 13B consist of a pair of figures for explanation of the Savitzky-Golay method (i.e. the SG method)
Figure 13B:
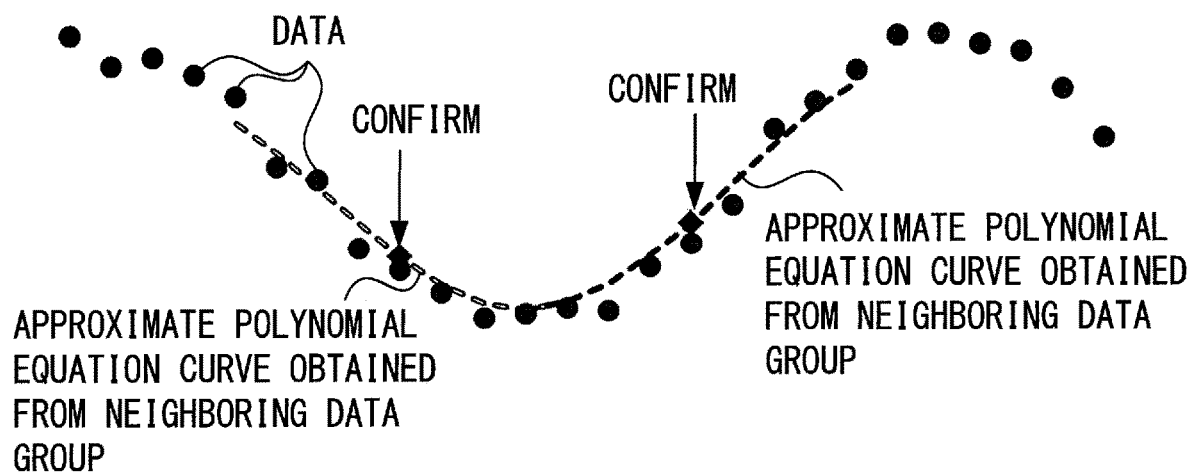

FIGS. 13A and 13B are figures for explanation of the Savitzky-Golay method (i.e. the SG method). The "original data" plot in FIG. 13A is a figure showing the Z direction coordinate positions of the light intensity distribution data at a specified pixel corresponding to a plurality of measurement surfaces i indicated along the horizontal axis, and the pixel value of the light intensity distribution data for that specified pixel corresponding to each Z direction coordinate position indicated along the vertical axis. In the example of FIG. 13A, for convenience in explanation of the influence upon the primary differential due to noise, it is supposed that the original data is a sine function that includes Gaussian noise. The broken line and solid line graphs respectively show data for a primary differential which is obtained by direct subtraction without using the SG method for a sine function to which Gaussian noise as original data is added, and data for a primary differential which is calculated by using the SG method for the sine function. When calculating the difference from an arbitrary function, if neighboring function values are directly subtracted from the measured data, then data will be obtained with undesirably large deviations, as in the case of the data "primary differential not using the Savitzky-Golay method" (the broken line) of FIG. 13A.

And FIG. 13B is a conceptual figure for explanation of the SG method. In the SG method, the differential from two adjacent points is not calculated, but rather a differential is calculated in which an approximate polynomial equation curve is calculated from three or more points, including neighboring data points. Due to this, it is possible to acquire data for a primary differential in which the influence due to noise is small, as compared to a case in which the SG method is not used, as in the case of the data "primary differential using the Savitzky-Golay method" (the solid line) shown in FIG. 13A.

On the basis of the phase distribution data generated by the phase restoration processing unit 521, the image construction unit 522 (refer to FIG. 2) constructs a two dimensional or three dimensional quantitative phase image, and stores it in the storage unit 44 or the like. Here, this quantitative phase image is an image in which the phase is represented (i.e. is converted into an image) by multiplying change in the thickness of the object by change of its refractive index. In concrete terms, as one example, the quantitative phase image may be an image in which the gradation value is set according to the phase value that has been calculated with the intensity transport equations (Equations (1) and (2)). As one example, the quantitative phase image may be an image in which gray scale gradations are set in proportion to the magnitudes of the phase values. In this case, in the quantitative phase image, it is possible visually to recognize height information about the thickness (i.e. the height) of the object S in the Z direction from the gradation values (i.e. the magnitudes of the phase values). Furthermore, on the basis of the phase distribution data or the quantitative phase image described above, and on the basis of the light intensity distributions I1, I2, and I3, the image construction unit 522 constructs images such as a phase contrast image, a differential interference image, a dark field image, a contrast observation image, and so on. In the following, the phase contrast image, the differential interference image, the dark field image, and the contrast observation image obtained by calculation processing by the image construction unit 522 will respectively be termed the "calculated phase contrast image", the "calculated differential interference image", the "calculated dark field image", and the "calculated contrast observation image". It should be understood that the quantitative phase image is not to be considered as being limited to an image in which gradation value is set according to the phase values calculated with the intensity transport equations (Equations (1) and (2)); it would also be possible for it to be an image in which the gradation value is set according to phase value calculated by some other already existing method.

A sample, such as a cell or the like, whose thickness in the Z direction is lower as compared to its width in a direction orthogonal to the Z direction is termed a "low contrast body". In the following, under the assumption that the object S is a low contrast body, a method will be explained of constructing a calculated phase contrast image, a calculated differential interference image, a calculated dark field image, and a calculated contrast observation image. The imaging equation for a low contrast body is given by Equation (4) below.

[Math. 6]

$$I(x,y) \approx \iint dxdy\, Re[EPSF(x,y)] - \varphi(x,y) \otimes Im[EPSF(x,y)] + P(x,y) \otimes Re[EPSF(x,y)] \quad (4)$$

Here, the symbol with a cross inside a circle indicates a folding integral. The function EPSF (effective point image distribution, Effective Point Spread Function) is a quantity defined by the following Equation (5).

[Math. 7]

$$EPSF(x,y) = C \iint d\xi_s d\eta_s \iint d\xi_s d\eta_s S(\xi_s,\eta_s) G(\xi+\xi_s,\eta+\eta_s) G^* (\xi_s,\eta_s) \exp(ik(\xi x+\eta y)) \quad (5)$$

Here, S represents a light source intensity distribution, G represents a pupil function, φ represents a phase distribution for the object S generated by the phase restoration processing unit 521 when the object S is taken as a low contrast object, and P(x,y) represents the amplitude distribution of the object S. The phase distribution φ can be obtained from the quantitative phase image or from the phase distribution data and the amplitude distribution can be obtained from the light intensity distribution data, while the light source intensity distribution and the pupil function are set according to the specifications of the microscope main body portion 100. For example since, in the case of phase difference observation, S corresponds to the light intensity distribution at the ring iris and G corresponds to the pupil function of the objective lens that is employed for phase difference observation, accordingly the EPSF may be calculated by using these values.

Figure 14:
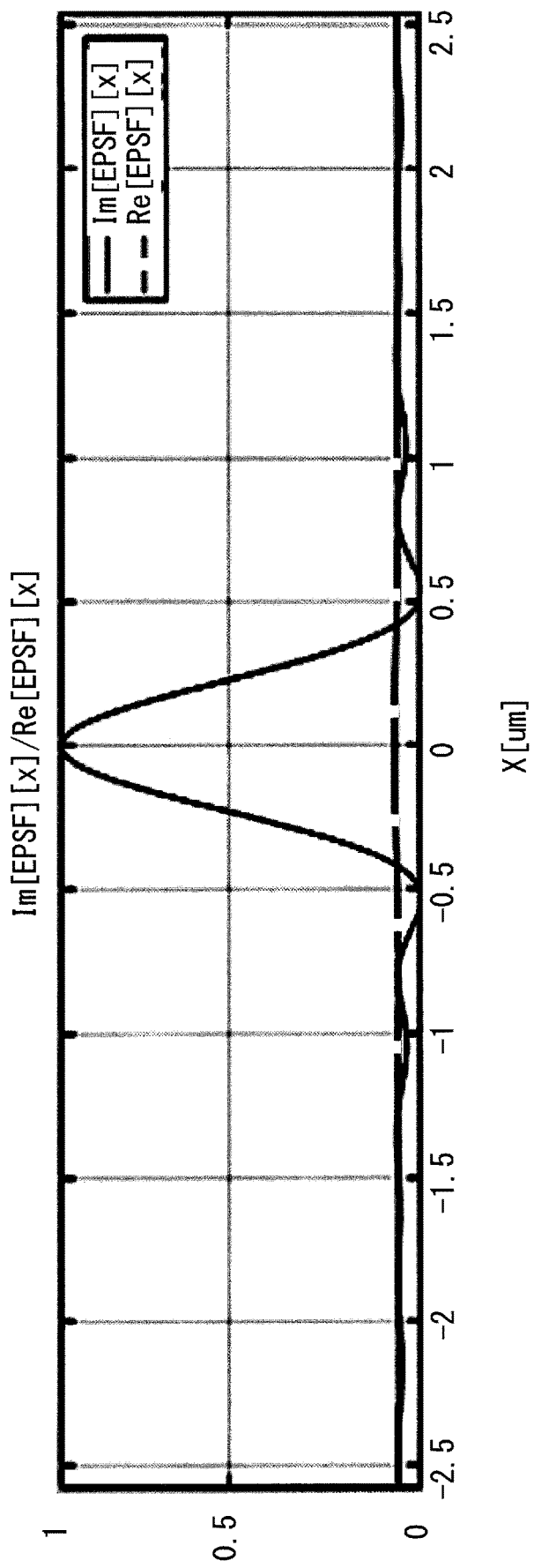
FIG. 14 is a graph showing an example of an effective point spread function (EPSF)

FIG. 14 is a figure showing an example of the EPSP, but the concrete numerical values therein are not to be considered limitative of the present invention. The EPSF obtained according to Equation (5) is a complex quantity, and can be separated into a real part (Re[EPSF]) and an imaginary part (Im[EPSF]). The values upon the vertical axis are normalized by the maximum value of the imaginary part (Im [EPSF]) of the EPSF.

The image construction unit 522 constructs the calculated phase contrast image by performing a folding integration upon each EPSF to the body amplitude distribution and the phase distribution φ of the object of Equation (4). In the case of phase difference observation, when the EPSF is calculated, the real part (EFSF) is extremely small, while the contribution of the imaginary part (Im[EPSF]) is large, and accordingly the contribution of the second term of Equation (4) becomes large, and, due to this, the so-called "halo" phenomenon occurs, which is specific to phase difference observation. Moreover, the first term in Equation (4) represents the background intensity of the image, but, in the case of phase difference observation, the background intensity is suppressed by the intensity of direct light being weakened due to the transmittance of the phase layer.

The image construction unit 522 constructs the calculated differential interference image in the following manner. In the case of a differential interference image, the light source intensity distribution S and the pupil function G can be set as desired to match the desired conditions, but Equation (5) cannot be used in the method for deriving the EPSF. In constructing a calculated differential interference image, an OTF, which is a physical quantity obtained by performing a Fourier transform upon the EPSF, is defined as in the following Equation (6):

[Math. 8]

$$R(\xi,\eta,0,0) = \iint d\xi_z d\eta_z S(\xi_s,\eta_s) G(\xi+\xi_s,\eta+\eta_s) G^*(\xi_s,\eta_s) \quad (6)$$

$$OTF(v_x,v_y) = \frac{R(\xi,\eta,0,0)}{R(0,0,0,0)}$$

Here, in order to distinguish the OTF when obtaining light intensity distribution data by imaging the object S, the OTF when obtaining light intensity distribution data by imaging the object S will be termed "OTF_bf", while the OTF for differential interferometric observation will be termed "OTF_dic", with the OTF_dic being represented by the following Equation (7):

[Math. 9]

$$OTF_{dic} = OTF_{bf} \times 4\sin(2\pi\Delta v_i + \theta)\sin(\theta) \quad (7)$$

Here, Δ represents the shear amount of the incident light that is split into two by a differential interferometry prism (a Wollaston prism or a Nomarski prism or the like), vi represents the spatial frequency in the direction in which shear occurs (i is the coordinate of the shear direction), and θ represents the phase change amount (hereinafter termed the "bias") created by sliding the differential interferometry prism (the prism sliding method) or by changing the angle of a polarizer (the Senarmont method). OTF_dic is determined according to the shear amount and the bias determined by the user, and the EPSF is obtained by performing a reverse Fourier transform thereupon according to Equation (6). If the real part of the EPSF (Re[EPSF]) and the imaginary part of the EPSF (Im[EPSF]) that has thus been obtained are substituted into Equation (4), then a calculated differential interference image can be obtained.

The image construction unit 522 constructs a calculated contrast observation image as will now be described. In relation to a contrast observation image, Japanese Laid-Open Patent Publication 2017-68203 describes a light source intensity distribution S and a pupil function G, and a calculated contrast observation image may be constructed by performing Equations (4) and (5) on the basis of this light source intensity distribution S and this pupil function G.

The image construction unit 522 constructs a calculated dark-field image in the following manner. In construction of the calculated dark-field image, the image construction unit 522 is able to construct the calculated dark-field image by performing partial coherent calculation on the basis of the following Equation (8), without employing Equations (4) and (5) described above.

[Math. 10]

$$I(x,y) = C \iiiint d\xi_1 d\eta_1 d\xi_2 d\eta_2 \tilde{o}(\xi_1,\eta_1) \tilde{o}^*(\xi_2,\eta_2) R(\xi_1,\eta_1,\xi_2,\eta_2) \exp[ik[(\xi_1-\xi_2)x+(\eta_1-\eta_2)y]] \quad (8)$$

Here, o represents the body amplitude distribution, R represents the TCC (Transmission Cross Coefficient: mutual transmission coefficient), and $\xi$ and $\eta$ represent the direction cosines of the diffraction light (or of the direct light). Moreover, the object complex amplitude distribution is represented by the following Equation (9):

[Math. 11]

$$o(x,y) = [1+P(x,y)]\exp(i\varphi(x,y)) \approx 1 + i\varphi(x,y) + P(x,y) \quad (9)$$

The TCC represented by R is represented by the following Equation (10):

[Math. 12]

$$R(\xi_1,\eta_1,\xi_2,\eta_2) = \iint d\xi_s d\eta_s S(\xi_s,\eta_s) G(\xi_1+\xi_s,\eta_1+\eta_s) G^*(\xi_2+\xi_s,\eta_2+\eta_s) \quad (10)$$

The image construction unit 522 constructs the calculated dark-field image by appropriately substituting the light source intensity distribution S, the pupil function G, the phase distribution φ of the low contrast body, the amplitude distribution P(x,y) of the low contrast body, and so on into Equations (8), (9), and (10).

It should be noted that it would also be possible to arrange for the image construction unit 522 to construct the calculated phase contrast image, the calculated differential interference image, and the calculated contrast observation image by employing Equations (8), (9), and (10). It would also be acceptable to arrange for the image construction unit 522 to select, according to requirements, whether to employ a low contrast approximation by employing Equations (4) and (5), or to employ a partially coherent imaging calculation based upon Equations (8), (9), and (10). The method for doing this is not particularly limited, provided that, on the basis of the phase distribution y that has been measured, it is possible to construct a calculated phase contrast image, a calculated differential interference image, a calculated dark-field image, a calculated contrast observation image and so on.

It may also be arranged for the image construction unit 522 to be capable of connecting quantitative phase images, calculated phase contrast images, calculated differential interference images, calculated contrast observation images, and calculated dark-field images that it has obtained as appropriate, thus forming broader single images (i.e. stitched images). Since, with the method for generating a quantitative phase image of this embodiment, it is possible to perform phase measurement with good accuracy even if the target object S is under a liquid surface that has the shape of a meniscus, accordingly it is possible to obtain phase distribution data with good accuracy over an entire vessel in which target objects S are disposed, even including the vicinity of the sides of the vessel where the liquid surface that has the shape of a meniscus is present.

If the phase contrast image, the differential interference image, the dark-field image, the contrast observation image and so on are constructed by calculation as described above, then an image in which the measurement conditions such as the shape of the illumination, the wave front shape upon the pupil surface of the objective lens 21a, and so on are altered as desired can be acquired without actually performing capture of an image of the object S under those measurement conditions (in other words, with an actual phase difference microscope or an differential interferometry microscope), so that, according to circumstances, it is possible to acquire an image for which implementation of image capture with an actual microscope or the like would be difficult.

For example, when obtaining a differential interference image by image capture, it is necessary to rotate the stage or to rotate the target object S when changing the shear direction, but, in the case of this technique, it is possible to construct a calculated differential image in any desired shear direction by devising the manner of taking frequency coordinates in Equation (7) above, or the like. Moreover it is possible, also for a sample for which differential interferometric observation cannot normally be performed, such as a specimen in a plastic dish or the like, to solve the problem of constructing a calculated differential interference image from the quantitative phase image. Furthermore, in the case of phase difference observation, the problem is often confronted that it is not possible to obtain an image correctly due to the influence of a meniscus created at the edge of the liquid surface, but, in the same manner, it is possible to solve this problem by constructing a calculated phase contrast image from the quantitative phase image. In microscopic observation, observation is performed under measurement conditions such as illumination shape, wave front shape upon the pupil surface of the objective lens 21a, and so on which are determined for each observational technique, but, due to this, the observed image that is obtained is only an image that has actually been obtained according to those measurement conditions if post-processing such as image processing and so on is not performed, so that it is not possible to obtain an image that corresponds to measurement conditions which are different from those during actual measurement, such as with an illumination shape or a wave front shape upon the pupil surface of the objective lens 21a or the like that is different from that during actual measurement. However, if this technique is employed, then it is possible to construct a desired image in which the light source intensity distribution and the pupil function are freely changed.

The image analysis unit 523 of the analysis unit 52 (refer to FIG. 2) analyzes the quantitative phase image, the calculated phase contrast image, the calculated differential interference image, the calculated contrast observation image, the calculated dark-field image, and so on which have been acquired. And the image analysis unit 523 calculates the area and the volume of the object S from the acquired quantitative phase image.

After extracting a region corresponding to the object S upon the plane on the basis of the phase distribution data that has been measured and having expressed that region in binary form, the area of the object S may be calculated by multiplying the number of pixels in the region corresponding to that object S by the pixel area that is converted by the sampling plane, in other words by $\Delta x \Delta y$ (refer to FIG. 10).

The average value of the thickness of the object S (in other words, its average height) may be obtained by employing a value obtained by summing the height of the object S corresponding to each of the pixels in the region corresponding to the object S, and by dividing the result by the number of pixels in the region corresponding to the object S.

The volume of the object S may be obtained by multiplying the area of the object S that has been obtained as described above by the average value of the thickness of the object S.

The methods of calculating the area, the thickness, the volume and so on of the object S are not particularly limited to the methods described above.

Figure 15:
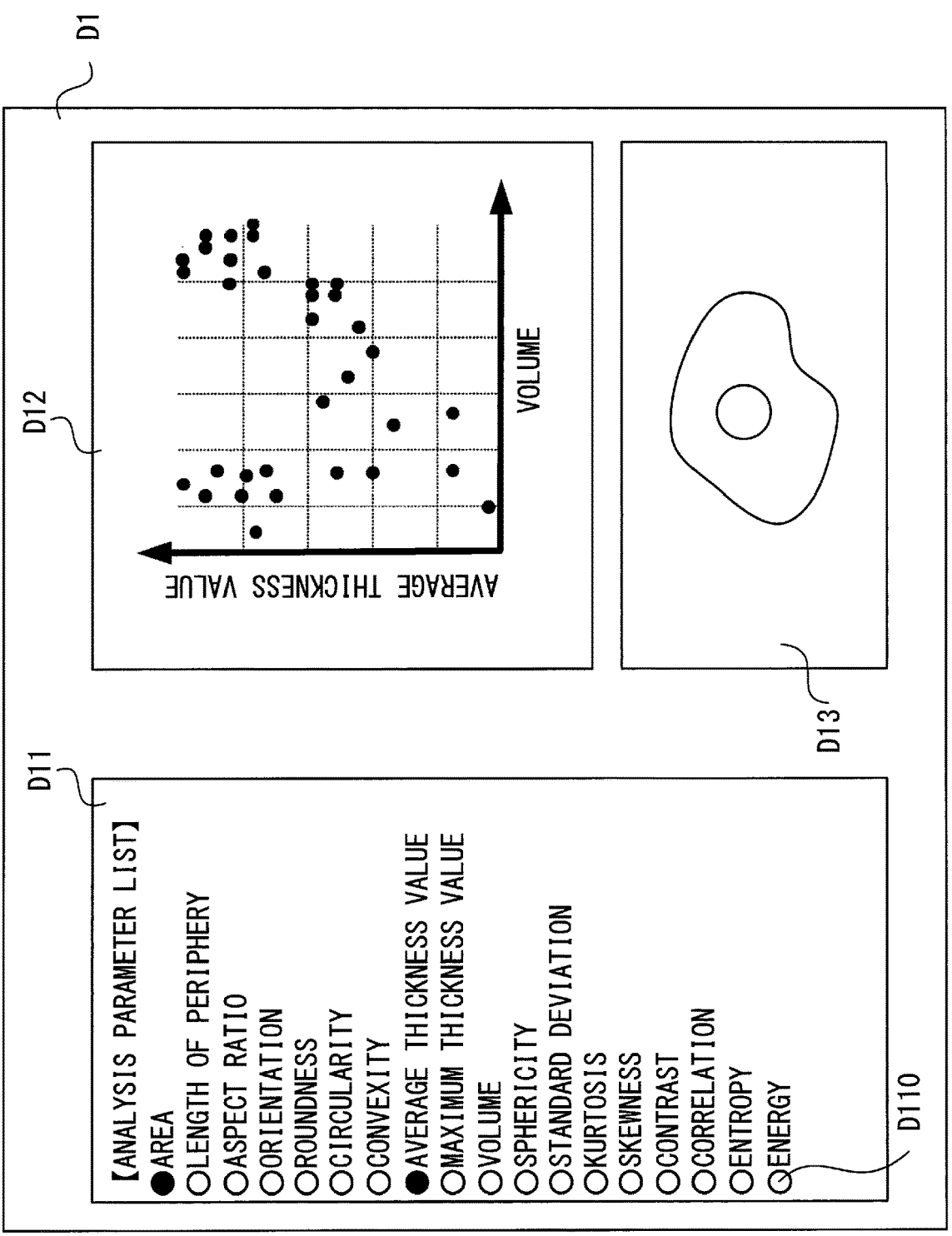
FIG. 15 is a figure showing an example of a display screen.
Figure 16:
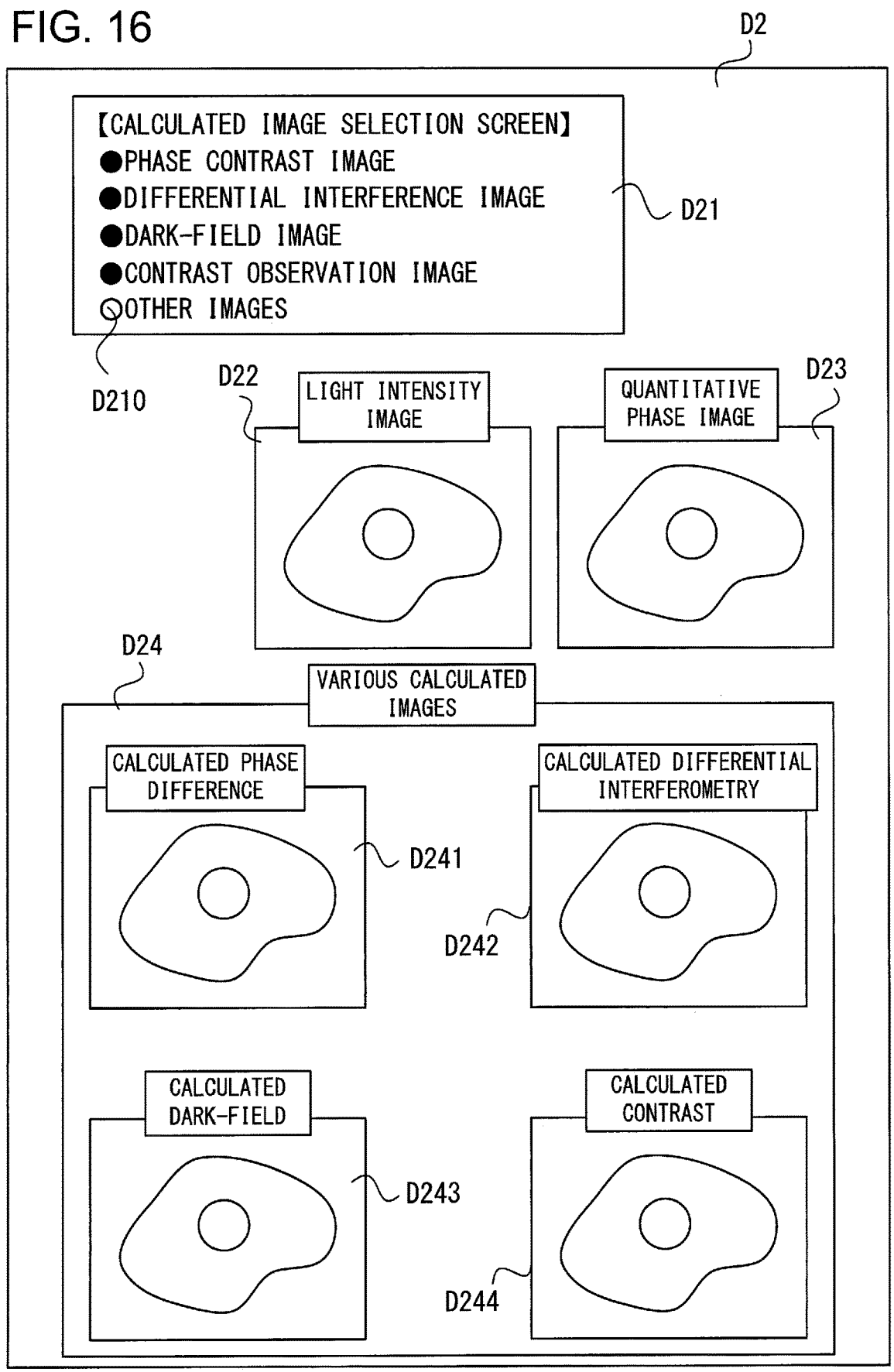
FIG. 16 is another figure showing an example of a display screen.
Figure 17:
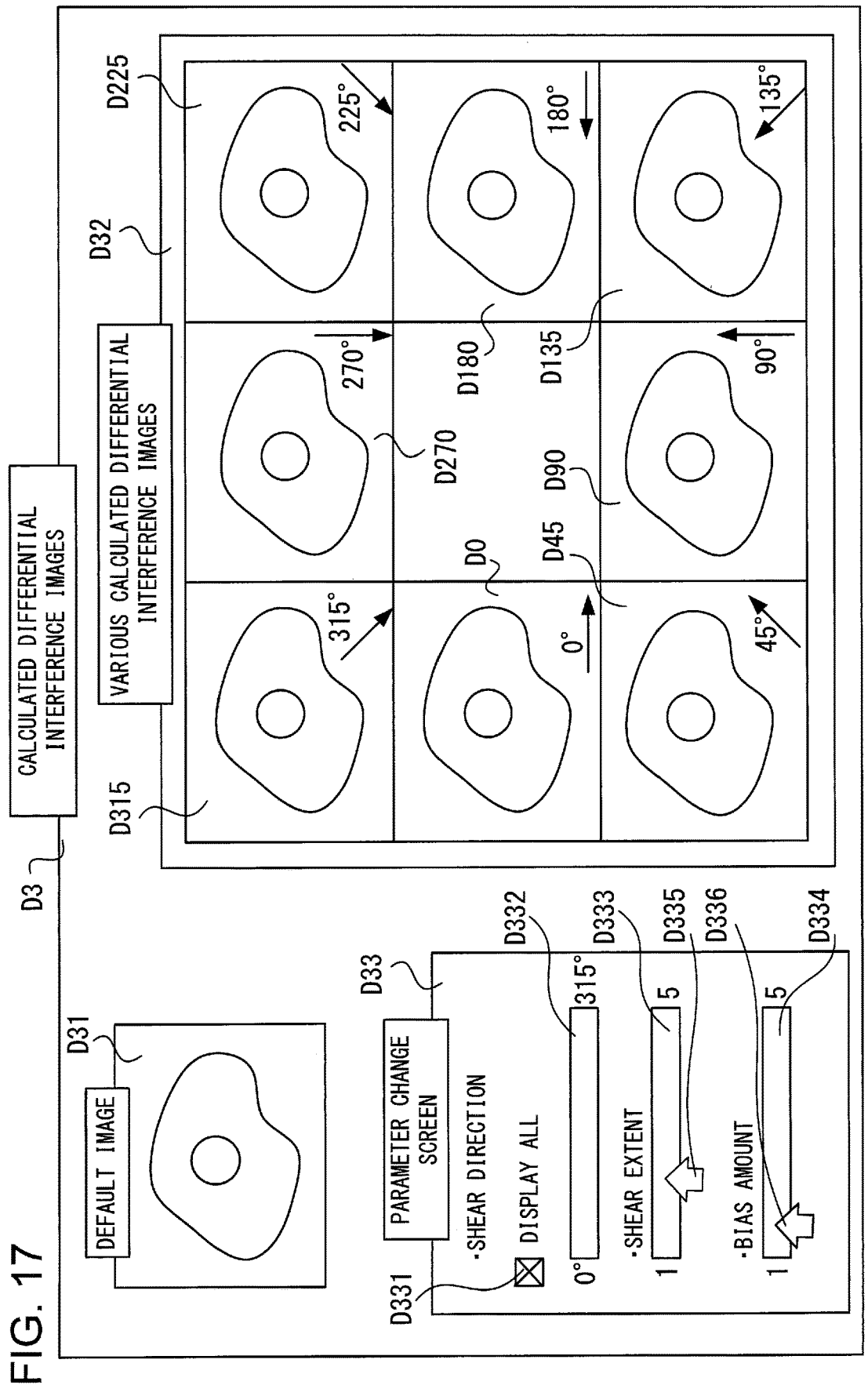
FIG. 17 is yet another figure showing an example of a display screen.

FIG. 15 is a figure showing an example of a display screen upon the display unit 42 in which the results of analysis by the image analysis unit 523 are displayed. FIGS. 15 through 17 show a case in which the phase restoration processing unit 521 has calculated the phase distribution φ of a cell as the object S. The analysis result display screen D1 includes an analysis parameter selection screen D11, a scatter diagram display screen D12, and a quantitative phase image display screen D13.

The analysis parameter selection screen D11 displays the parameters (hereinafter termed the "analysis parameters") calculated by the image analysis unit 523, such as the average value of the thickness of the cell, the area of the cell, the volume of the cell, and so on. On the analysis parameter selection screen D11, a selection button D110 is disposed on the left of each of the analysis parameters, and, by the user toggling these selection buttons D110 between the ON state and the OFF state, it is possible to designate the analysis parameters to be set for the vertical axis and for the horizontal axis of the scatter diagram display screen D12.

The scatter diagram display screen D12 takes two analysis parameters selected upon the analysis parameter selection screen D11 for the horizontal axis and the vertical axis of the scatter diagram, and displays a graph upon which are plotted coordinate positions based upon these cell analysis parameters for each cell for which phase measurement has been performed. It is possible to configure the scatter diagram display screen D12 so that it distinguishes different cell groups and displays them in an appropriate manner. Although information that quantifies the shapes of a plurality of cells may be obtained from this graph, this type of analysis is particularly effective for automatic analysis of a large amount of phase values in a large number of cells. For example, when comparing the shapes of cultured cells, it is possible quantitatively to compare the shapes of a large number of cells that have been cultured under different culture conditions. Moreover, it would also be possible to arrange for a display for referring to a scatter diagram for data that has been acquired in the past to be displayed upon this scatter diagram display screen D12.

It should be noted that this scatter diagram display screen D12 is not limited to being a two dimensional scatter diagram; it would also be possible to display a three dimensional scatter diagram in three dimensions, in an appropriate manner.

The quantitative phase image display screen D13 displays the quantitative phase image that has been measured by the microscope main body portion 100. The method for displaying the quantitative phase image is not to be considered as being particularly limited; it would be possible to show any desired cross section of the object S, and it would also be possible to display the image as seen from any desired direction. It is desirable to distinguish the phase values by tone or color or the like in this display upon the quantitative phase image display screen D13.

FIG. 16 is an example of a display screen upon the display unit 42 upon which calculated images of various types constructed by the image construction unit 522 are displayed. This calculated image display screen D2 includes a calculated image selection screen D21, a light intensity image display screen D22, a quantitative phase image display screen D23, and calculated image display screens D24 of various types.

Names of calculated images such as a phase contrast image, a differential interference image, a dark-field image, a contrast observation image and so on are displayed upon the calculated image selection screen D21 together with selection buttons D210 respectively corresponding thereto. By toggling the selection buttons D210 between the ON state and the OFF state, the user is able to select calculated images of various types to be displayed upon the image display screen D24.

The light intensity image display screen D22 and the quantitative phase image display screen D23 respectively display, as light intensity images, images based upon the light intensity distributions I1, I2, and/or I3, and also quantitative phase images. And calculated image display screens D24 of various types display the calculated images that are selected upon the calculated image selection screen D21. In the example of FIG. 16, a calculated phase contrast image D241, a calculated differential interference image D242, a calculated dark-field image D243, and a calculated contrast observation image D244 are displayed as the calculated image display screens D24 of various types.

FIG. 17 is an example of a display screen upon the display unit 42, upon which are displayed calculated differential interference images of various types that have been constructed by the image construction unit 522 under conditions of various kinds. This calculated differential interference image display screen D3 includes a default image display screen D31, calculated differential image display screens D32 of various types, and a parameter change screen D33.

The default image display screen D31 displays, as a default image, an image in which a shading direction (i.e. a shear direction), a shading level (i.e. a shear amount), and a contrast adjustment amount (i.e. a biasing amount) of the differential interference image have been set in advance.

The various calculated differential interference image display screens D32 display calculated differential interference images in which shear directions, shear amounts, and bias amounts of various kinds have been set. In the example of FIG. 17, the rightward direction in the drawing is taken as 0°, and calculated differential interference images D0, D45, D90, D135, D180, D225, D270, and D315 whose shear directions are respectively 0°, 45°, 90°, 135°, 180°, 225°, 270°, and 315° are displayed in the various calculated differential interference image display screens D32.

The parameter change screen D33 is a screen for changing the settings of parameters of various types described above, such as the shear direction, the shear amount, the bias amount, and so on. In the example of FIG. 17, it is possible to adjust the angular range for the shear direction from 0° to 315°, the shear amount in steps of from 1 to 5, and the bias amount in steps of from 1 to 5, but the ways in which the shear direction, the shear amount, and the bias amount can be set are not to be considered as being particularly limited. And, in the example of FIG. 17, since the selection button D331 that corresponds to "display all" is in the ON state, accordingly the calculated differential interference images D0, D45, D90, D135, D180, D225, D270, and D315 for each shear direction from 0° to 315° are displayed upon the various calculated differential interference image display screens D32.

Respective scroll bars D332, D333, and D334 relating to the shear direction, the shear amount, and the bias amount are arranged upon the parameter change screen D33, so that it becomes possible for the user to change the shear direction, the shear amount, and the bias amount by selecting and moving the arrow signs D335 and D336 to positions upon the scroll bars D332 through D334 that correspond to the desired numerical values. Since, in the example of FIG. 17, "display all" is selected for the shear direction, accordingly no arrow for selecting a numerical value is displayed upon the scroll bar D332.

It should be understood that the ways in which the analysis result display screen D1, the calculated image display screen D2, and the calculated differential interference image display screen D3 described above are displayed are only examples; the examples of numerical values and images and so on that are shown are not limitative of the present invention.

Flow of this Quantitative Phase Image Generating Method

Figure 18:
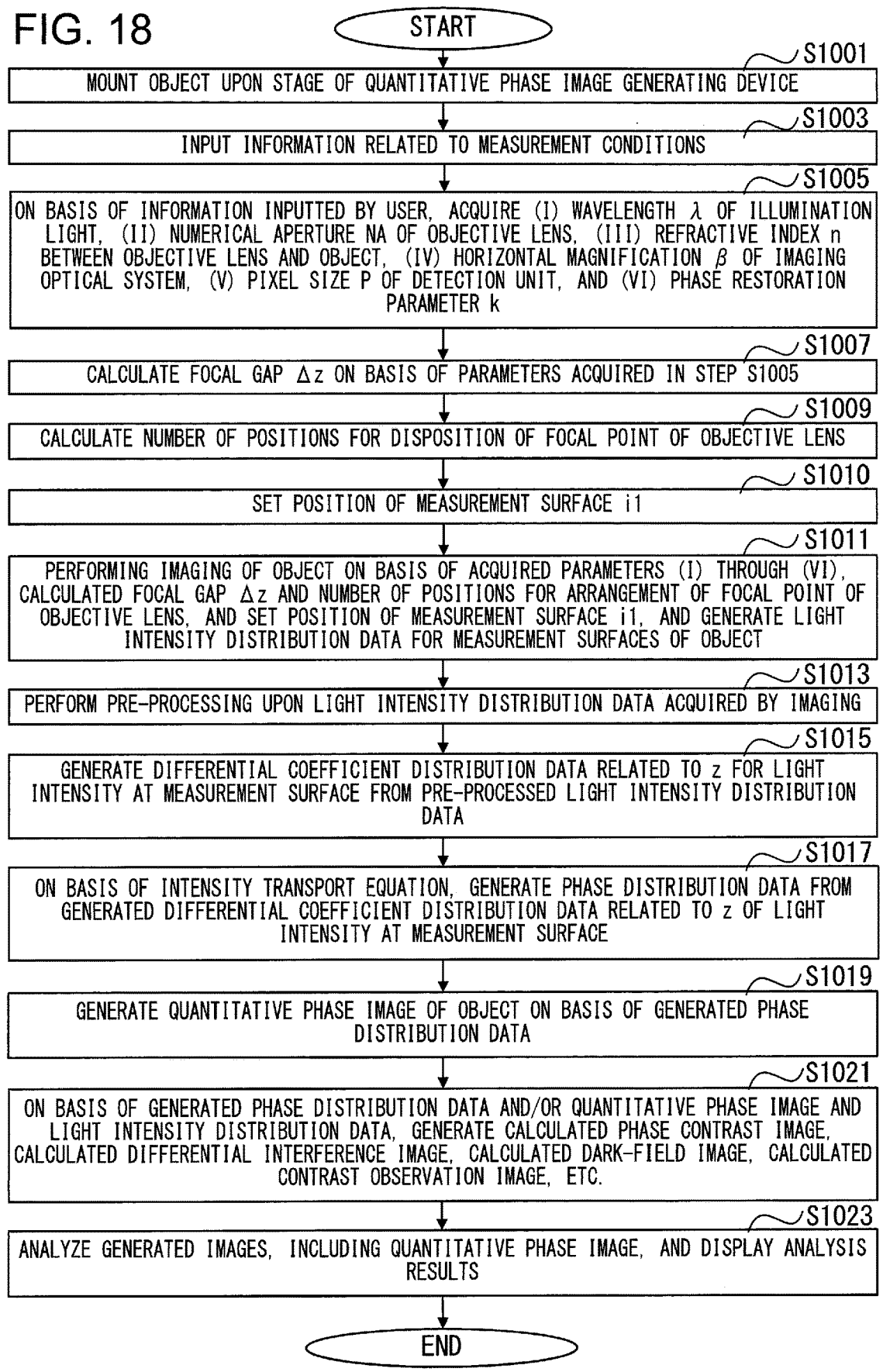
FIG. 18 is a flow chart showing the flow of a quantitative phase image generating method according to this embodiment.

FIG. 18 is a flow chart showing the flow of a quantitative phase image generation method related to the quantitative phase image generating device of this embodiment.

In step S1001, an object S is mounted upon the stage 8 of the quantitative phase image generating device 1 by a user or the like. When step S1001 has been completed, the flow of control proceeds to step S1003. In step S1003, the user inputs information related to the measurement conditions for phase measurement. When step S1003 has been completed, the flow of control proceeds to step S1005.

In step S1005, on the basis of the information inputted by the user, the optimum condition calculation unit 511 acquires (I) the wavelength $\lambda$ of the illumination light, (II) the numerical aperture NA of the objective lens 21a, (III) the refractive index n between the objective lens 21a and the object S, (IV) the horizontal magnification $\beta$ of the imaging optical system 7, (V) the pixel size of the detection unit 9, and (VI) the phase restoration parameter k. The horizontal magnification $\beta$ of the imaging optical system 7 may, as appropriate, be calculated from the parameters (I), (II), and (V), so as to satisfy Equation (3) above. When step S1005 has been completed, the flow of control proceeds to step S1007. In step S1007, the optimum condition calculation unit 511 calculates the focal gap $\Delta z$ on the basis of the parameters that were acquired in step S1005 (i.e. on the basis of the setting information for the microscope main body portion 100). When step S1007 has been completed, the flow of control proceeds to step S1009.

In step S1009, on the basis of Equation (3) described above, the optimum condition calculation unit 511 calculates the number of positions at which the focal point of the objective lens 21a is to be disposed. When step S1009 has been completed, the flow of control proceeds to step S1010. In step S1010, the device control unit 51 sets the position of the measurement surface i1 on the basis of the contrast and so on of the light intensity corresponding to three dimensional light intensity distribution data acquired in advance. When step S1010 has been completed, the flow of control proceeds to step S1011.

In step S1011, the microscope main body portion 100 performs image capture of the object S on the basis of the parameters (I) through (VI) that have been acquired, the focal gap $\Delta z$ and the number of positions for arrangement of the focal point of the objective lens 21a that have been calculated, and the position of the measurement surface i1 that has been set, and the phase restoration processing unit 521 generates light intensity distribution data for the measurement surfaces i. When step S1011 has been completed, the flow of control proceeds to step S1013.

In step S1013, the phase restoration processing unit 521 performs pre-processing upon the light intensity distribution data that has been acquired by image capture. According to requirements, the phase restoration processing unit 521 may process the light intensity distribution data before performing phase restoration, for example by performing filter processing or the like such as elimination of noise in a frequency region higher than a cutoff spatial frequency with a low pass filter. When step S1013 has been completed, the flow of control proceeds to step S1015. In step S1015, the phase restoration processing unit 521 generates differential coefficient distribution data related to Z of the light intensity at the measurement surface i1 from the light intensity distribution data upon which pre-processing has been performed. When step S1015 has been completed, the flow of control proceeds to step S1017.

In step S1017, on the basis of the intensity transport equation, the phase restoration processing section 521 generates phase distribution data from the differential coefficient distribution data related to Z of the light intensity at the measurement surface i1 that has been generated. When step S1017 has been completed, the flow of control proceeds to step S1019. In step S1019, the image construction unit 522 generates a quantitative phase image for the object S on the basis of the phase distribution data that has been generated. When step S1019 has been completed, the flow of control proceeds to step S1021.

In step S1021, on the basis of the phase distribution data and/or the quantitative phase image that have thus been generated and also the light intensity distribution data, the image construction unit 522 generates a calculated phase contrast image, a calculated differential interference image, a calculated dark-field image, a calculated contrast observation image, and so on. When step S1021 has been completed, the flow of control proceeds to step S1023. In step S1021, the image analysis unit 523 analyses the images that have been generated, including the quantitative phase image, and displays the results of analysis. When step S1023 has been completed, the processing terminates.

It should be understood that, while in the above it was arranged for the optimum condition calculation unit 511 to calculate the focal gap $\Delta z$ on the basis of, as setting information for the microscope main body portion 100, information specifying the numerical aperture NA of the objective lens 21a, the wavelength $\lambda$ of the illumination light L2, and the refractive index n between the objective lens 21a and the object S, it would also be acceptable to arrange, according to a request from the user, to calculate the focal gap $\Delta z$ on the basis of, among the setting information for the microscope main body portion 100, at least one item of information specifying the numerical aperture NA of the objective lens 21a, or the wavelength $\lambda$ of the illumination light L2, or the refractive index n between the objective lens 21a and the object S. In concrete terms, for example, if a dry objective lens is employed for the objective lens 21a, and the refractive index n between the objective lens 21a and the object S is kept at a fixed value ((with n=1 being substituted in Equation (100)), then the optimum condition calculation unit 511 may calculate the focal gap $\Delta z$ on the basis of the following information: the numerical aperture NA of the objective lens 21a, and the wavelength $\lambda$ of the illumination light L2. Furthermore, for example, if an objective lens is employed as the objective lens 21a for which water is specified as the immersion liquid (for example, with n=1.33 being taken as a fixed value), and the wavelength λ of the illumination light L2 is kept at a fixed value (for example λ=400 nm), then, after having substituted those values into Equation (100), the optimum condition calculation unit 511 may calculate the focal gap Δz on the basis of information specifying the numerical aperture NA of the objective lens 21a. And, if only the wavelength λ of the illumination light L2 is kept at a fixed value (for example λ=550 nm), then the optimum condition calculation unit 511 may calculate the focal gap Δz on the basis of information specifying the numerical aperture NA of the objective lens 21a and information specifying the refractive index n between the objective lens 21a and the object S.

In a similar manner, it would also be acceptable to arrange to keep the numerical aperture NA of the objective lens 21a at a fixed value (for example NA=0.95), and for the optimum condition calculation unit 511 to calculate the focal gap Δz on the basis of the wavelength λ of the illumination light L2 and the refractive index n between the objective lens 21a and the object S; or alternatively, it would also be possible to keep the numerical aperture NA of the objective lens 21a at a fixed value and to keep the wavelength λ of the illumination light L2 or the refractive index n between the objective lens 21a and the object S at a fixed value, and to arrange for the optimum condition calculation unit 511 to calculate the focal gap Δz on the basis of information specifying the refractive index n between the objective lens 2a and the object S, or information specifying the wavelength λ of the illumination light L2. Moreover in a similar manner, it will also be acceptable, after having set the phase restoration parameter k to a fixed value, to arrange for the optimum condition calculation unit 511 to calculate the focal gap Δz on the basis of at least one of the following information items, i.e. the numerical aperture NA of the objective lens 21a, the wavelength λ of the illumination light L2, and the refractive index n between the objective lens 21a and the object S; or, alternatively, at least one of the numerical aperture NA of the objective lens 21a, the wavelength λ of the illumination light L2, and the refractive index n between the objective lens 21a and the object S may be set to a fixed value, and it may be arranged for the optimum condition calculation unit 511 to calculate the focal gap Δz on the basis of, at least, the phase restoration parameter k.

It should be understood that, if only one set of light intensity distribution data is to be detected and acquired after the illumination light L2 from the transmitted illumination optical system 10 has passed through at least a part of the object S, then the light intensity distribution data may also be acquired as a result of image capture with the focal point disposed exterior to the object S. Moreover, if at least one of the measurement surfaces i1, i2, and i3 includes a part of the object S, then the other measurement surfaces need not include the object S. Here, even upon the measurement surface that includes a part of the object S as described above, the focal point of the objective lens 21a may be arranged externally to the object S. In other words, for the image capture of each of the measurement surfaces i, it would be acceptable to dispose the focal point of the objective lens 21a in the interior of the object S, and it would alternatively also be acceptable to dispose it externally to the object S.

Incidentally, if a single light intensity distribution I1, I2, and I3 is acquired respectively corresponding to each of the measurement surfaces i1, i2, and i3, while it is possible to perform phase measurement according to this embodiment (FIG. 4), it would also be possible to arrange for a plurality of light distributions to correspond to a single measurement surface for some or all of the measurement surfaces i1, i2, and i3.

Moreover, when the position of the measurement surface i1 is set on the basis of the contrast of the intensity of the light from the object S, then it would also be possible to arrange for the control unit 51 to calculate a parameter other than the variance vz described above, provided that it is a parameter that indicates the contrast of the light intensity of the light from the object S. For example, it could be arranged for the device control unit 51 to calculate a value gz (hereinafter termed the total gradient value) obtained by adding together the magnitudes of the gradients upon the XY plane of the light intensity distribution Iz(x,y) corresponding to each value of z, as shown by Equation (12) below; or it could be arranged for the device control unit 51 to calculate the Laplacian sum of squares Lz of the light intensity upon the XY plane corresponding to each value of z, as shown by Equation (13) below. In practice, the device control unit 51 calculates values corresponding to the following integrations with respect to Equations (12) and (13) by performing calculations based upon discrete numerical values.

[Math. 13]

$$g_z = \int\int \sqrt{\left(\frac{\partial I_z(x,y)}{\partial x}\right)^2 + \left(\frac{\partial I_z(x,y)}{\partial y}\right)^2} dxdy \quad (12)$$

[Math. 14]

$$L_z = \int\int \{\nabla^2 I_z(x,y)\}^2 dxdy \quad (13)$$

In this case, the device control unit 51 is able to set the position of the measurement surface i1 to a position in the Z direction for which the above described total gradient value gz, or the Laplacian sum of squares Lz, becomes a minimum.

It should be understood that the method for setting the position of the measurement surface i1 is not particularly limited, provided that the measurement surface i1 is set on the basis of the contrast of the intensity of the light from the object S. For example, it will be acceptable to arrange for the device control unit 51 to set the position of the measurement surface i1 on the basis of, not the position in the Z direction where the total gradient value gz, or the Laplacian sum of squares Lz, or the variance vz described above, becomes a minimum, but rather the position in the Z direction where one of these values becomes a local maximum, or a maximum, or a minimum, or the like. Moreover, it would also be possible to arrange for the user visually to check a light intensity image that corresponds to the value for each Z of three dimensional light intensity distribution data acquired in advance, and to set the position of the measurement surface i1 on the basis of the contrast of that light intensity image. Yet further, it would also be possible to arrange for the user to observe the object S via the eyepiece lens 35 (refer to FIG. 1), and to set the position of the measurement surface i1 on the basis of the contrast of that observed field of view.

Moreover while it was arranged, when the position of the measurement surface i1 is set on the basis of the contrast of the intensity of the light from the object S, to acquire the three dimensional light intensity distribution data that is used for calculating the contrast of that light intensity in advance, in this case the term "in advance" is not to be considered as being particularly limitative, provided that the data is acquired before the setting of the position of the measurement surface i (in step S1010 of the flow chart of FIG. 18 described above).

And the method for the device control unit 51 to drive the stage 8 is not particularly limited, provided that it is possible to shift the focal point of the objective lens 21a upon the object S along the optical axis Lo of the objective lens 21a by the desired gap $\Delta z$, and that it is possible to detect the light from the desired measurement surface i of the object S. Moreover, provided that it is possible to change the relative position of the focal point of the objective lens 21a and the object S, it would be acceptable for the device control unit 51 to be adapted to shift the stage 8 along any desired axis, such as the optical axis Lo of the objective lens 21a (i.e. the Z axis), or an axis orthogonal to the Z axis (i.e. the X axis or the Y axis) or the like; or, indeed, it will be acceptable to arrange for the device control unit 51 to shift the stage 8 along any desired path in three dimensional space. Furthermore, it would also be possible to arrange for the focal point of the objective lens 21a upon the object S to be shifted by the objective lens 21a being shifted along the optical axis of the objective lens 21a by the device control unit 51. In this case as well, provided that it is possible to change the relative position of the focal point of the objective lens 21a and the object S, it will be acceptable to arrange for the device control unit 51 to be adapted to be able to shift the objective lens 21a along any desired path, such as along the optical axis Lo of the objective lens 21a (i.e. the Z axis), or along any desired axis orthogonal to the Z axis (such as the X axis or the Y axis) or the like, or to shift the objective lens 21a along any desired path in three dimensional space. Yet further, it would also be possible to arrange for the device control unit 51 to be adapted, not just to be capable of shifting one or the other of the stage 8 and the objective lens 21a, but to be capable of shifting both the stage 8 and the objective lens 21a, and thereby changing the relative position of the focal point of the objective lens 21a and the object S.

It should be understood that although, in steps S1003 and S1005 of the flow chart described above, information related to the measurement conditions for phase measurement is inputted by the user, and the optimum condition calculation unit 511 is adapted to acquire the parameters (I) through (VI) on the basis of this information that the user has inputted, it would also be acceptable to arrange to set those parameters on the basis of information stored in the storage unit 44. For example, when capturing and acquiring a plurality of respective quantitative phase images of a plurality of objects S, if that plurality of objects S are cells of the same type, or if they may be classified as cells that resemble one another from the morphological standpoint, or the like, or if they are phase bodies that are the same or that resemble one another, then, as appropriate, it will be acceptable to arrange to employ parameters (I) through (VI) that have been previously stored in the storage unit 44, or that were stored during image capture in the past. Moreover, the object S is not limited to being a cell. Furthermore, it would also be possible to set the parameters (I) through (VI) on the basis both of information inputted by the user, such as information selected by the user via the input unit 41 from among numerical values based upon information stored in the storage unit 44, and also information stored in the storage unit 44. Moreover, it would also be possible for the optimum condition calculation unit 511 to set the focal gap $\Delta z$ by calculation based upon Equation (100) or the like, without necessarily setting the phase restoration parameter k of (VI).

According to the embodiment described above, the following beneficial operational effects are obtained.

(1) The quantitative phase image generating method of this embodiment includes: disposing the focal point of the objective lens 21a at each of a plurality of positions in the object S that are mutually separated by focal gaps $\Delta z$ along the optical axis of the objective lens and detecting light from the object S; generating a plurality of sets of light intensity distribution data corresponding to each of the plurality of positions; and generating a quantitative phase image on the basis of the plurality of sets of light intensity distribution data; wherein the focal gap $\Delta z$ is set on the basis of the numerical aperture NA of the objective lens 21a, the wavelength $\lambda$ of the illumination light, and the refractive index n between the objective lens 21a and the object S. Due to this, it is possible to measure the phase of the object S with good accuracy and with a small number of image captures, in accordance with the numerical aperture NA of the objective lens 21a, the wavelength $\lambda$ of the illumination light, and the refractive index n between the objective lens 21a and the object S.

Furthermore, in prior art phase measurement, a method for setting the focal gap $\Delta z$ on the basis of the amount of noise related to the light intensity image which has been measured in advance has been proposed, but with the method of this embodiment there is no need to perform such advance measurement of the amount of noise or the like.

(2) And, with the quantitative phase image generating method or the quantitative phase image generating device according to this embodiment, the focal gap $\Delta z$ is set by using a parameter k that indicates the spatial frequency for restoration of phase in the quantitative phase image to be generated. By doing this, it is possible to measure the phase of the object S with good accuracy with only a few image captures employing the greater portion of the cutoff spatial frequency of the objective lens 21a.

(3) Moreover, with the quantitative phase image generating method or the quantitative phase image generating device according to this embodiment, the number of the plurality of positions at which the focal point of the objective lens 21a is disposed is set on the basis of the numerical aperture NA of the objective lens 21a, the horizontal magnification $\beta$ provided by the imaging optical system 7 that includes the objective lens 21a, and the pixel size P of the detection unit 9. By doing this, and by, it is possible to perform matching to the horizontal magnification $\beta$ of the imaging optical system 7 and the pixel size P of the detection unit 9 and to measure the phase of the object S with good accuracy with only a few image captures employing the greater portion of the cutoff spatial frequency of the objective lens 21a.

(4) Furthermore, with the quantitative phase image generating method or the quantitative phase image generating device according to this embodiment, the number of the plurality of positions at which the focal point of the objective lens 21a is disposed is set on the basis of the magnitude of the Airy disk of the point spread function at the detection surface of the detection unit 9 and the pixel size P. By doing this, it is possible to measure the phase of the object S with good accuracy with only a few image captures on the basis of this relationship between the point spread function and the magnitude of the Airy disk.

(5) Yet further, with the quantitative phase image generating method or the quantitative phase image generating device according to this embodiment, if the pixel size P is larger than the diameter of the Airy disk of the point spread function, then the number of the plurality of positions at which the focal point of the objective lens 21a is disposed is set to a value greater than 3. By doing this, it is possible to measure the phase of the object S with good accuracy with only a few image captures on the basis of whether or not the pixel size P is suitable for the magnitude of the Airy disk of the point spread function.

(6) And the quantitative phase image generating device according to this embodiment comprises the device control unit 51 that adjusts the position of the focal point of the objective lens 21a along the optical axis of the objective lens 21a, the detection unit 9 that detects light from an object S, and the analysis unit (image generation unit) 52; and, when light from the object S, upon which the focal point of the objective lens 21a is disposed at each of a plurality of positions that are mutually separated by gaps $\Delta z$ along the optical axis of the objective lens 21a, is detected by the detection unit 9, and, on the basis of this detected light, the analysis unit 52 generates a plurality of sets of light intensity distribution data corresponding to each of the plurality of positions, and generates a quantitative phase image on the basis of the plurality of sets of light intensity distribution data, the device control unit 51 sets the focal gap $\Delta z$ on the basis of the numerical aperture NA of the objective lens 21a, the wavelength $\lambda$ of the illumination light, and the refractive index n between the objective lens 21a and the object S. Due to this, it is possible to measure the phase of the object S with good accuracy and with a small number of image captures, in accordance with the numerical aperture NA of the objective lens 21a, the wavelength $\lambda$ of the illumination light, and the refractive index n between the objective lens 21a and the object S.

The following modifications also come within the range of the present invention and can be combined with the embodiment described above. Portions that are the same as ones of the embodiment described above will be referred to by the same reference symbols, and explanation will be omitted as appropriate.

Variant Embodiment 1

While, in the embodiment described above, the phase restoration processing unit 521 calculated the phase distribution $\varphi$ on the basis of the value for the focal gap $\Delta z$ set in advance by the optimum condition calculation unit 511, it would also be possible to arrange for the phase restoration processing unit 521, after adjustment of the focal point position F, to measure the focal gap $\Delta z$ through which the focal point position has actually been shifted by employing an encoder, and to calculate the phase distribution $\varphi$ on the basis of that measured value. Since, by doing this, restoration of the phase is performed on the basis of the actual focal gap $\Delta z$, accordingly it is possible to restore the phase more accurately. The encoder may, for example, be installed in a shifting device such as a motor or the like that shifts the stage 8 in the Z direction by electrical driving.

It should be understood that, if the focal point position F of the objective lens 21a is adjusted by shifting the objective lens 21a, then the encoder may be installed upon a shifting device such as a motor or the like that shifts the objective lens 21a in the Z direction by electrical driving. If it is arranged for both the objective lens 21a and the stage 8 to be shiftable, then it would be possible for the phase restoration processing unit 521 to calculate the focal gap $\Delta z$ on the basis of the shift amounts of the objective lens 21a and the stage 8 as measured by a plurality of encoders that are respectively installed to shifting devices such as a plurality of motors or the like that shift the objective lens 21a and the stage 8 in the Z direction by electrical driving. The method for measuring the focal gap $\Delta z$ is not particularly limited, provided that it is possible to measure the focal gap $\Delta z$ when actually performing imaging for phase measurement.

The details of this variant embodiment may, as appropriate, be combined with the details of the embodiment described above.

Variant Embodiment 2

In the embodiment described above, the quantitative phase image generating device 1 was built as an inverted microscope, as shown in FIG. 1, but it would also be acceptable for the quantitative phase image generating device to be built as an erect microscope or as a stereo microscope.

If the quantitative phase image generating device is built as a stereo microscope, then the imaging optical system 7 may be provided with a zoom mechanism, so that the numerical aperture NA of the objective lens 21a can be changed according to a zoom magnification $\beta 2$. In the following, the fact that the numerical aperture NA is a function of the magnification $\beta$ is described as NAP. When the magnification $\beta$ of the imaging optical system 7 is expressed by the relational expression $\beta = \beta 1 \times \beta 2$, i.e. as the product of the magnification $\beta 1$ of the objective lens 21a and the zoom magnification $\beta 2$, it may be arranged for the device control unit 51 to compare together the ratio of $1.22\lambda$ of the diameter of the Airy disk of the point spread function to the numerical aperture NA($\beta$) which changes according to the zoom magnification $\beta 2$, and the sampling gap $\Delta x = P/\beta$, and to determine whether or not to perform phase restoration by setting the number of positions where the focal point of the objective lens 21a is to be disposed to three. By doing this, it is possible to measure the phase of the object S with good accuracy with only a few image captures, matched to the zoom magnification $\beta 2$.

The details of this variant embodiment may, as appropriate, be combined with the details of the embodiment described above and of the variant embodiment described above.

Variant Embodiment 3

In the embodiment described above, the two measurement surfaces i2 and i3 are both set to positions that are separated from the measurement surface i1 by the focal gap $\Delta z$, but it would also be possible to arrange to position the plurality of measurement surfaces i at mutually different focal gaps $\Delta z$ with respect to the measurement surface i1. The optimum condition calculation unit 511 is capable of making the focal gap $\Delta z$ between each of the plurality of measurement surfaces i and the adjacent measurement surface i be different, on the basis of the distance between the measurement surface i1 and the measurement surface i. By doing this, it is possible to measure the phase of the object S with a small number of image captures and with good accuracy, according to the distances between the measurement surfaces i and the measurement surface i1.

The details of this variant embodiment may also, as appropriate, be combined with the details of the embodiment described above and of the variant embodiments described above.

Variant Embodiment 4

In the embodiment described above, the quantitative phase image generating device 1 is provided with a single detection unit 9, but it would also be possible to provide a plurality of detection units. By doing this, it becomes possible to record a fluorescence image and a quantitative phase image simultaneously.

Figure 19:
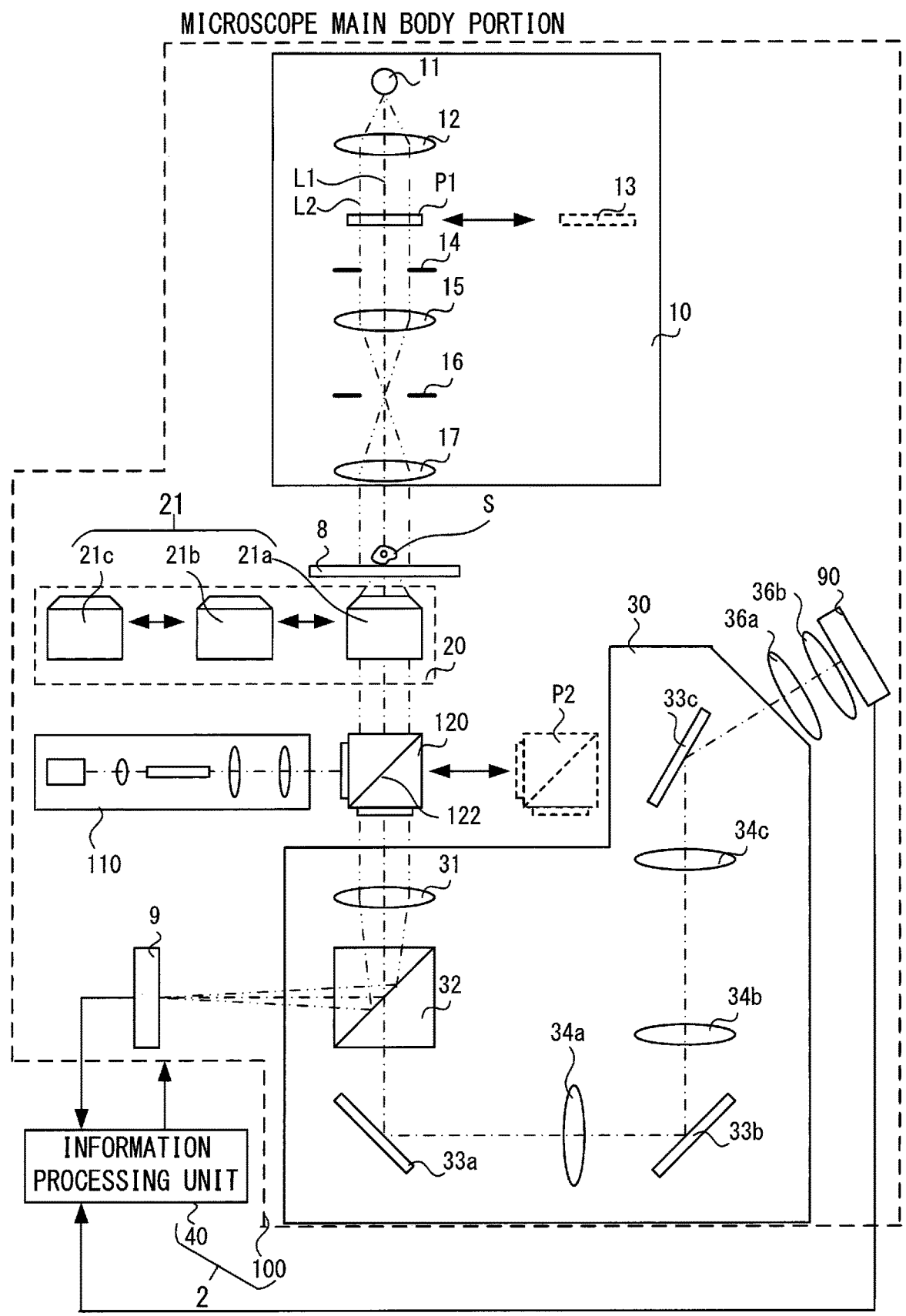
FIG. 19 is a conceptual figure showing the structure of a quantitative phase image generating device according to another embodiment.

FIG. 19 is a conceptual figure showing the structure of the quantitative phase image generating device 2 of this variant embodiment. The quantitative phase image generating device 2 has a structure similar to that of the quantitative phase image generating device 1, but differs by the feature that, instead of the eyepiece lens 35 (refer to FIG. 1), imaging lenses 36a, 36b and a detection unit 90 are provided.

A half prism or a half mirror whose transmission to reflection ratio is from 50:50 to 20:80 or the like may be arranged as a beam splitter 32 that branches the optical path of the light from the object S for fluorescence and phase measurement. If a halogen light source is employed as the light source 11, then, since there is a surplus in the transmitted light output of the halogen light source, there is no problem that light for acquiring the light intensity distribution data needed for the phase restoration is distributed darker as compared to light for fluorescence observation, and, due to this, it is possible to image the light from the object S at the detection surfaces of the detection units 9 and 90 with good efficiency.

Since, in this variant embodiment, in order to illuminate excitation light from the epifluorescence optical system 110 onto the specimen, a dichroic filter 122 is disposed upon the optical path common to both of the light fluxes that form images upon the detection surfaces of the detection units 9 and 90, accordingly the wavelength of the illumination light L2 for phase measurement is set to a longer wavelength than the wavelength band of the light for fluorescence observation. It would also be possible to dispose barrier filters for wavelength selection, not shown in the figure, directly before each of the detection units 9, 90, so that the fluorescence is imaged upon the detection unit 9 and the transmitted illumination light is imaged upon the detection unit 90.

It should be understood that it would also be acceptable to perform fluorescence observation and phase measurement sequentially by only employing the detection unit 9, and by sequentially inserting and removing the fluorescence filter cube 120.

The details of this variant embodiment may also, as appropriate, be combined with the details of the embodiment described above and of the variant embodiments described above.

Variant Embodiment 5

While, in the embodiment described above, the focal point of the objective lens 21a is sequentially disposed upon the measurement surfaces i1, i2, and i3 and a plurality of sets of light intensity distribution data are sequentially acquired by image capture, it would also be possible to acquire sets of light intensity distribution data corresponding to a plurality of focal point positions F simultaneously by imaging all together, in other words in a single shot.

Figure 20:
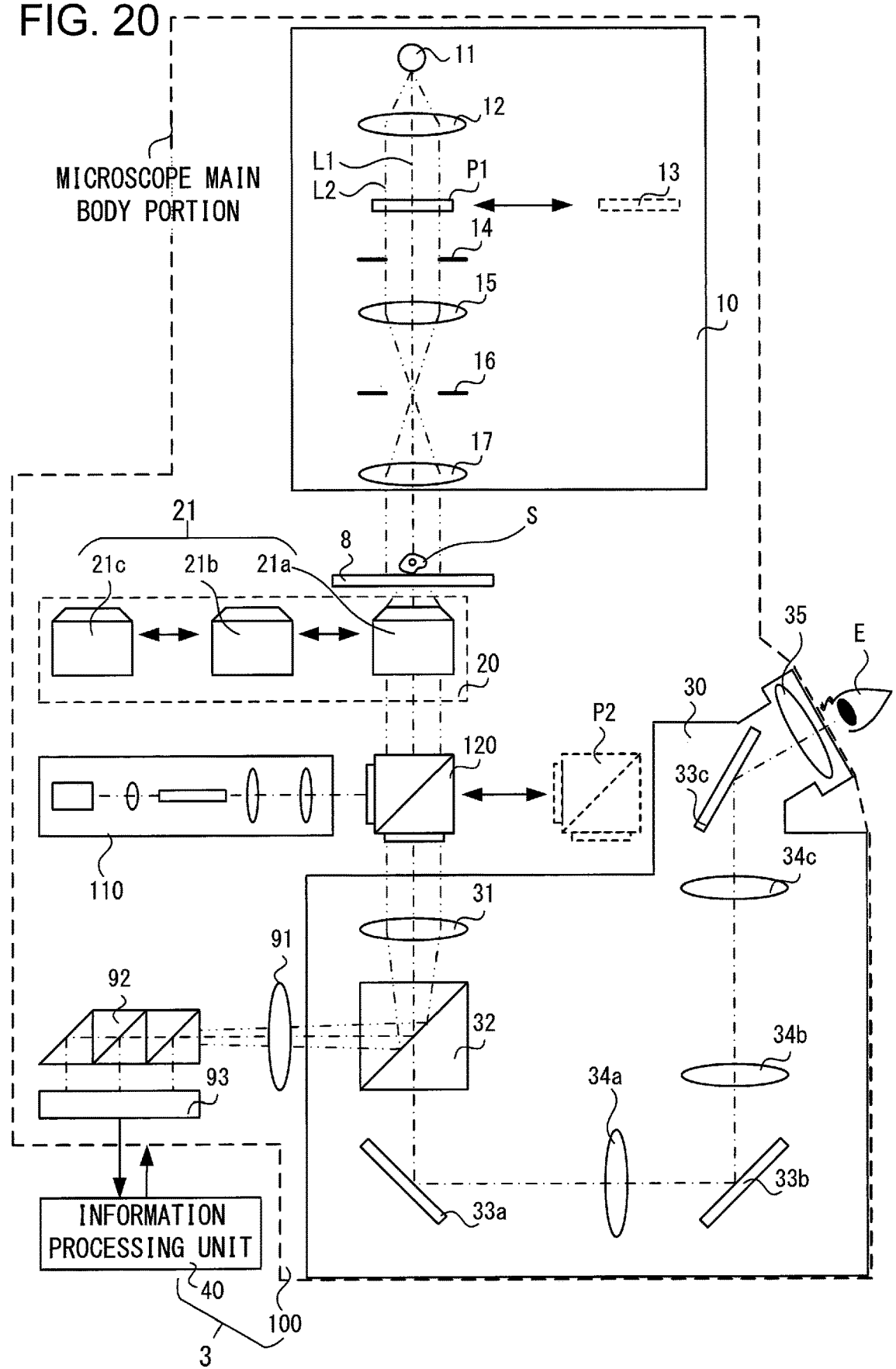
FIG. 20 is a conceptual figure showing the structure of a quantitative phase image generating device according to yet another embodiment.

FIG. 20 is a conceptual figure showing the structure of a quantitative phase image generating device 3 according to this variant embodiment. This quantitative phase image generating device 3 has a structure similar to that of the quantitative phase image generating device 1, but differs by the feature that an optical path branching unit 92 and an imaging lens 91 are disposed in the optical path on the detection unit S side of the beam splitter 32, and a detection unit 93 having three mutually separated detection surfaces is provided to correspond to the three optical paths branched by the optical path branching unit 92.

The optical path branching unit 92 comprises an optical element, such as a triple prism or the like, that branches the optical path from the object S into a plurality of optical paths having mutually different optical path lengths, and since, upon the three optical paths branched off by this optical path branching unit 92, different positions within the object S along the optical axis of the objective lens 21a are respectively set as focal point positions F by the objective lens 21a, accordingly it is possible to make gaps between these focal point positions F correspond to the focal gap $\Delta z$. The number of focal point positions F of the objective lens 21a that are respectively implemented by the plurality of optical paths branched off by the optical path branching unit 92 corresponds to the "number of positions where the focal point of the objective lens 21a is disposed" in the embodiments described above. When the optical path branching unit 92 is a triple prism, if, with regard to the proportion between the transmission component and the reflection component of the light from the object S by the triple prism, the ratio at the first reflection surface is 67:33, the ratio at the second reflection surface is 50:50, and the ratio at the third reflection surface is 0:100, then it is possible to make the average light intensities (i.e. the brightnesses of the light intensity images) of the three light intensity distribution data sets that are acquired simultaneously equal; but it is possible to set the proportions between the transmission components and the reflection components of the light from the object S by the optical path branching unit 92 as may be appropriate.

Furthermore, a diffractive optical element such as a MFG (Multi-Focus diffractive Grating) or the like could also be used as the optical path branching unit 92. By using a diffractive optical element, it becomes possible to detect images upon three or more different focal surfaces of the object S at the same time with the detection unit 93. In this case, the objective pupil surface is related using the imaging lens 91, and the diffractive optical element is disposed at a position conjugate with the objective pupil. Moreover, it would be possible to provide a separate imaging lens after the diffractive optical element, so as to form an image upon the detection unit 93.

The quantitative phase image generating method of this variant embodiment comprises: disposing the focal point of the objective lens 21a simultaneously at a plurality of positions in the object S that are mutually separated by the focal gap $\Delta z$ along the optical axis of the objective lens 21a and detecting light from the object S; generating a plurality of sets of light intensity distribution data at the plurality of positions on the basis of the detected light; and generating phase distribution data including the object S on the basis of this plurality of sets of light intensity distribution data. Due to this, it is possible to measure the phase of the object S with good accuracy and with a single image capture, even if the form of the object S (in other words, its phase distribution) changes during sequential imaging while the focal point position of the objective lens 21a is being adjusted to a plurality of Z positions.

And, in the quantitative phase image generating device according to this variant embodiment, the detection unit 93 detects light from the object S in which the focal point of the objective lens 21a has been simultaneously disposed at each of a plurality of positions that are mutually separated by the focal gap $\Delta z$ along the optical axis of the objective lens 21a via the objective lens 21a, and, on the basis of the detected light, the control unit 50 generates a plurality of sets of light intensity distribution data corresponding to the above described plurality of positions. Due to this, it is possible to measure the phase of the object S with good accuracy and with a single image capture, even though the form of the object S (in other words, its phase distribution) might change during sequential imaging while the focal point position of the objective lens 21a was being adjusted to a plurality of Z positions.

The details of this variant embodiment may also, as appropriate, be combined with the details of the embodiment described above and of the variant embodiments described above.

Variant Embodiment 6

In the embodiments described above, the light intensity distribution data is acquired by a single image capture of each of the measurement surfaces of the object S, but it would also be possible to build the quantitative phase image generating device as a scanning type microscope that employs a laser scanning type fluorescence observation unit.

The details of this variant embodiment may also, as appropriate, be combined with the details of the embodiment described above and of the variant embodiments described above.

Figure 21:
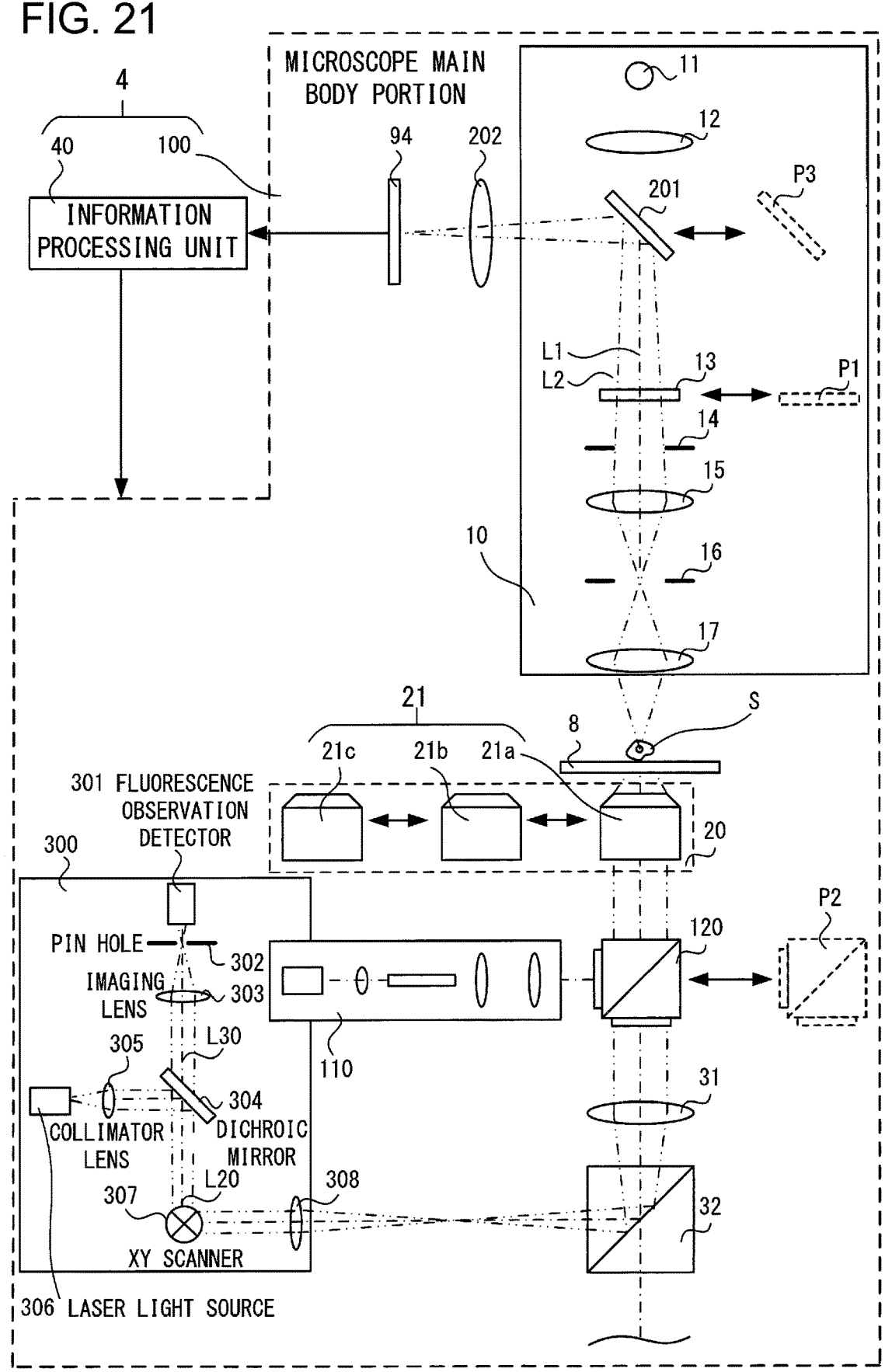
FIG. 21 is a conceptual figure showing the structure of a quantitative phase image generating device according to still another embodiment.

FIG. 21 is a conceptual figure showing the structure of a quantitative phase image generating device 4 according to this variant embodiment. In FIG. 21, the description of the relay optical system 30 is omitted, and the optical path when the light intensity distribution data of the object S is acquired by employing a laser scanning type fluorescence observation unit 300 is schematically shown by a double dotted chain line L2. The quantitative phase image generating device 4 comprises a shiftable mirror 201 that can be moved into the optical path and to a position P3 out of the optical path, an imaging lens 202, a detection unit 94, and the laser scanning type fluorescence observation unit 300. The detection unit 94 is built to include a photodetector such as a photomultiplier tube or the like. And the laser scanning type fluorescence observation unit 300 comprises a fluorescence observation detector 301 that detects fluorescence from the object S, a pin hole 302, an imaging lens 303, a dichroic mirror 304, a collimator lens 305, a laser light source 306, an XY scanner 307, and a lens 308.

The device control unit 51 causes the laser scanning type fluorescence observation unit 300 to emit laser light from the laser light source 306. This laser light emitted from the laser light source 306 is adjusted by the collimator lens 306 into light whose wave front is substantially orthogonal to the optical axis or the like, and is then emitted therefrom. This laser light emitted from the collimator lens 305 is reflected by the dichroic mirror 304, proceeds along the optical axis L20, and is incident upon the XY scanner 307. Light, whose direction of progression has been adjusted by the XY scanner 307, is refracted by the lens 308 and is incident upon the beam splitter 32. Via the beam splitter 32, the imaging lens 31, the filter cube 120, and the objective lens 21a, the device control unit 51 irradiates the illumination light from the laser scanning type fluorescence observation unit 300 upon the object S. In order to acquire the sets of light intensity distribution data, the position of condensation of this illumination light is scanned two dimensionally by the XY scanner 307 over the measurement surfaces i of the object S, and light from each position is detected. Via the objective lens 21a, the filter cube 120, the imaging lens 31, the beam splitter 32, the lens 308, and the XY scanner 307, the fluorescence from the object S is incident upon the dichroic mirror 304. This fluorescence incident upon the dichroic mirror 304 passes through the dichroic mirror 304, progresses along the optical axis L30, and, after being refracted by the imaging lens 303 and having passed through the pin hole 302, is detected by the fluorescence observation detector 301.

It should be understood that it would also be acceptable to arrange to detect light from each position of the object S by shifting the object S in directions orthogonal to the optical axis L1 (i.e. in the X-Y directions) or the like, i.e. by shifting the stage 8 or the like.

Figure 22A:
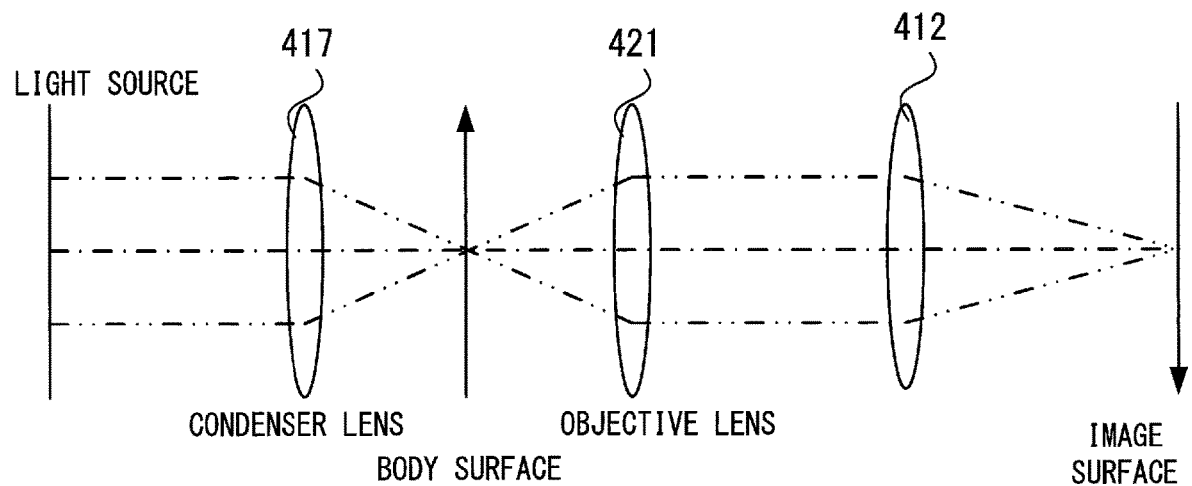
FIGS. 22A and 22B consist of a pair of conceptual figures showing structures of optical systems of scanning type electron microscopes.
Figure 22B:
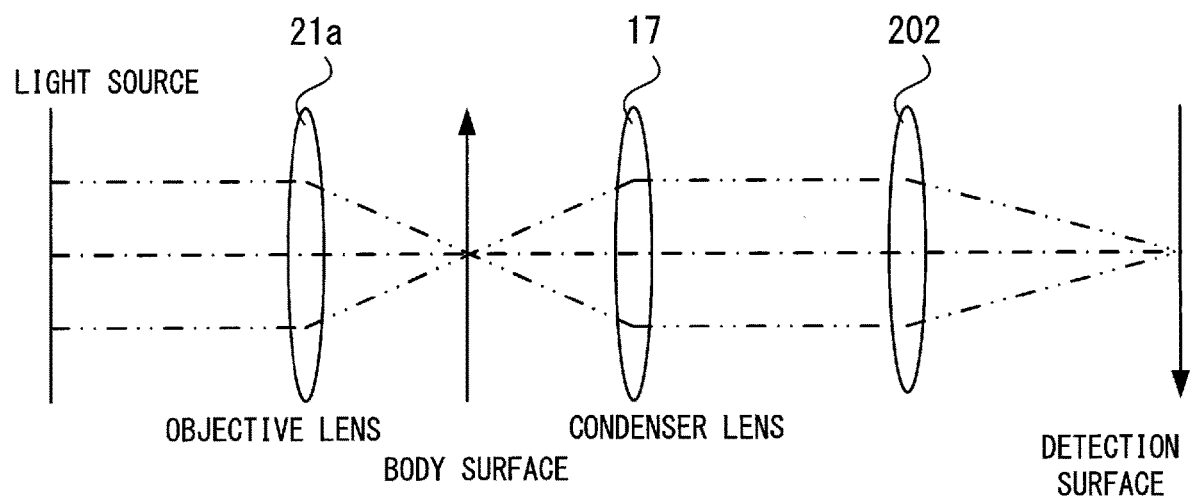

FIG. 22A is a schematic figure showing an optical system for a prior art phase restoration method according to bright field observation of transmitted illumination. In this prior art optical system, a condenser lens 417, a body surface, an objective lens 421, an imaging lens 412, and an image surface are arranged in that order from a light source. And FIG. 22B is a schematic figure for a quantitative phase image generating device 4 according to this variant embodiment, showing an optical system that includes a detection surface of a detection unit 94 of a scanning type microscope. In the optical system of this variant embodiment, an objective lens 21a, a body surface, a condenser lens 17, an imaging lens 202, and a detection surface of a detection unit 94 are arranged in that order from a light source; and, in this case as well, it is possible to implement a structure equivalent to that of a prior art optical system, and it is possible to measure the light intensity distributions I1, I2, and I3 upon the measurement surfaces i.

In the prior art, the differential interference image was measured by the detection unit of the scanning type microscope, corresponding to the detection unit 94. However, when imaging a specimen in a plastic culture vessel or the like, it has been difficult to acquire a differential interference image by imaging, since the polarized light is altered by the vessel or the like. But, with the quantitative phase image generating device 4 of this variant embodiment, even in the case of a vessel such as a prior art 96-well plate or the like in which change of the surface of the liquid due to a meniscus is large so that it has been difficult to obtain satisfactory contrast for a differential interference image, it is still possible to construct a differential interference image whose accuracy is high by conversion via a quantitative phase image that is generated into a differential interference image.

The details of this variant embodiment may also, as appropriate, be combined with the details of the embodiment described above and of the variant embodiments described above.

Variant Embodiment 7

When the object S is a cell mounted in a buffer solution or the like, there has been the problem that dead cells that are floating in the buffer solution (i.e. floating dead cells) may exert influence upon the light intensity distribution while measurement is being performed at the plurality of measurement surfaces i, so that the phase restoration accuracy is deteriorated due to noise in the light intensity distribution data. In particular, there have been cases in which floating dead cells have been present at a part of a measurement surface i that has been measured or in the vicinity thereof, and have caused the phase restoration accuracy to be deteriorated. In order to avoid this kind of deterioration of the phase restoration accuracy, the phase restoration processing unit 521 is able to perform phase restoration while employing the SG method described above.

According to the SG method, the phase restoration processing unit 521 approximates the light intensity at each position upon the measurement surface i as a function of Z with a polynomial equation. Due to this, it is possible to prevent a great influence from being exerted upon the restored phase value, even if there is an extreme value in the light distribution data corresponding to a part of a measurement surface i.

In order to prevent increase of the complexity of computation by the SG method, it is desirable for the phase restoration processing unit 521 first to perform phase restoration without applying the SG method, and then to determine whether or not there is a pixel whose phase restoration error exceeds a predetermined threshold value; and, if there is such a pixel whose phase restoration error exceeds a predetermined threshold value, to perform phase restoration processing again while applying the SG method.

The details of this variant embodiment may also, as appropriate, be combined with the details of the embodiment described above and of the variant embodiments described above.

Variant Embodiment 8

According to a prior art phase restoration method, the phase restoration accuracy decreases at the image edge portion in the neighborhood of the pixels at the outermost edge of the quantitative phase image, and there has been the problem that the phase value is calculated to be high even though actually no phase body is present there. This problem occurs more easily when an object S whose phase value is large (for example, a thick cell) is present at the edge portion of the image. This is because, when a phase body is present in the image edge portion or in its vicinity, a contour which does not really exist is generated since a phase component derived from a spatial frequency component that does not exist occurs during restoration of the phase by filter processing according to the contrast transfer function of the intensity transport equation. In particular, since, with the prior art technique, the phase restoration accuracy decreases at the edge portion of the image along with demarcation of the observation field of view, accordingly, when a stitched image is generated by matching together and connecting quantitative phase images separated by such a demarcation, it has not been possible to join the images together without unnatural change occurring in the region where they are overlapped. However, in this variant embodiment, the phase restoration processing unit 521 suppresses deterioration of the phase restoration accuracy at the image edge portion by performing pre-processing upon the light intensity distribution data.

The phase restoration processing unit 521 generates data (pre-processed image data) corresponding to an image (hereinafter termed the "pre-processed image") consisting of a light intensity image corresponding to the light intensity distribution data to be phase restored surrounded by an image in which the level of light intensity is distributed at substantially the same level as the background, and performs phase restoration processing upon the pre-processed image data. Since, due to this, the portion in the pre-processed image that corresponds to the light intensity image to be phase restored is located at a position that is away from the outline of the image, accordingly it is possible to suppress deterioration of the phase restoration accuracy of that portion. After the phase restoration processing of the pre-processed image data has been completed, the phase restoration processing unit 521 returns the image data that has been subjected to phase restoration processing to the size of the original light intensity image.

For example, when processing the intensity transport equation using a high speed Fourier transform (FFT), since the calculation processing can be most appropriately performed upon images whose data size is a power of two (1024×1024 pixels, 2048×2048 pixels, 4096×4096 pixels, or the like), accordingly, supposing that the number of pixels vertically and horizontally in the detection unit 9 is 1600×1200 pixels, then the phase restoration processing unit 521 may generate light intensity distribution data in which the intensity is distributed the same level of that of the background whose size is 2048×2048 pixels, and may perform the pre-processing for embedding light intensity distribution data corresponding to the light intensity distributions I1, I2, and I3.

It should be understood that it would also be acceptable to arrange for the phase restoration processing unit 521 to determine whether or not to omit the pre-processing of this variant embodiment, on the basis of whether or not any position corresponding to a pixel for which the light intensity is saturated, or for which the light intensity is greater than some threshold value, is included in the edge portion of the light intensity image. With this, it is possible to reduce the computational complexity and thereby to enhance the throughput by omitting pre-processing of the light intensity distribution data corresponding to the light intensity image in which there is no risk of generating a large phase restoration error in the edge portion of the image.

The details of this variant embodiment may also, as appropriate, be combined with the details of the embodiment described above and of the variant embodiments described above.

Variant Embodiment 9

When the object S is a cell or the like disposed within a buffer solution, the liquid surface of the buffer solution is curved by surface tension and assumes the shape of a meniscus, and the gradient of this meniscus shaped liquid surface becomes the background phase value, so that the feature in which the phase restoration error tends to increase has been a problem in prior art measurement of a quantitative phase image. However, in this variant embodiment, the phase restoration processing unit 521 performs image processing, and accordingly the influence upon phase measurement due to the meniscus shape of the liquid surface is reduced.

Figure 23:
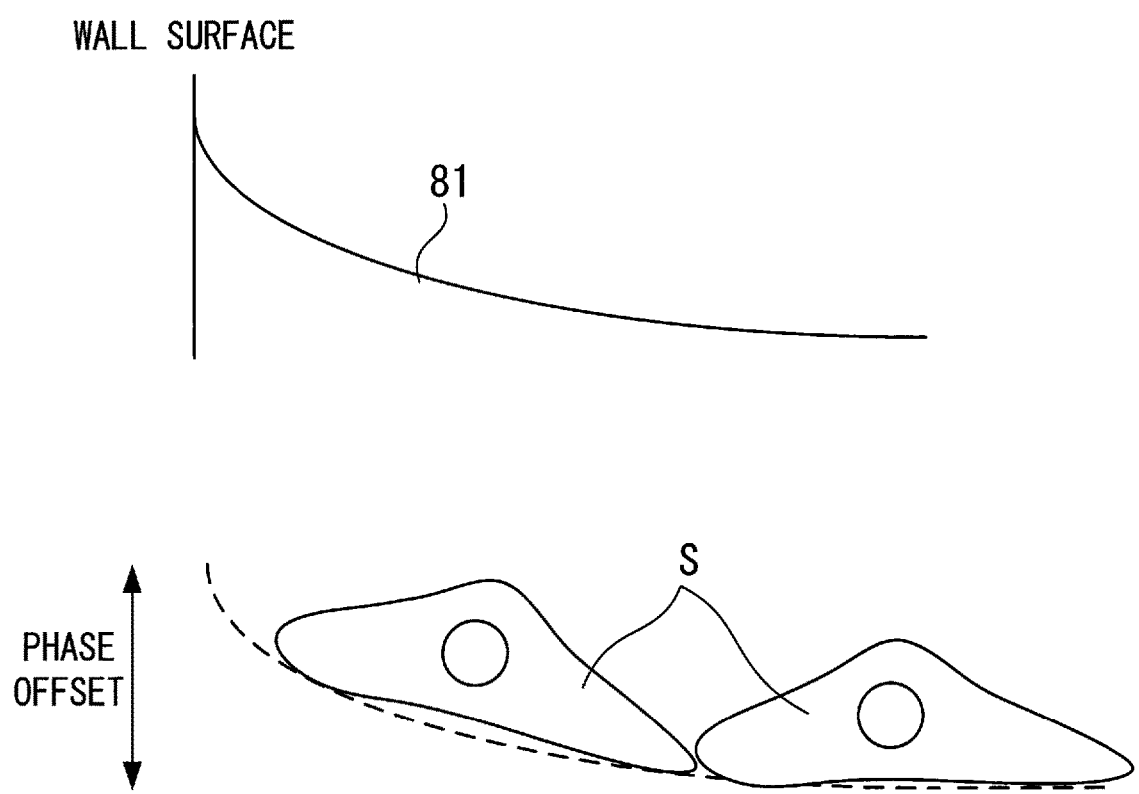
FIG. 23 is a conceptual figure for explanation of a phase offset.

FIG. 23 is a figure schematically showing the influence of the meniscus shape of the liquid surface upon phase measurement. When a meniscus shape 81 is present in the vessel in which the object S is contained, this exerts an influence upon the background phase value in the quantitative phase image of the object S. This background phase value is termed a "phase offset".

By morphological image processing, the phase restoration processing unit 521 extracts the background phase value excluding the object S, and reduces the influence due to the phase offset by subtracting it from the quantitative phase image. This method is capable of correcting, not only for the meniscus shape, but also for local change of the thickness of the plastic container. Furthermore, even when the quantitative phase images with the phase offset removed are overlapped by stitched image generation, it is still possible to connect them together in an accurate manner.

The details of this variant embodiment may also, as appropriate, be combined with the details of the embodiment described above and of the variant embodiments described above.

Variant Embodiment 10

It would be possible to record a program for implementing the information processing function of the information processing unit 40 of this embodiment upon a recording medium that is computer-readable, and to cause a computer system to read in and execute the program recorded upon this recording medium related to processing and so on performed by the control unit 50, such as the processing performed by the device control unit 51 described above and the processing performed by the analysis unit 52 and so on. It should be understood that, here, it will be supposed that the term "computer system" includes an OS (Operating System) and hardware such as peripheral devices. And the term "computer readable recording medium" refers to a storage device such as a transportable recording medium like a flexible disk, an opto-magnetic disk, an optical disk, a memory card, or the like, or to a storage device internal to a computer system such as a hard disk or the like. Furthermore, the term "computer readable recording medium" also may include a case in which the program is dynamically stored for a short time interval, such as in a communication line while the program is transmitted via a communication circuit such as a network like the internet or a telephone circuit or the like, or a case in which a program is stored for a certain time interval, such as in a volatile memory internal to a computer system that serves as a server or as a client. Moreover, the program described above may be for implementing a portion of the functions described above, or may be for implementing the functions described above in combination with a program that is already recorded in the computer system.

Figure 24:
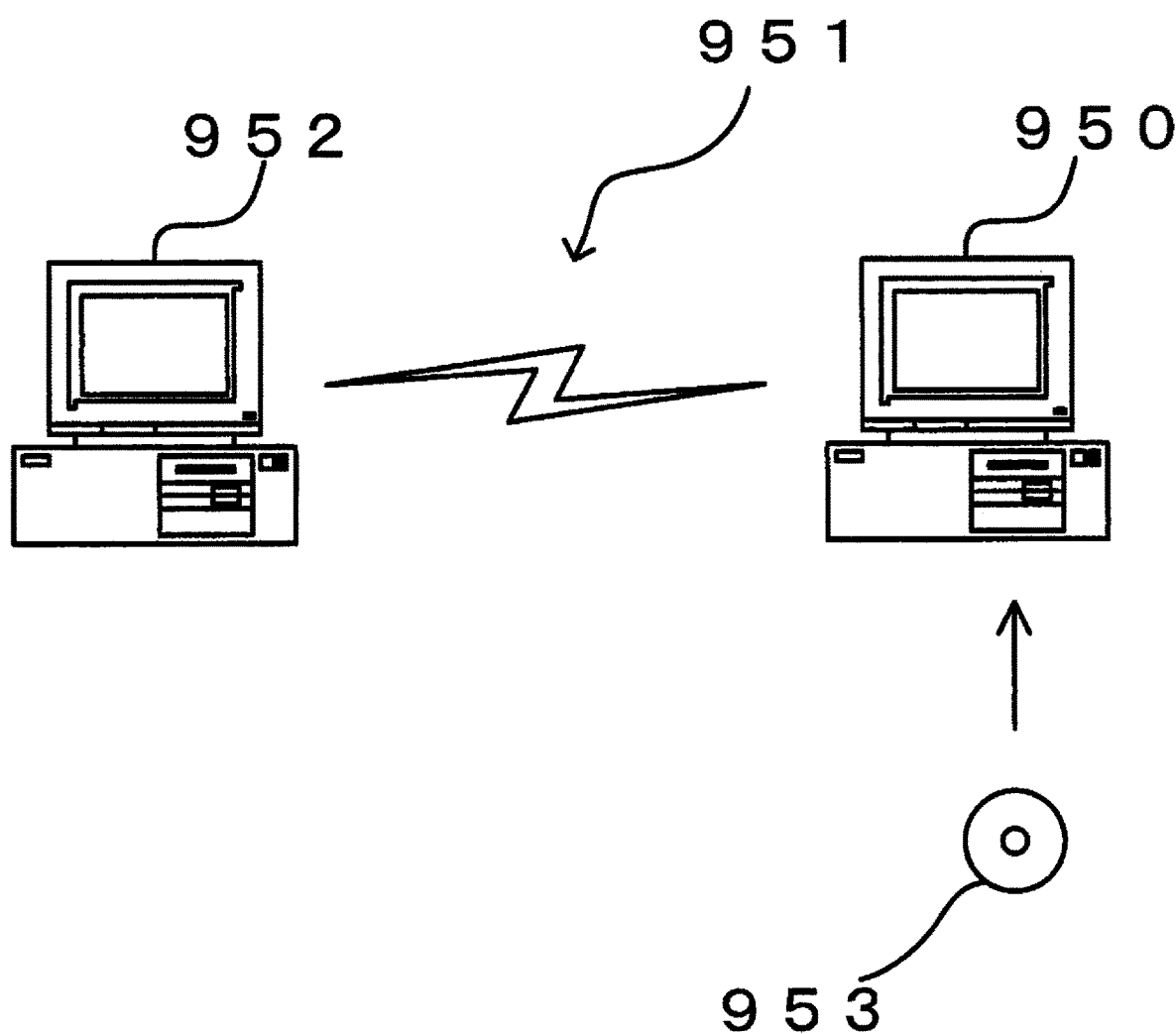
FIG. 24 is a conceptual figure for explanation of a program.

Moreover, when applied to a personal computer (hereinafter termed a "PC"), the program related to the control described above may be supplied via a recording medium such as CD-ROM or a DVD-ROM or the like, or via a data signal such as the internet or the like. FIG. 24 is a figure showing such a situation. A PC 950 receives supply of the program via a recording medium 953. Moreover, the PC 950 is endowed with a function of connection to a communication circuit 951. Another computer 952 is a server computer that provides the program described above, and that stores the program upon a recording medium such as a hard disk or the like. The communication circuit 951 is a communication circuit such as the internet, a PC communication line, or the like, or a dedicated communication circuit or the like. The computer 952 reads out the program using the hard disk, and transmits the program to the PC 950 via the communication circuit 951. In other words, the program is conveyed as a data signal by a carrier wave, and is transmitted via the communication circuit 951. In this manner, the program can be supplied as a computer-readable computer program product in various formats, such as upon a recording medium or via a carrier wave or the like.

When the quantitative phase image generating device 1 comprising the transmitted illumination optical system 10 that irradiates illumination light upon the object S, the objective lens 21, the device control unit 51 that adjusts the focal point of the objective lens 21a upon the object S along the optical axis of the objective lens 21a, the detector that detects light from the object S, and the analysis unit (image generation unit) 52 detects, with the detection unit 9, light from the object S upon which the focal point of the objective lens 21a is disposed at each of a plurality of positions that are mutually separated by the focal gap Δz along the optical axis of the objective lens 21a, the plurality of sets of light intensity distribution data are generated by the analysis unit 52 on the basis of the detected light, and the quantitative phase image is generated on the basis of this plurality of sets of light intensity distribution data, then, on the basis of the numerical aperture NA of the objective lens 21a, the wavelength λ of the illumination light, and the refractive index n between the objective lens 21a and the object S, which are setting information of the microscope main body portion inputted to the quantitative phase image generating device 1 or stored therein, the program according to this variant embodiment causes a processing device of the quantitative phase image generating device 1 to perform setting processing for setting the focal gap Δz. Due to this, it is possible to measure the phase of the object S with good accuracy and with a small number of image captures.

The details of this variant embodiment may also, as appropriate, be combined with the details of the embodiment described above and/or of the variant embodiments described above.

The present invention is not to be considered as being limited to the details of the embodiments described above. Other modes of implementation that are considered to be within the range of the technical concept of the present invention are also included within the scope of the present invention.

Example

The phase distribution of Hela cells was measured with a microscope having a structure similar to that of the quantitative phase image generating device 1, and by using different dry objective lenses. The measurement conditions were as follows. "Number of image captures" means the number of times that image capture was performed in order to acquire light intensity distribution data, with image capture being performed once at each of three different focal point positions.

Wavelength λ of illumination light: 550 nm (distributed in the range 500 nm to 600 nm)

Pixel size P of imaging element: 6.45 μm

| Objective lens number | magnification | numerical aperture NA | focal gap | number of image captures |
|---|---|---|---|---|
| 1 | 10 | 0.45 | Δz = 5.1 μm | 3 |
| 2 | 20 | 0.75 | Δz = 1.6 μm | 3 |
| 3 | 30 | 0.6 | Δz = 2.8 μm | 3 |

Figure 25:
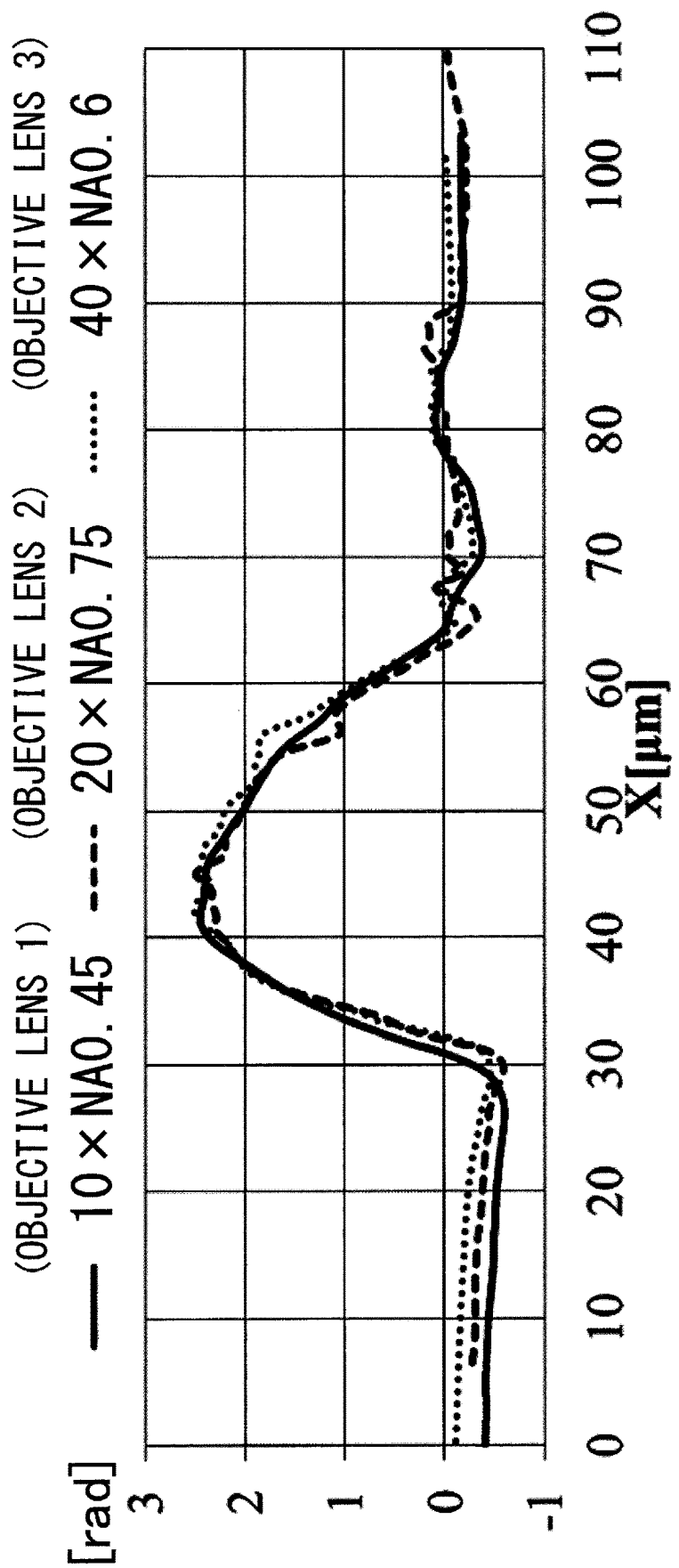
FIG. 25 is a graph showing measurement results in a concrete example.

FIG. 25 is a graph showing the phase distributions of the same longitudinal section (i.e. the same X-Z cross section) of Hela cells, obtained from light intensity distribution data acquired by imaging the Hela cells using each of the objective lenses 1 through 3. It is seen that the phase profiles are almost the same even when the objective lenses are changed over.

What is claimed is:

1. A quantitative phase image generating method for a microscope, the method comprising:
irradiating an object with illumination light, the object being a phase body;

disposing a focal point of an objective lens at each of a plurality of positions that are mutually separated by gaps Δz along an optical axis of the objective lens;

detecting light from the object;

generating three-dimensional light intensity distribution data based upon the light detected at each of the plurality of positions; and generating a quantitative phase image based upon the three-dimensional light intensity distribution data, wherein:

the quantitative phase image is an image including phases obtained by multiplying change in thickness of the object by change of its refractive index;

the gap Δz is set based upon setting information of the microscope; and the setting information includes at least one of the following: a numerical aperture NA of the objective lens, a wavelength k of the illumination light, and a refractive index between the objective lens and the object.

2. The quantitative phase image generating method according to claim 1, wherein
the gap Δz is set by using a parameter k that indicates a spatial frequency for restoration of phase in the generated quantitative phase image.

3. The quantitative phase image generating method according to claim 2, wherein:
the gap Δz is set according to a following Equation (100), using the parameter k:

$$\Delta_z = \frac{k\lambda}{5\left(n - \sqrt{n^2 - (NA)^2}\right)} \quad (100)$$

and a value of the parameter k is 1 or greater and 25 or less.

4. The quantitative phase image generating method according to claim 3, wherein
the value of the parameter k is 1 or greater and 16 or less.

5. The quantitative phase image generating method according to claim 1, wherein
a number of the plurality of positions at which the focal point of the objective lens is disposed is set based upon the numerical aperture NA of the objective lens, a horizontal magnification β provided by an imaging optical system that includes the objective lens, and a pixel size P of a detector that detects light from the object.

6. The quantitative phase image generating method according to claim 5, wherein
the number of the plurality of positions at which the focal point of the objective lens is disposed is set based upon a magnitude of an Airy disk of a point spread function at a detection surface of the detector and the pixel size P.

7. The quantitative phase image generating method according to claim 6, wherein
if the pixel size P is larger than a diameter of the Airy disk of the point spread function, then the number of the plurality of positions at which the focal point of the objective lens is disposed is set to a value greater than 3.

8. A quantitative phase image generating method, comprising:
irradiating an object with illumination light, the object being a phase body;

disposing a focal point of an objective lens at each of a plurality of positions that are mutually separated by gaps Δz along an optical axis of the objective lens;

detecting light from the object;

generating three-dimensional light intensity distribution data based upon the light detected at each of the plurality of positions; and generating a quantitative phase image based upon the three-dimensional light intensity distribution data, wherein the quantitative phase image is an image including phases obtained by multiplying change in thickness of the object by change of its refractive index, and the gap Δz is 0.07 μm or greater and 90.3 μm or less.

9. A quantitative phase image generating device comprising a microscope, the microscope comprising:
an illumination optical system that irradiates illumination light upon an object, the object being a phase body;
an objective lens;
a detector that detects light from the object due to the irradiation of illumination light from the illumination optical system; and
a processor configured to
adjust a position of a focal point of the objective lens so that the focal point of the objective lens is disposed at a plurality of positions that are mutually separated by gaps Δz along an optical axis of the objective lens;
generate three-dimensional light intensity distribution data based upon the light detected at each of the plurality of positions; and
generate a quantitative phase image based upon the three-dimensional light intensity distribution data, wherein:
the quantitative phase image is an image including phases obtained by multiplying change in thickness of the object by change of its refractive index;
the processor sets the gap Δz based upon setting information of the microscope; and
the setting information includes at least one of the following: a numerical aperture NA of the objective lens, a wavelength λ of the illumination light, and a refractive index between the objective lens and the object.

10. The quantitative phase image generating device according to claim 9, wherein
the processor sets the gap Δz using a parameter k that represents a spatial frequency for restoration of phase in the quantitative phase image.

11. The quantitative phase image generating device according to claim 10, wherein:
the processor sets the gap Δz according to a following Equation (100) by using the parameter k:

$$\Delta_z = \frac{k\lambda}{5\left(n - \sqrt{n^2 - (NA)^2}\right)} \quad (100)$$

and a value of the parameter k is 1 or greater and 25 or less.

12. The quantitative phase image generating device according to claim 11, wherein
the parameter k is 1 or greater and 16 or less.

13. The quantitative phase image generating device according to claim 9, wherein
the processor sets a number of the plurality of positions at which the focal point of the objective lens is disposed based upon at least the numerical aperture NA of the objective lens, a horizontal magnification β of an imaging optical system that includes the objective lens, and a pixel size of the detector.

14. The quantitative phase image generating device according to claim 13, wherein
the processor sets the number of the plurality of positions at which the focal point of the objective lens is disposed based upon a size of an Airy disk of a point spread function on a detection surface of the detector and a magnitude of the pixel size P.

15. The quantitative phase image generating device according to claim 14, wherein
when the pixel size P is larger than a diameter of the Airy disk of the point spread function, the processor sets the number of the plurality of positions at which the focal point of the objective lens is disposed to be greater than 3.

16. The quantitative phase image generating device according to claim 9, further comprising
a stage upon which the object is mounted; and
a shifting device comprising a motor for shifting the stage along the optical axis of the objective lens, wherein
the shifting device shifts the stage based upon the gap Δz set by the processor.

17. A quantitative phase image generating device, comprising:
an illumination optical system that irradiates illumination light upon an object, the object being a phase body;
an objective lens;
a detector that detects light from the object due to the irradiation of illumination light from the illumination optical system; and
a processor configured to:
adjust a position of a focal point of the objective lens upon the object so that the focal point of the objective lens is disposed at a plurality of positions that are mutually separated by gaps Δz along an optical axis of the objective lens;
and
generate three-dimensional light intensity distribution data based upon the light detected at each of the plurality of positions; and
generate a quantitative phase image based upon the three-dimensional light intensity distribution data, wherein
the quantitative phase image is an image including phases obtained by multiplying change in thickness of the object by change of its refractive index, and
the processor sets the gap Δz to 0.07 μm or greater and 90.3 μm or less.

18. A non-transitory computer-readable medium storing a program that controls a processor of a quantitative phase image generating device with a microscope,
the quantitative phase image generating device comprising:
an illumination optical system that irradiates illumination light upon an object, the object being a phase body;
an objective lens;
a detector that detects light from the object due to the irradiation of illumination light from the illumination optical system; and
the processor configured to
adjust a position of a focal point of the objective lens so that the focal point of the objective lens is disposed at a plurality of positions in the object that are mutually separated by gaps Δz along an optical axis of the objective lens;
generate three-dimensional light intensity distribution data based upon the light detected at each of the plurality of positions; and
generate a quantitative phase image based upon the three-dimensional light intensity distribution data, and
the program causing the quantitative phase image generating device to execute processing for performing setting processing for setting the gap Δz based upon setting information for the microscope inputted to or stored in the quantitative phase image generating device, wherein
the setting information includes at least one of the following: a numerical aperture NA of the objective lens, a wavelength λ of the illumination light, and a refractive index between the objective lens and the object.

19. A non-transitory computer-readable medium storing a program that controls a processor of a quantitative phase image generating device,
the quantitative phase image generating device comprising:
an illumination optical system that irradiates illumination light upon an object, the object being a phase body;
an objective lens;
a detector that detects light from the object due to the irradiation of illumination light from the illumination optical system, and
the processor configured to:
adjust a position of a focal point of the objective lens upon the object, so that the focal point of the objective lens is disposed at a plurality of positions that are mutually separated by gaps Δz along an optical axis of the objective lens;
generate three-dimensional light intensity distribution data based upon the light detected at each of the plurality of positions; and
generate a three-dimensional quantitative phase image based upon the three-dimensional light intensity distribution data, the quantitative phase image being an image including phases obtained by multiplying change in thickness of the object by change of its refractive index, and
the program causing the quantitative phase image generating device to execute processing for performing setting processing for setting the gap Δz to 0.07 μm or greater and 90.3 μm or less.

* * * * *